(12) United States Patent
Fan et al.

(10) Patent No.: US 8,149,419 B2
(45) Date of Patent: Apr. 3, 2012

(54) OPTICAL REFLECTOMETRY AND OPTICAL REFLECTOMETER

(75) Inventors: Xinyu Fan, Ibaraki (JP); Fumihiko Ito, Ibaraki (JP); Yusuke Koshikiya, Ibaraki (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 410 days.

(21) Appl. No.: 12/525,287

(22) PCT Filed: Feb. 21, 2008

(86) PCT No.: PCT/JP2008/052991
§ 371 (c)(1),
(2), (4) Date: Jul. 30, 2009

(87) PCT Pub. No.: WO2008/105322
PCT Pub. Date: Sep. 4, 2008

(65) Prior Publication Data
US 2010/0097615 A1 Apr. 22, 2010

(30) Foreign Application Priority Data

Feb. 28, 2007 (JP) ................................ 2007-050769
Oct. 30, 2007 (JP) ................................ 2007-282319

(51) Int. Cl.
*G01B 9/02* (2006.01)
*G01N 21/55* (2006.01)
(52) U.S. Cl. ...................................... 356/484; 356/445
(58) Field of Classification Search .................. 356/73.1, 356/477, 479, 484, 497, 485, 489, 445–448, 356/450–458
See application file for complete search history.

(56) References Cited

U.S. PATENT DOCUMENTS

| | | | |
|---|---|---|---|
| 4,790,655 A | 12/1988 | Yamamoto et al. | 356/345 |
| 5,511,086 A | 4/1996 | Su | |
| 5,844,235 A | 12/1998 | Tachikawa et al. | |
| 6,268,921 B1 * | 7/2001 | Seitz et al. | 356/407 |
| 6,335,788 B1 | 1/2002 | Uchiyama et al. | |
| 6,900,896 B2 | 5/2005 | Motamedi et al. | 356/477 |
| 6,914,681 B2 | 7/2005 | Szafraniec et al. | 356/477 |

(Continued)

FOREIGN PATENT DOCUMENTS
EP 0754939 A1 1/1997
(Continued)

OTHER PUBLICATIONS

Extended European search report dated May 25, 2011 for corresponding European application 11002587.1 cites the U.S. patent application publication above.

(Continued)

*Primary Examiner* — Gregory J Toatley
*Assistant Examiner* — Jarreas C. Underwood
(74) *Attorney, Agent, or Firm* — DLA Piper LLP (US)

(57) ABSTRACT

An object of the invention is to provide an optical reflectometry and an optical reflectometer, in which accurate measurement can be performed irrespective of a measurement distance. In the optical reflectometry and optical reflectometer according to the invention, in which a distribution of backscattered light intensity from a measurement target in an optical propagation direction is measured using Optical Frequency Domain Reflectometry (OFDR), a coherence monitor unit 12 that monitors a coherence property of a frequency sweep light source 1 is provided, and measurement result of a measuring unit 11 is corrected based on the monitor result of the coherence monitor unit 12.

20 Claims, 30 Drawing Sheets

U.S. PATENT DOCUMENTS

| | | | | |
|---|---|---|---|---|
| 7,365,859 | B2 * | 4/2008 | Yun et al. | 356/497 |
| 7,515,276 | B2 * | 4/2009 | Froggatt et al. | 356/497 |
| 7,548,320 | B2 * | 6/2009 | Chan et al. | 356/497 |
| 7,589,843 | B2 * | 9/2009 | Aiyer et al. | 356/504 |
| 2003/0053068 | A1 | 3/2003 | Szafraniec et al. | 356/477 |
| 2003/0053069 | A1 | 3/2003 | Motamedi et al. | 356/477 |
| 2003/0072051 | A1 * | 4/2003 | Myers et al. | 359/115 |
| 2005/0219512 | A1 | 10/2005 | Froggatt et al. | |
| 2005/0248769 | A1 * | 11/2005 | Weitzel | 356/451 |
| 2009/0103100 | A1 | 4/2009 | Froggatt et al. | |
| 2009/0174931 | A1 * | 7/2009 | Huber et al. | 359/340 |

FOREIGN PATENT DOCUMENTS

| | | | |
|---|---|---|---|
| EP | 1045237 | A2 | 10/2000 |
| EP | 1286150 | A2 | 2/2003 |
| JP | 61-260131 | | 11/1986 |
| JP | 09-218130 | | 8/1997 |
| JP | 2001-352121 | | 12/2001 |
| JP | 2003-106944 | | 4/2003 |
| WO | 2006068875 | A2 | 6/2006 |

OTHER PUBLICATIONS

Yusuke Koshikiya et al., "Long Range and High Spatial Resolution Measurement of Rayleigh Backscattering by OFDR with SSB Modulator", Proceedings of the IEICE Conference, 2007 Communication 2, Mar. 7, 2007 p. 516.

Xinyu Fan et al., "Novel Optical Frequency Domain Reflectometry with Measurement Range Beyond Laser Coherence Length Realized Using Concatenative Reference Method", Proceedings of the IEICE Conference, 2007 Communication 2, Mar. 7, 2007, p. 517.

Xinyu Fan et al., Phase-noise-compensated optical frequency domain reflectometry with measurement fange beyond laser coherence length realized using concatenative reference method:, Optical Society of America, Nov. 15, 2007, vol. 32, No. 22, Optical Letters. Pp3227-3229.

Xinyu Fan et al., "Highly sensitive reflectometry over 20 km with sub-meter spatial resolution based on phase-noise-compensated optical frequency domain reflectometry and concatenative reference method", 19th Intl. Conference on Optical Fibre Sensor, Proc. of SPIE vol. 7004, 70043L-1-4.

Yusuke Koshikiya et al., "Long Range and cm-Level Spatial Resolution Measurement Using Coherent Optical Frequency Domain Reflectometry with SSB-SC Modulator and Narrow Linewidth Fiber Laser", IEEE, Journal of Lightwave Technology, vol. 26, No. 18, Sep. 15, 2008, pp. 3287-3294.

Xinyu Fan et al., "Evolution of Backscattered Polarization in High-PMD Fibres Measured by Phase-Noise Compensated. Optical Frequency Domain Reflectometry", ECOC 2008, Sep. 21-25, 2008, pp. 1-2.

Yusuke Koshikiya et al., "40-km Range, 1-m Resolution Measurement Based on Phase-Noise-Compensated Coherent Optical Frequency Domain Reflectometry", ECOC 2008, Sep. 21-25, 2008, pp. 1-2.

Xinyu Fan et al., "Phase-Noise-Compensated Optical Frequency-Domain Reflectometry", IEEE Journal of Quantum Electronics, vol. 45, No. 6, Jun. 2009. pp. 594-602.

Glombitza, et al. "Coherent Frequency-Domain Reflectometry for Characterization of Single-Mode Integrated-Optical Waveguides" Journal of Lightwave Technology, IEEE, vol. 11, No. 8, pp. 1377-1384, Aug. 1993.

Passy, et al. "Experimental and Theoretical Investigations of Coherent OFDR with Semiconductor Laser Sources" Journal of Lightwave Technology USA, vol. 12, No. 9, pp. 1622-1630, Sep. 1994 .

Hotate, et al. "Synthesis of Optical-Coherence Function and its Applications in Distributed and Multiplexed Optical Sensing" Journal of Lightwave Technology, IEEE, vol. 24, No. 7, pp. 2541-2557, Jul. 2006.

W. Eickhoff et al., "Optical frequency domain reflectometry in single-mode fiber" Applied Physics Letters, vol. 39, No. 9, pp. 693-695, Nov. 1, 1981.

Xinyu Fan et al., "Novel optical frequency domain reflectometry with measurement range beyond laser coherence length by using concatenative reference method" (with partial English translation) IEICE Technical Report, vol. 107, No. 52, pp. 61-66, May 17, 2007.

Yusuke Koshikiya et al., "Highly Sensitive Coherent Optical Frequency-domain Reflectometry Employing SSB-modulator with cm-level Spatial Resolution over 5 km" 33rd European Conference and Exhibition of Optical Communication (ECOC), 2007, pp. 1-2, Sep. 16, 2007.

Xinyu Fan et al., "Novel Optical Frequency Domain Reflectometry with Measurement Range Beyond Laser Coherence Length Realized Using Concatenatively Generated Reference Signal" Conference on Lasers and Electro-Optics (CLEO), 2007, pp. 1-2, May 6, 2007.

Extended European search report dated Aug. 16, 2010 for corresponding European application 08711774.3.

* cited by examiner

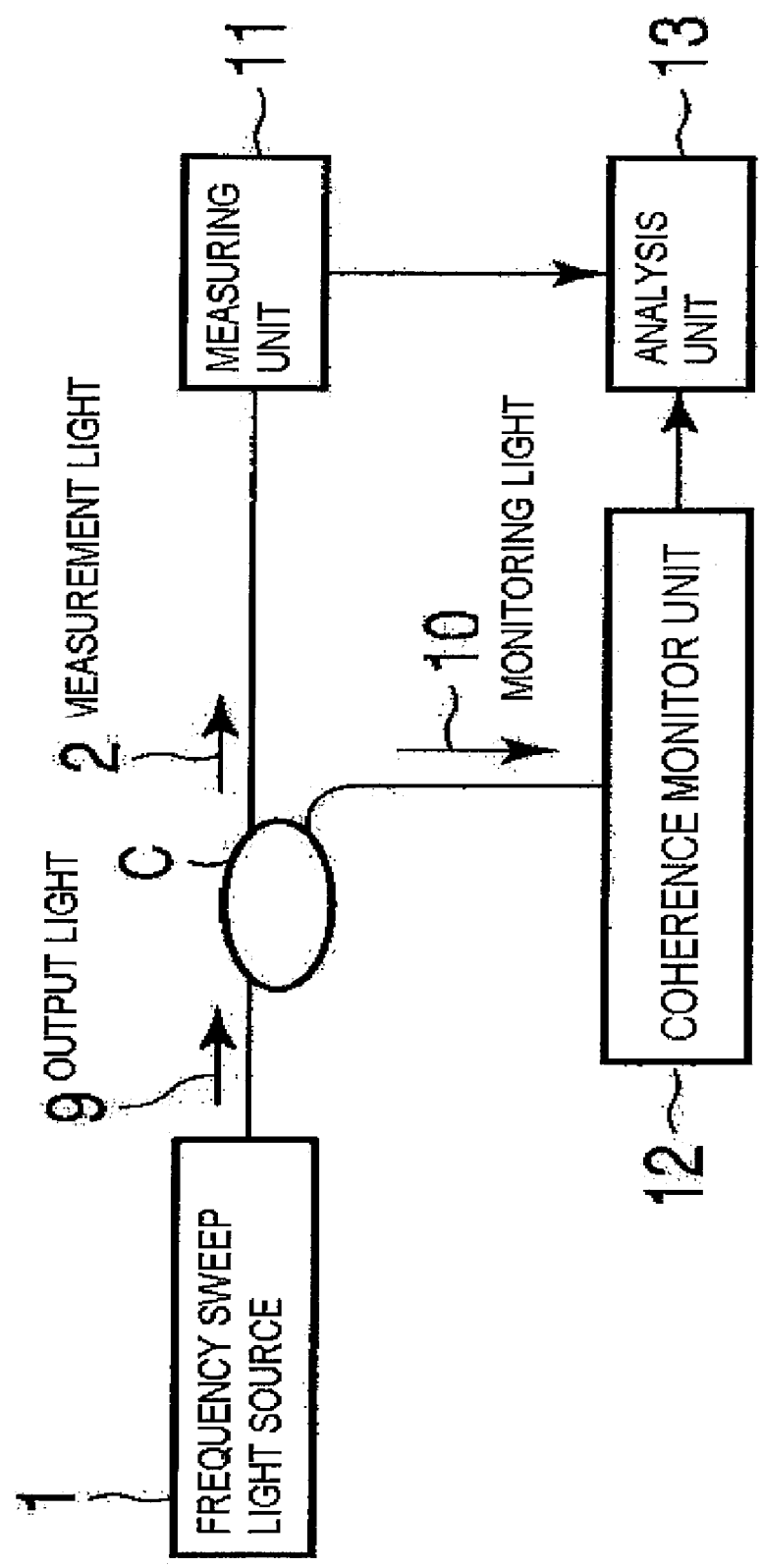

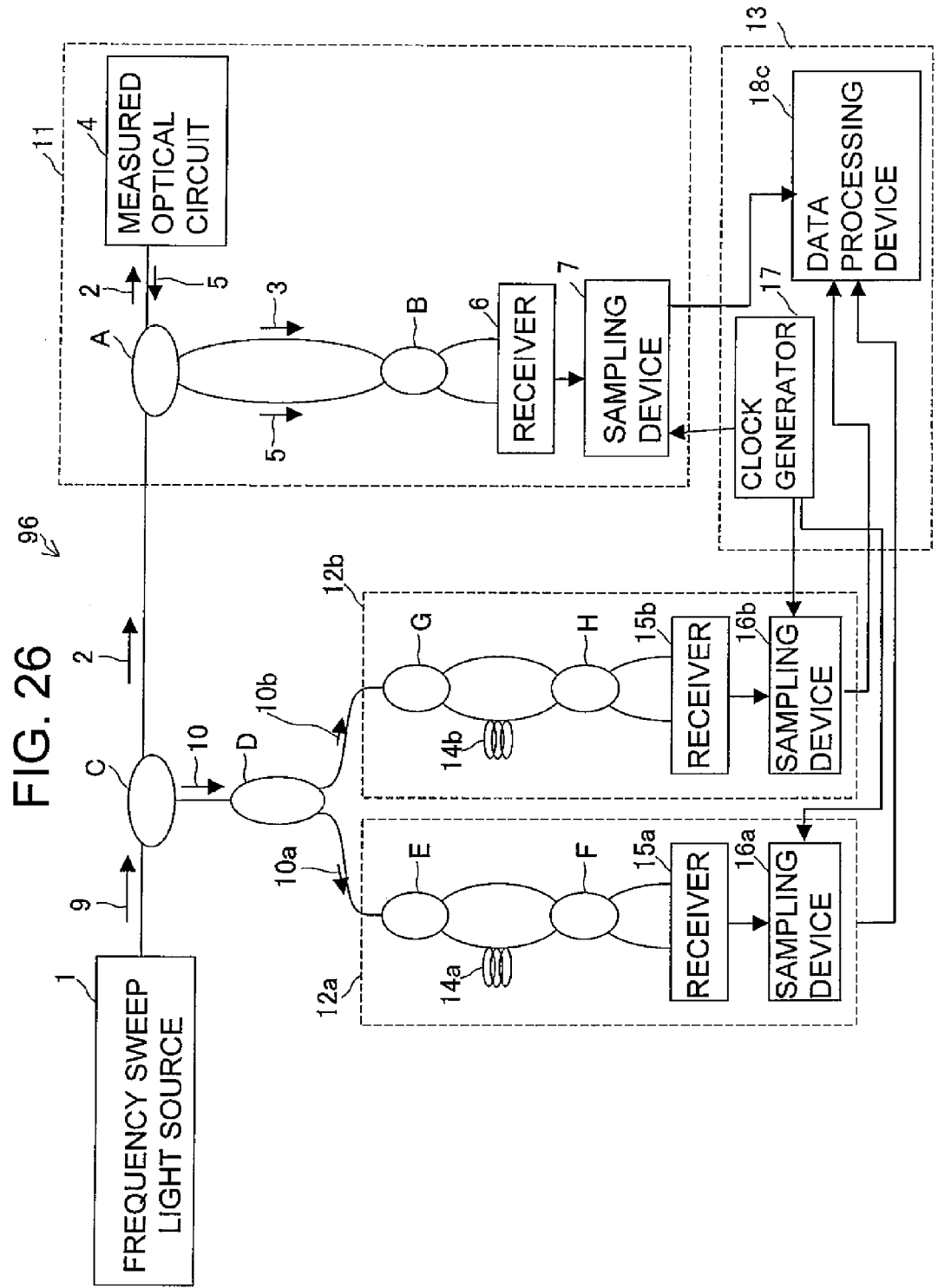

OPTICAL REFLECTOMETRY AND OPTICAL REFLECTOMETER

CROSS-REFERENCE TO THE RELATED APPLICATIONS

This application is a national stage of international application No. PCT/JP2008/052991 filed on Feb. 21, 2008, which also claims the benefit of priority under 35 USC 119 to Japanese Patent Application No. 2007-050769 filed on Feb. 28, 2007 and Japanese Patent Application No. 2007-282319 filed on Oct. 30, 2007, the entire contents of all of which are incorporated herein by reference.

TECHNICAL FIELD

The present invention relates to optical reflectometry for measuring a reflectance distribution in an optical propagation direction in a measured circuit such as an optical circuit, and an optical reflectometer for conducting the optical reflectometry.

BACKGROUND ART

Optical Frequency Domain Reflectometry (OFDR) is well known as optical reflectometry used to measure transmission loss of an optical circuit and diagnose a failure point (for example, see Non-Patent Document 1). In OFDR, output light emitted from a frequency sweep light source is branched into two, and an interference beat signal that is generated by interference between light reflected from a measurement target and one of pieces of branched light is analyzed to measure a distribution of backscattered light intensity from the measurement target in the optical propagation direction.

That is, in OFDR, the output light emitted from the coherent light source whose optical frequency is swept is branched into two, and one of the pieces of branched light is inputted as measurement light on the measured optical circuit and the other piece of branched light is multiplexed with backscattered light (reflected light that the measurement light is reflected and generated at each position corresponding to a propagation distance of the measured optical circuit) as local light emission. The interference beat signal generated by the multiplexing of the branched light and the backscattered light is detected to analyze a spectrum of the interference beat signal, and a reflectance at each position corresponding to the propagation distance of the measured optical circuit is measured as intensity of a spectrum frequency component.

Non-Patent Document 1: "Optical frequency domain reflectometry in single-mode fiber", W. Eickhoff and R. Ulrich, Applied Physics Letters 39 (9), pp. 693-695.

SUMMARY OF INVENTION

Technical Problem

However, in the existing technique, resolution is deteriorated in the measurement distance that exceeds a half of the coherence length of the frequency sweep light source, and the measurement cannot be performed in the worst case. This is attributed to the fact that, in the measurement distance that exceeds a half of the coherence length of the frequency sweep light source, coherency between the local light emission and the light backscattered from measured optical circuit is eliminated to spread the spectral width of the beat signal. The reason the limitation of the measurement distance is a half of the coherence length is that the backscattered light travels back and forth in the measured optical circuit to increases the optical path difference double the measurement distance.

In view of the foregoing, an object of this invention is to provide an optical reflectometry and an optical reflectometer, in which the accurate measurement can be performed irrespective of the measurement distance.

Solution to Problem

One aspect in accordance with this invention provides an optical reflectometry that is of Optical Frequency Domain Reflectometry (OFDR) in which output light emitted from a frequency sweep light source is inputted to a measurement target to measure a reflectance distribution of a measurement target in a propagation direction, an optical frequency being swept in the frequency sweep light source, the optical reflectometry including monitoring a coherence property of the output light; detecting interference beat signal of the output light and backscattered light from the measurement target; correcting measurement result based on the interference beat signal using the coherence property of the output light.

Therefore, the measurement result is obtained while the spectrum spread in the region exceeding the light source coherence length is corrected. Accordingly, the measurement can be performed by OFDR in the measurement distance exceeding the light source coherence length.

One aspect in accordance with this invention provides an optical reflectometry that is of Optical Frequency Domain Reflectometry (OFDR) in which output light emitted from a frequency sweep light source is inputted to a measurement target to measure a reflectance distribution of the measurement target in a propagation direction, an optical frequency being swept in the frequency sweep light source, the optical reflectometry including a monitor step of producing a reference signal reflecting nonlinearity of the sweep from monitoring light obtained by branching the output light; a detection step of obtaining sampled data by sampling an interference beat signal between the output light and light backscattered from the measurement target in a constant period; and a correction step of correcting the reflectance distribution measured based on the interference beat signal using the reference signal, wherein the monitor step includes delaying one of two pieces of light, into which the monitoring light is branched, with a delay unit; inputting both the pieces of branched light on an optical 90-degree hybrid to perform delayed self-homodyne detection; producing first and second monitoring beat signals that are orthogonal to each other; computing an error of a branch ratio of a branch unit in the optical 90-degree hybrid based on variances of pieces of data obtained by sampling the first and second monitoring beat signals in the constant period; computing an error of 90-degree orthogonality in the optical 90-degree hybrid by statistical computation processing in which the variances are used; producing the reference signal using the computed error of the branch ratio, the computed error of the 90-degree orthogonality, and the first and second monitoring beats; and calculating a time sequence in which the reference signal takes a defined value, and the correction step includes producing a continuous function from the sampled data using a sampling theorem; obtaining a value by substituting the time sequence for the continuous function and performing Fourier transform to the obtained value to obtain a value in which the reflectance distribution is corrected.

That is, in the optical frequency domain reflectometry, the nonlinearity of the output light emitted from the frequency sweep light source in sweeping is monitored to produce the reference signal reflecting the sweep nonlinearity of the output light. The measurement value obtained from the interference beat signal between the output light and the light backscattered from the measurement target can be corrected using the time sequence in which the time the reference signal takes a constant value is formed into the sequence. At this point, coherence property of the output light is monitored with the optical 90-degree hybrid, and the branch ratio of the optical 90-degree hybrid and the influence of the phase difference error are corrected. Accordingly, the measurement result in which the sweep nonlinearity of the frequency sweep light source is corrected can be obtained to perform the measurement with the high distance resolution by OFDR.

Specifically, the optical reflectometry according to the present invention is characterized an optical reflectometry, in which output light emitted from a frequency sweep light source is inputted to a measurement target to measure a reflectance distribution to a position of the measurement target, an optical frequency being swept in the frequency sweep light source, the optical reflectometry including a monitor step of obtaining a monitoring beat signal from monitoring light, the monitoring light being obtained by branching the output light; a measurement step of obtaining an interference beat signal between signal light and reference light, the signal light being backscattered from the measurement target, the reference light being obtained by branching the output light; and a correction step of generating a reference signal reflecting nonlinearity of the sweep and a phase noise of the frequency sweep light source from the monitoring beat signal obtained in the monitor step and correcting the reflectance distribution using the reference signal, the reflectance distribution being computed from the interference beat signal obtained in the measurement step, wherein, in the monitor step, the monitoring light is branched into two and inputted to a first coherence monitor unit and a second coherence monitor unit, the inputted light is branched into two, one of the pieces of branched light is delayed with delay amounts in which the first coherence monitor unit differs from the second coherence monitor unit, and the other piece of branched light and one of pieces of delayed branched light are multiplexed to obtain the monitoring beat signal.

The first coherence monitor unit and the second coherence monitor unit are delayed with delay amounts different from each other, so that the coherence property of the output light can be obtained in the integral multiple of the coherence length. Even in the propagation distance of the integral multiple of the coherence length, the sweep nonlinearity of the frequency sweep light source and the spread spectrum in the region exceeding the light source coherence length can be corrected with a small error by obtaining the coherence property. Therefore, the measurement can be performed with the high distance resolution by OFDR.

In the optical reflectometry in accordance with the present invention, preferably, assuming that $X_N(t)$ is the reference signal, the reference signal $X_N(t)$ is expressed as follows:

$$X_N(t) = \sum_{n=0}^{Int(N/K)-1} X_{Long}(t - n \cdot \tau_{Long}) + \sum_{m=0}^{Mod(N,K)-1} X_{Short}[t - Int(N/K) \cdot \tau_{Long} - m \cdot \tau_{Short}]$$ [Formula 1]

where $\tau_{Short}$ is the delay amount of the first coherence monitor unit, $X_{Short}(t)$ is a phase of the monitoring beat signal obtained by the first coherence monitor unit, $\tau_{Long}$ is the delay amount of the second coherence monitor unit, $X_{LONG}(t)$ is a phase of the monitoring beat signal obtained by the second coherence monitor unit, Int(N/K) is an integral portion of a quotient obtained by dividing N by K, and Mod(N,K) is a remainder of the quotient obtained by dividing N by K, and the delay amount $\tau_{Long}$ of the second coherence monitor unit is K (K is an integer) times the delay amount $\tau_{Short}$ of the first coherence monitor unit.

The delay amount of the second coherence monitor unit is K times the delay amount of the first coherence monitor unit, so that the error accumulated K times can be reduced to the one-time error.

Specifically, the optical reflectometer according to the present invention provides an optical reflectometer that inputs output light whose optical frequency is swept on a measurement target to measure a reflectance distribution to a position of the measurement target, the optical reflectometer including a frequency sweep light source that emits the output light; a first coherence monitor unit and a second coherence monitor unit that obtain monitoring beat signals from pieces of monitoring light, the pieces of monitoring light being obtained by branching the output light from the frequency sweep light source; a measuring unit that obtains an interference beat signal between signal light and reference light, the signal light being backscattered from the measurement target, the reference light being obtained by branching the output light from the frequency sweep light source; and an analysis unit that generates a reference signal reflecting nonlinearity of the sweep and a phase noise of the frequency sweep light source from the monitoring beat signals obtained by the first coherence monitor unit and the second coherence monitor unit and corrects the reflectance distribution using the reference signal, the reflectance distribution being computed from the interference beat signal obtained by the measuring unit, wherein the first coherence monitor unit and the second coherence monitor unit include a branching unit that branches the monitoring light into two; a delay unit that delays one of the pieces of branched light branched by the branching unit with delay amounts in which the first coherence monitor unit differs from the second coherence monitor unit; and a receiver that multiplexes the other piece of branched light branched by the branching unit and one of the pieces of delayed branched light of the delay unit to obtain the monitoring beat signal.

The first coherence monitor unit and the second coherence monitor unit are delayed with delay amounts different from each other, so that the coherence property of the output light can be obtained in the integral multiple of the coherence length. Even in the propagation distance of the integral multiple of the coherence length, the sweep nonlinearity of the frequency sweep light source and the spread spectrum in the region exceeding the light source coherence length can be corrected with a small error by obtaining the coherence property. Therefore, the measurement can be performed with the high distance resolution by OFDR.

In the optical reflectometer in accordance with the present invention, preferably, assuming that $X_N(t)$ is the reference signal, the reference signal $X_N(t)$ is expressed as follows:

$$X_N(t) = \sum_{n=0}^{Int(N/K)-1} X_{Long}(t - n \cdot \tau_{Long}) + \sum_{m=0}^{Mod(N,K)-1} X_{Short}[t - Int(N/K) \cdot \tau_{Long} - m \cdot \tau_{Short}]$$ [Formula 2]

where $\tau_{Short}$ is the delay amount generated by the delay unit in the first coherence monitor unit, $X_{Short}(t)$ is a phase of the monitoring beat signal obtained by the receiver in the first coherence monitor unit, $\tau_{Long}$ is the delay amount generated by the delay unit in the second coherence monitor unit, $X_{Long}$(t) is a phase of the monitoring beat signal obtained by the receiver in the second coherence monitor unit, Int(N/K) is an integral portion of a quotient obtained by dividing N by K, and Mod(N,K) is a remainder of the quotient obtained by dividing N by K, and the delay amount $\tau_{Long}$ of the second coherence monitor unit is K (K is an integer) times the delay amount $\tau_{Short}$ of the first coherence monitor unit.

The delay amount of the second coherence monitor unit is K times the delay amount of the first coherence monitor unit, so that the error accumulated K times can be reduced to the one-time error.

Advantageous Effects of Invention

Accordingly, the measurement can be performed by OFDR in the measurement distance exceeding a half of the light source coherence length, so that this invention can provide the optical reflectometry and optical reflectometer, in which the accurate measurement can be performed irrespective of the measurement distance.

Accordingly, the invention can provide the optical reflectometry and optical reflectometer, in which the distance resolution is enhanced.

BRIEF DESCRIPTION OF DRAWINGS

FIG. 2 is a view for explaining an influence of a phase noise of a frequency sweep light source on measurement.

FIG. 3 is a functional block diagram illustrating an optical reflectometer according to a first embodiment of the invention.

FIG. 5 is a view illustrating a graph of Formula (8)

FIG. 10 is a view for explaining processing in a second embodiment.

FIG. 11 is a view illustrating graphed results obtained in the second embodiment.

FIG. 15 is a view for explaining an influence of a phase noise of a frequency sweep light source on measurement.

FIG. 18 is a view illustrating a graph of Formula (36)

FIG. 24 is a view for explaining an influence of a phase noise of the frequency sweep light source 1 on measurement.

FIG. 26 is a functional block diagram illustrating the detailed optical reflectometer according to the sixth embodiment.

FIG. 27 is a time-series graph illustrating an example of a phase $X_{Short}(t)$ of a first monitoring beat signal.

REFERENCE SIGNS LIST

| | |
|---|---|
| 1 | frequency sweep light source |
| 2 | measurement light |
| 3 | reference light |
| 4 | measured optical circuit |
| 5 | signal light |
| 6 | receiver |
| 7 | sampling device |
| 8 | frequency analyzer |
| 9 | output light |
| 10 | monitoring light |
| 10a | first monitoring light |
| 10b | second monitoring light |
| 11 | measuring unit |
| 12 | coherence monitor unit |
| 12a | first coherence monitor unit |
| 12b | second coherence monitor unit |
| 12c | monitoring unit |
| 13 | analysis unit |
| 14, 14a, and 14b | delay unit |
| 15, 15a, and 15b | receiver |
| 16, 16a, 16b, and 16c | sampling device |
| 17 | clock generator |
| 18a, 18b, and 18c | data processing device |
| 19 | optical 90-degree hybrid |
| 20 | frequency sweep light source |
| 21 | optical frequency shifter |
| 22 | delay fiber |
| 23 | receiver |
| 96 | optical reflectometer |
| A, B, C, D, E, F, G, and H | optical directional coupler |

DESCRIPTION OF EMBODIMENTS

Exemplary embodiments of the invention will be described below with reference to the accompanying drawings. The following configurations of the embodiments are described by way of example only, and the present invention is not limited to the following embodiments.

Figure 1:
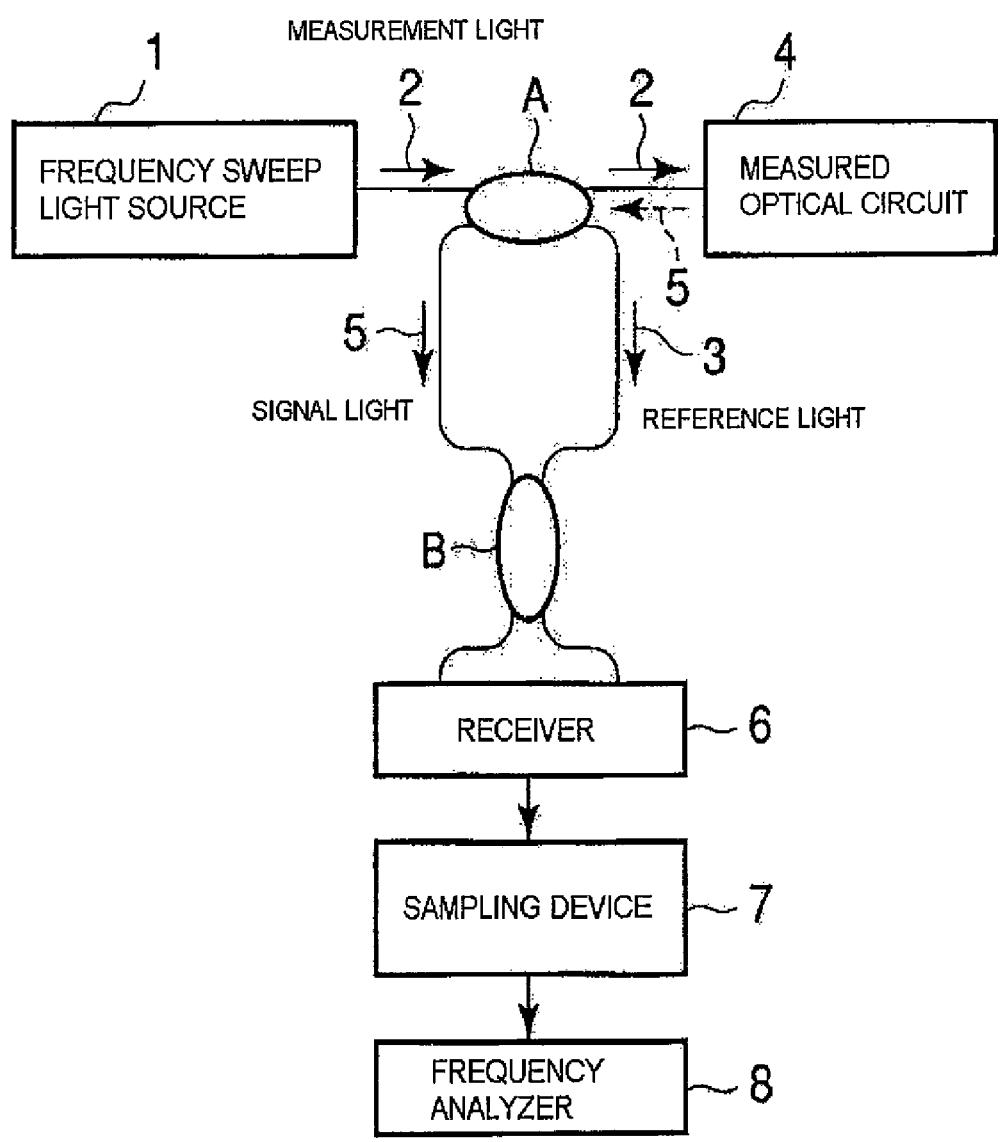
FIG. 1 is a view illustrating an example of a basic configuration of an optical reflectometer in which OFDR is adopted.

FIG. 1 is a view illustrating an example of a basic configuration of an optical reflectometer in which OFDR is adopted. Referring to FIG. 1, an optical directional coupler A branches output light emitted from a frequency sweep light source 1, and one of the pieces of branched light is used as reference light 3 while the other is inputted to a measured optical circuit 4. The optical directional coupler A takes out a signal light 5 backscattered in the measured optical circuit 4, an optical directional coupler B multiplexes the signal light 5 and the reference light 3, and a receiver 6 detects the multiplexed light. At this point, a sampling device 7 samples an interference beat signal generated by two-light-wave interference, and a frequency analyzer 8 analyzes the measured data to measure a backscattered light intensity distribution from each point in the measured optical circuit 4.

When a frequency of a measurement light 2 emitted from the frequency sweep light source 1 is swept linearly for a time T with a maximum optical frequency sweep width $\Delta F$, a frequency Fb of a beat signal, which is generated by the signal light 5 backscattered at a point X in the measured optical circuit 4, is given by Formula (3):

$$Fb = \gamma n \Delta L / c \quad \text{[Formula 3]}$$

where $\Delta L$ is an optical path length difference between the reference light 3 and the signal light 5 backscattered at the point X, $\gamma$ is an optical frequency sweep speed, n is a refractive index, and c is a light speed.

At this point, the relationship $\gamma = \Delta F/T$ holds. Distance resolution $\Delta z$ is given by Formula (4) using a spectral width $\Delta Fb$ of the received beat signal:

$$\Delta z = c\Delta Fb/2n\gamma \quad \text{[Formula 4]}$$

Formula (3) and Formula (4) holds unless the measurement distance exceeds a half of a light source coherence length. In the measurement distance that exceeds a half of the light source coherence length, the frequency Fb of the beat signal in Formula (3) is influenced by a phase noise of the frequency sweep light source. Therefore, the spectral width $\Delta Fb$ spreads up to a line width possessed by the frequency sweep light source, which making the measurement impossible. The reason the measurement becomes impossible will be described below.

Figure 2A:
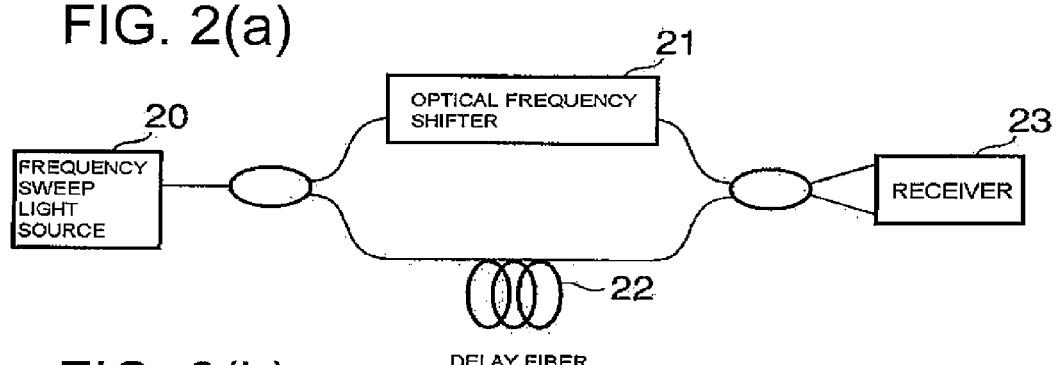
FIG. 2(a) illustrates a system for measuring a power spectrum.
Figure 2B:
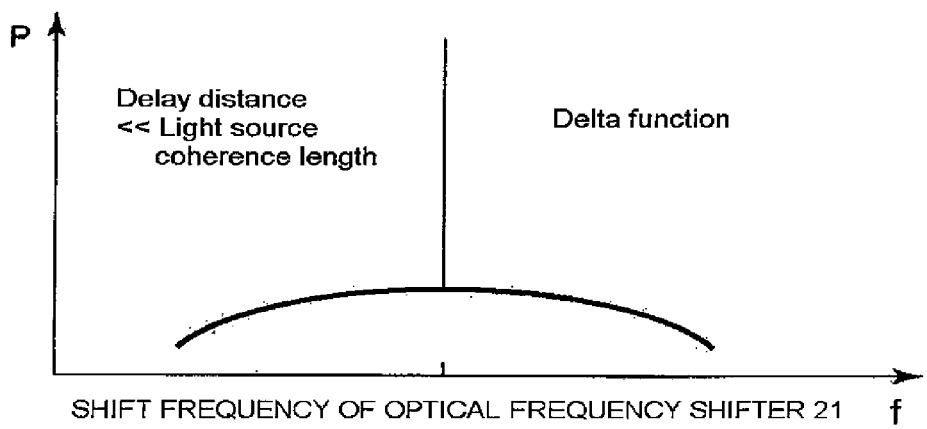
FIG. 2(b) illustrates a power spectrum when a delay distance is sufficiently shorter than a light source coherence length.
Figure 2C:
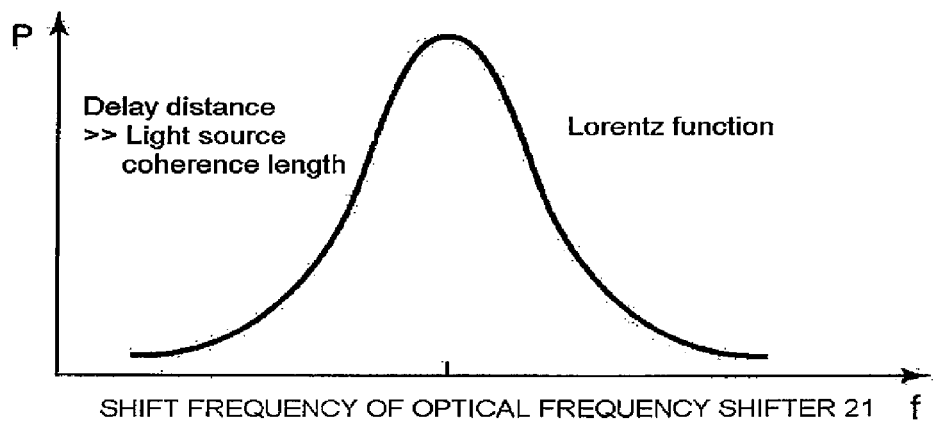
FIG. 2(c) illustrates a power spectrum when the delay distance is sufficiently longer than the light source coherence length.

FIG. 2 is a view illustrating an influence of the phase noise of the frequency sweep light source on the measurement. As illustrated in FIG. 2(a), an optical path from a frequency sweep light source 20 is branched into two, and an optical frequency shifter 21 is inserted in one of the branched optical paths while a delay fiber 22 is provided in the other optical path, thereby forming a Mach-Zehnder optical interferometer. When output light emitted from the frequency sweep light source 20 is ideal monochromatic light, a receiver 23 obtains a power spectrum having a delta-function-like peak in a shift frequency of the optical frequency shifter 21 irrespective of an optical path difference of the optical interferometer (FIG. 2(b)). However, actually the power spectrum of the frequency sweep light source 20 has a finite width. When the frequency sweep light source 20 is a semiconductor laser, an FM noise is dominant in the phase noise, and the power spectrum has a Lorentz-like width (FIG. 2(c)).

When the optical path difference is equal to or lower than the light source coherence length (delay distance<<light source coherence length), the power spectrum of output current has the delta-function-like peak in the shift frequency of the optical frequency shifter 21. On the other hand, when the optical path difference is more than the light source coherence length (delay distance>>light source coherence length), a noise floor is gradually raised, and the power spectrum finally has the Lorentz shape as illustrated in FIG. 2(c). Accordingly, in the measurement distance that exceeds a half of the light source coherence length, the noise component becomes prominent to hardly perform the accurate measurement.

First Embodiment

FIG. 3 is a functional block diagram illustrating an optical reflectometer according to this invention. This optical reflectometer performs the OFDR measurement of the reflectance distribution of the measured circuit in the propagation direction. Referring to FIG. 3, an optical directional coupler C branches output light 9 emitted from the frequency sweep light source 1, one of the pieces of branched light is inputted as measurement light 2 on a measuring unit 11, and the other piece of branched light is inputted as monitoring light 10 on a coherence monitor unit 12. The measurement result measured with the measuring unit 11 and the monitor result measured with the coherence monitor unit 12 are fed into an analysis unit 13, and the backscattered light intensity distribution in the measured circuit (in the measuring unit 11) is obtained by arithmetic processing.

The measuring unit 11 detects the interference beat signal between the output light emitted from the frequency sweep light source 1 and the light backscattered from the measured circuit. For example, the coherence monitor unit 12 monitors the coherence property of the output light 9 by delayed self-homodyne detection. The analysis unit 13 produces a reference signal based on a monitoring beat signal obtained from the coherence property of the output light 9, and the analysis unit 13 obtains measurement result based on the reference signal. The measurement result includes measurement region exceeding a half of the coherence length of the frequency sweep light source 1.

Figure 4:
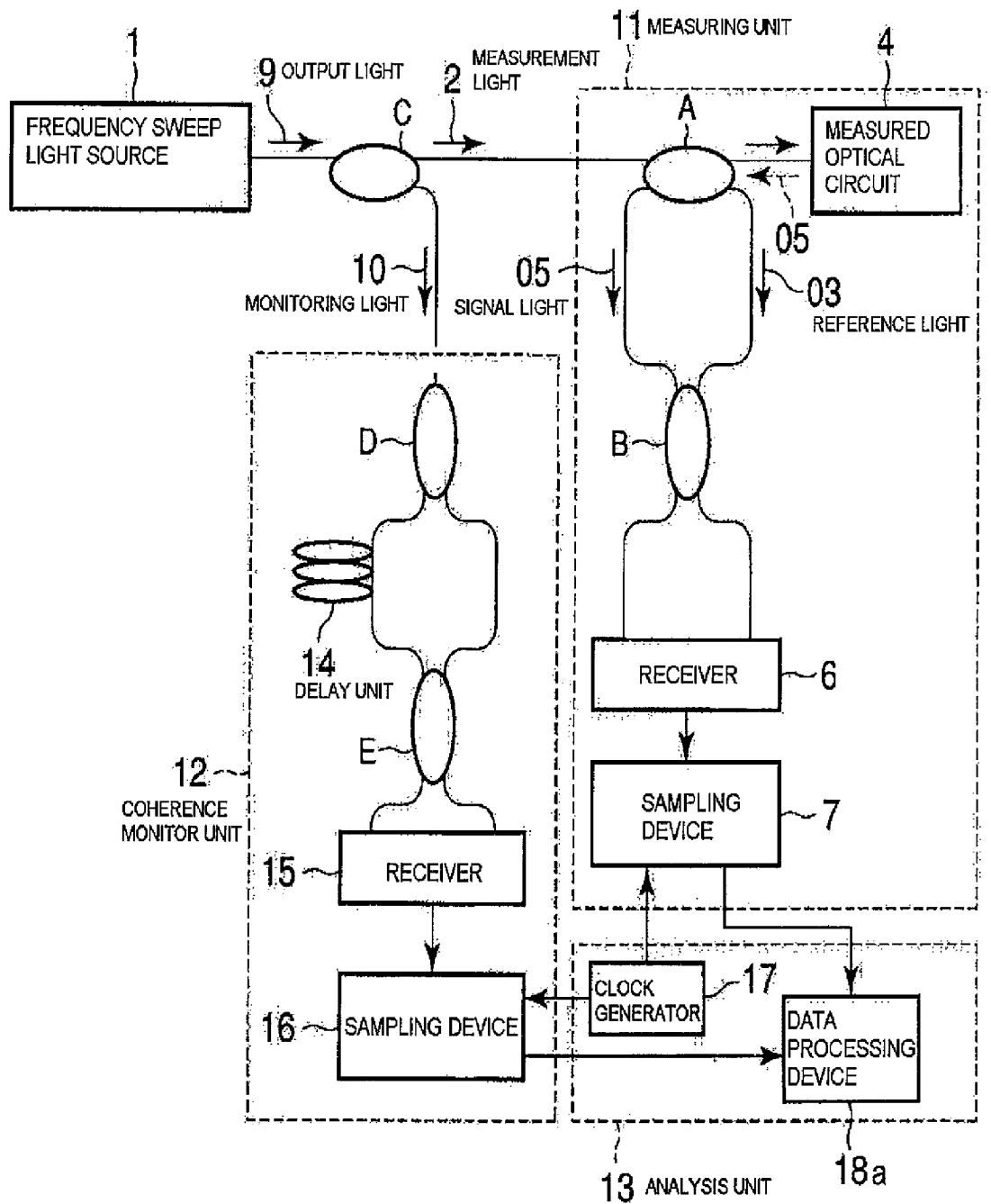
FIG. 4 is a functional block diagram illustrating the detailed optical reflectometer of the first embodiment.

FIG. 4 is a functional block diagram illustrating the detailed optical reflectometer of FIG. 3. An optical directional coupler D branches the monitoring light inputted to the coherence monitor unit 12 into two, a delay unit 14 delays only one of the pieces of branched light, and then an optical directional coupler E multiplexes the pieces of branched light. A receiver 15 detects the multiplexed light to produce the monitoring beat signal, and the monitoring beat signal is fed into a sampling device 16. The sampling device 16 samples a waveform of the monitoring beat signal in synchronization with a clock of a clock generator 17 included in the analysis unit 13, and the sampling device 16 feeds the sampled data into a data processing device 18a of the analysis unit 13.

The processing similar to that of FIG. 1 is performed to the measurement light 2 inputted to the measuring unit 11, and the interference beat signal is fed into the sampling device 7. The sampling device 7 samples the waveform of the interference beat signal in synchronization with the clock of the clock generator 17, that is, at intervals synchronized with the sampling device 16. The obtained sampled data is fed into the data processing device 18a.

Quantitative description will be made using mathematical formulas. An electric field amplitude of the output light of the frequency sweep light source 1 is given by Formula (5):

$$E(t)=A\exp\{j[2\pi f(t)t+\theta(t)]\}=A\exp[j\Phi(t)] \quad \text{[Formula 5]}$$

Where A is amplitude (constant), f(t) is a swept optical frequency of the frequency sweep light source, θ(t) is a fluctuating phase term, and Φ(t) is a total phase.

A delay fiber having a light source coherence length $L_c$ is provided in the delay unit 14 of FIG. 3. A delay time $\tau_c$ of the delay unit 14 is given by Formula (6):

$$\tau_c = nL_c/c \quad \text{[Formula 6]}$$

On the basis of the delay time $\tau_c$ of the delay unit 14, which is obtained by Formula (6), the monitoring beat signal fed into the data processing device 18a is given by Formula (7)

$$I=|E(t)+E(t-\tau_c)|^2 \propto \cos[\Phi(t)-\Phi(t-\tau_c)] \quad \text{[Formula 7]}$$

The phase of the monitoring beat signal is given as $X_1(t)$ in Formula (8):

$$X_1(t)=\Phi(t)-\Phi(t-\tau_c) \quad \text{[Formula 8]}$$

Figure 5A:
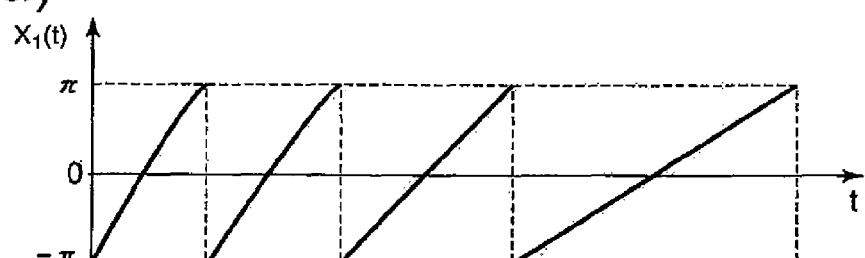
FIG. 5(a) illustrates the case in which a phase of a monitoring beat signal ranges from $-\pi$ to $+\pi$.
Figure 5B:
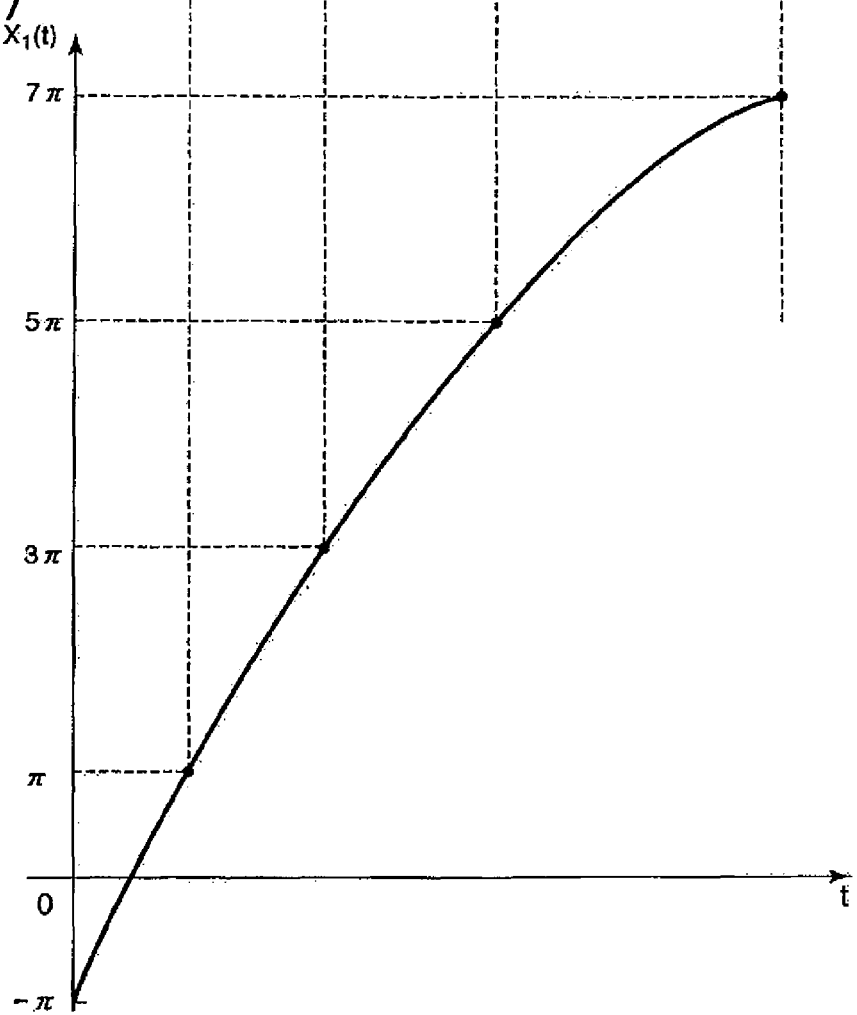
FIG. 5(b) illustrates the case in which an integral multiple of $2\pi$ is added to the phase of the monitoring beat signal.

FIG. 5 is a graph of Formula (8). As illustrated in FIG. 5(a), $X_1(t)$ of Formula (8) takes a value ranging from $-\pi$ to $+\pi$ to a time t. The integral multiple of $2\pi$ is sequentially added in a section from an initially replicated point from $+\pi$ to $-\pi$ to a next replicated point from $+\pi$ to $-\pi$, which allows $X_1(t)$ to be expressed as a smooth function in which the discontinuous point does not exist as illustrated in FIG. 5(b).

The data processing device 18a corrects the measurement distance from 0 to $3L_c/4$ with the continuous function $X_1(t)$ as the reference signal.

A time the continuous function $X_1(t)$ takes a value of $MS_1$ is obtained as a sequence $t_{M1}$. Where M is a natural number (M=1, 2, 3, ... ). As described later, it is necessary that $S_1$ be set so as to have a sufficient Nyquist sampling rate in sampling a measurement signal $Y_n$. Therefore, anti-aliasing filtering processing is performed to the measurement signal $Y_n$ to prevent aliasing of FFT processing. Specifically, low-pass filtering processing is performed to the measurement signal $Y_n$. A passage upper limit frequency of the filter used in the low-pass filtering processing is determined according to the necessary measurement distance. The measurement signal $Y_n$ to which the anti-aliasing filtering processing is already performed is noted by $Y_{n\,Anti-aliasing1}$. Because the measurement signal $Y_n$ is data sampled at equal intervals, $Y_{n\,Anti-aliasing1}$ is discrete data having equal intervals. It is assumed that $1/W$ [second] is the interval.

It is assumed that Y(t) is a function of a time t, and it is assumed that Y(t) has a frequency component ranging from 0 to W/2 while not including a frequency component that is equal to or more than W/2. The whole of function is solely determined by a sampling theorem. That is, Y(t) is given by Formula (9):

$$Y(t) = \sum_{n=-\infty}^{+\infty} Y_{n\,Anti-aliasing1} \frac{\sin\pi(Wt-n)}{\pi(Wt-n)} \quad \text{[Formula 9]}$$

$Y(t_{M1})$ can be obtained by substituting the time sequence $t_{M1}$ for Formula (9). Fast Fourier Transform (FFT) processing is performed to $Y(t_{M1})$ to transform a time axis into a space axis, and the reflectance can be computed at each position corresponding to the propagation distance.

The use of the monitoring beat signal expressed by Formula (7) or Formula (8) can optimally correct the measurement result by the existing technique, when a distance from the frequency sweep light source 1 to the reflecting point is equal to or lower than $L_c/2$, that is, with respect to the signal light backscattered from the point located within $L_c/2$ from the frequency sweep light source 1 in the measured optical circuit 4. However, a correction error is increased for the measured circuit having the distance longer than $L_c/2$.

The use of phase information expressed by Formula (10) can optimally correct the beat signal that is generated by the signal light backscattered from the point N times (N is an integer) $L_c/2$ in the measured optical circuit 4. Because the optical propagation distance has one way of $L_c/2$, the round-trip coherence length becomes $L_c$.

$$X_N(t)=\Phi(t)-\Phi(t-N\tau_c) \quad \text{[Formula 10]}$$

Formula (10) can be produced using Formula (II):

$$X_N(t)=X_1(t)+X_1(t-\tau_c)+X_1(t-2\tau_c)+\ldots+X_1\{t-(N-1)\tau_c\} \quad \text{[Formula 11]}$$

Figure 6:
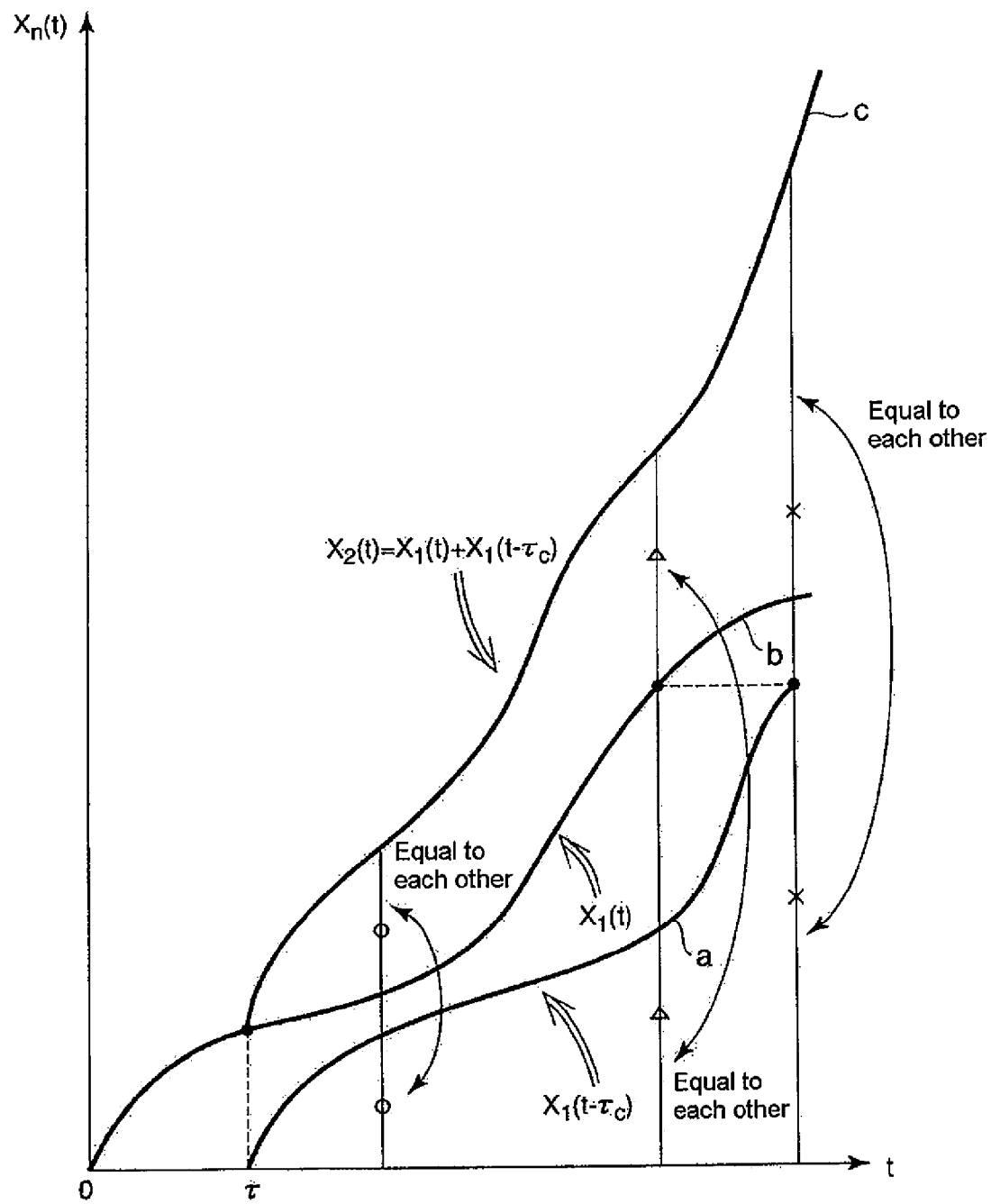
FIG. 6 is a view illustrating that new phase information can be produced by utilizing Formula (11).

FIG. 6 is a view illustrating that new phase information can be produced by utilizing Formula (11). FIG. 6 schematically illustrates a basis of Formula (11). A curve b of FIG. 6 indicates a phase $X_1(t)$ of the monitoring beat signal, and a curve a indicates a phase $X_1(t-\tau_c)$ to which $\tau_c$-time delay processing is performed. A curve c of FIG. 6 indicates $X_2(t)$ produced by utilizing the technique, that is, coupling producing method, and $X_2(t)$ is obtained as follows:

$$X_2(t)=X_1(t)+X_1(t-\tau_c)$$

The time the continuous function $X_N(t)$ takes a value $M \cdot S_N$ is obtained as a sequence $t_{MN}$. Where M is a natural number (M=1, 2, 3, ... ). As described later, it is necessary that $S_N$ be set so as to have the sufficient Nyquist sampling rate in sampling the measurement signal $Y_n$. Therefore, the anti-aliasing filtering processing is performed to the measurement signal $Y_n$ to prevent the aliasing of the FFT processing. Specifically, the low-pass filtering processing is performed to the measurement signal $Y_n$ using a low-pass filter having a passage upper limit frequency of Formula (12):

$$\text{passage upper limit frequency} = \frac{2N+1}{2N} \text{Max}\left[\frac{dX_n(t)}{dt}\right] \quad \text{[Formula 12]}$$

When $\text{Max}[dX_n(t)/dt]$ is a maximum value in the whole data region from $(2N-1)L_c/4$ to $(2N+1)L_c/4$. The measurement signal $Y_n$ to which the filtering processing is already performed is noted by $Y_{n\ Anti-aliasingN}$. $Y_{n\ Anti-aliasing1}$ of Formula (9) is replaced by $Y_{nAnti-anasingN}$ to substitute the time sequence $t_{MN}$, which allows $Y(t_{MN})$ to be obtained. When the Fast Fourier Transform (FFT) processing is performed to $Y(t_{MN})$, the reflectance can be computed at each position corresponding to the propagation distance. Further, the measurement result near the point at the distance $NL_c/2$ is optimally corrected.

Figure 7:
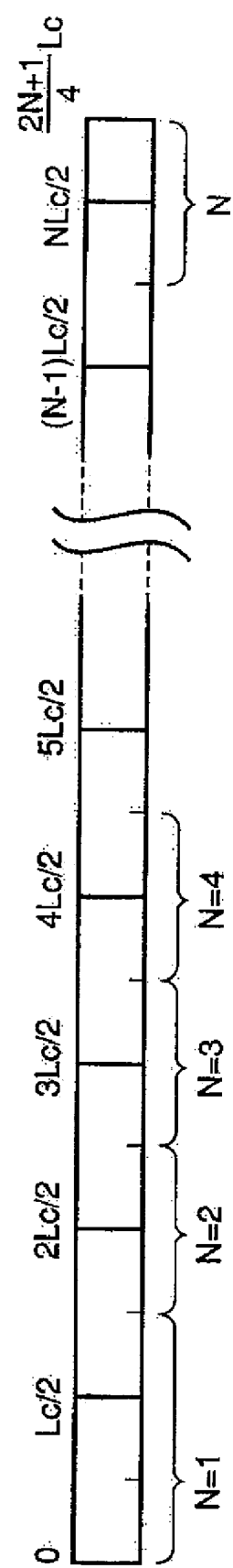
FIG. 7 is an image for explaining processing for sampling a beat signal in multiples of a distance $L_c/2$.

FIG. 7 is an image for explaining processing for sampling the beat signal in multiples of the distance $L_c/2$. The measurement distance ranging from 0 to $3L_c/4$ can be corrected from the phase information $X_1(t)$. The measurement distance ranging from $3L_c/4$ to $5L_c/4$ can be corrected from the phase information $X_2(t)$. Similarly the measurement distance ranging from $(2N-1)L_c/4$ to $(2N+1)Lc/4$ can be corrected from the phase information $X_N(t)$. It is necessary that the correction processing be performed N times. However, the processing for obtaining the necessary data is performed only once.

In obtaining the time sequences $t_{M1}, t_{M2}, \ldots, t_{MN}$ from the pieces of phase information $X_1(t), X_2(t), \ldots, X_N(t)$ the necessary intervals $S_1, S_2, \ldots, S_N$ is limited to the Nyquist sampling rate at which the measurement signal $Y(t)$ is sampled. The phase information $X_N(t)$ is obtained from a signal beaten in inserting the delay fiber having the length of $NL_c$, and the measurement signal $Y(t)$ is obtained by measuring the fiber having the round-trip length of $(2N+1)L_c/2$. The interval $S_N$ satisfying the Nyquist sampling rate is given by Formula (13):

$$S_N \leq 2N\pi/(2N+1) \quad \text{[Formula 13]}$$

Figure 8:
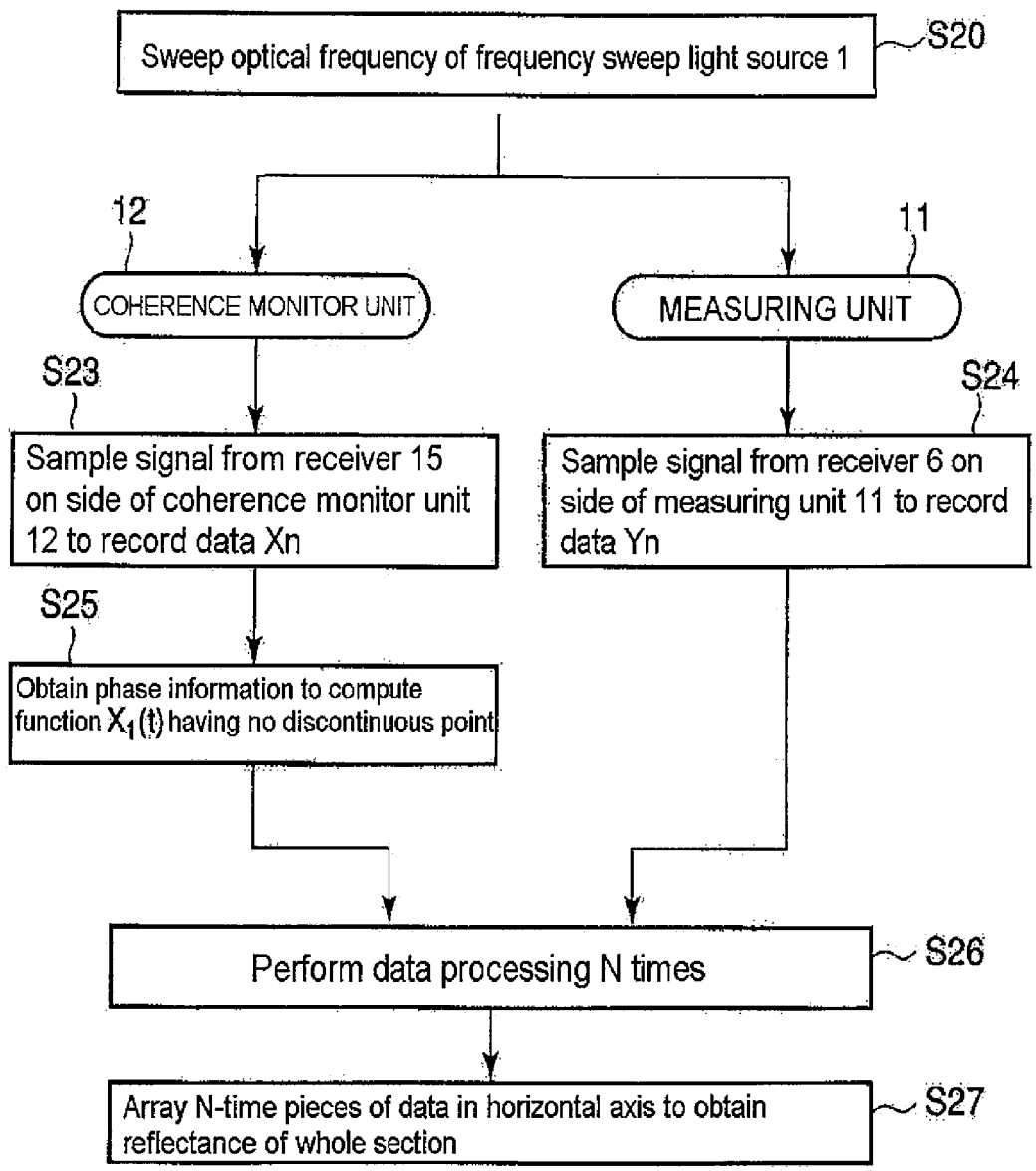
FIG. 8 is a flowchart illustrating a processing procedure in the optical reflectometer of FIG. 4.

FIG. 8 is a flowchart illustrating a processing procedure in the optical reflectometer of FIG. 4. In step S20, the optical frequency of the frequency sweep light source 1 is swept. The coherence monitor unit 12 samples the monitoring beat signal supplied from the receiver 15, and the sampled data $X_n$ is recorded in an internal memory (not illustrated) (step S23). The data processing device 18a computes the function (continuous function) $X_1(t)$ having no discontinuous point as illustrated in FIG. 5(b) in order to obtain the phase of the sampled data $X_n$ (step S25).

On the other hand, the measuring unit 11 samples the interference beat signal supplied from the receiver 6 at equal intervals, and the sampled data $Y_n$ is recorded in the internal memory (not illustrated) (step S24).

The data processing device 18a performs data processing including both the sampling processing and the FFT processing N times by utilizing the function $X_1(t)$ received from the coherence monitor unit 12 and the data $Y_n$ received from the measuring unit 11. The obtained data $FFT_N$ is recorded (step S26). The data processing device 18a computes the measurement result by utilizing the pieces of data $FFT_1, FFT_2, \ldots, FFT_N$ (step S27).

Figure 9:
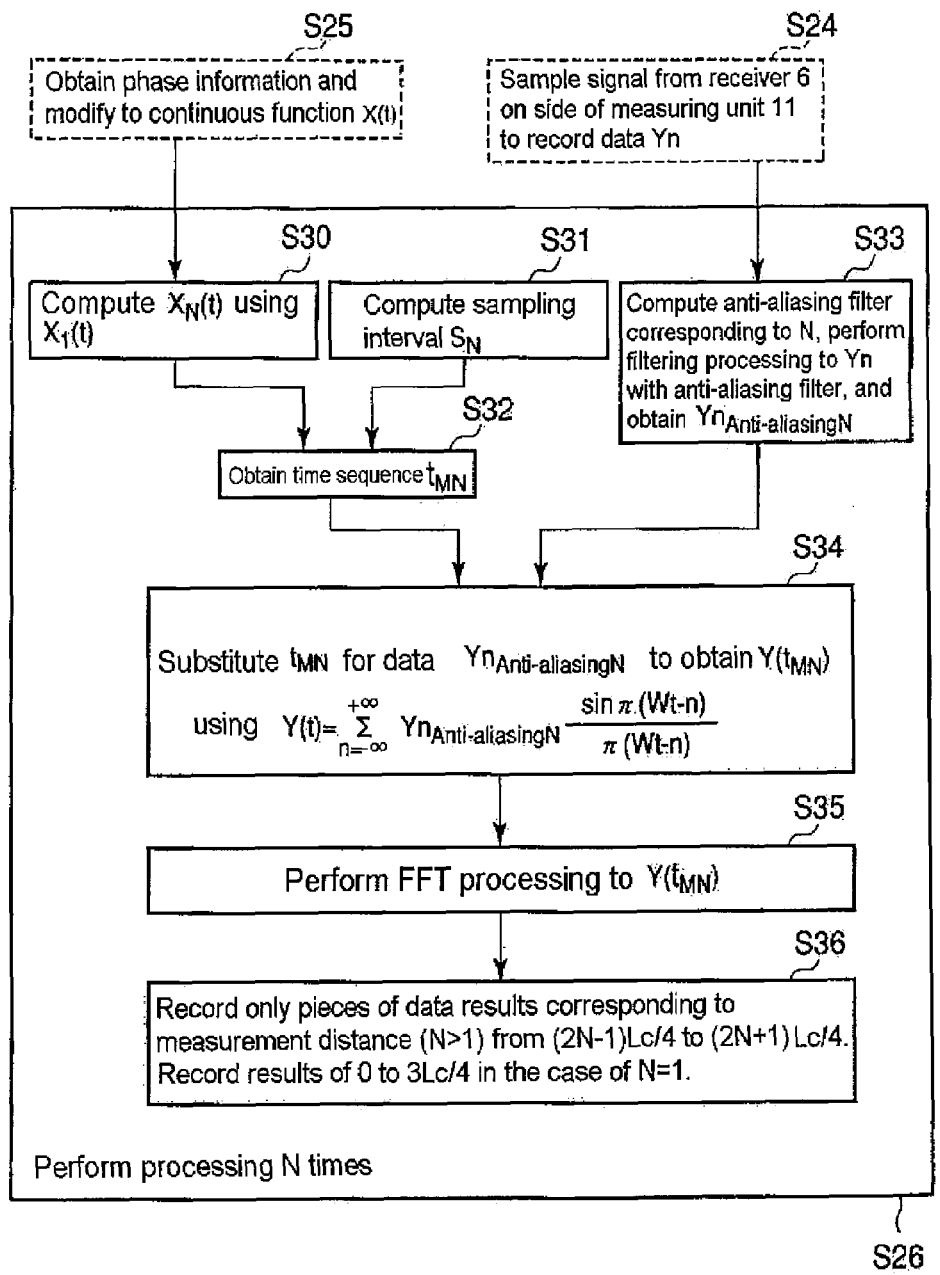
FIG. 9 is a flowchart illustrating the processing procedure performed by the optical reflectometer of FIG. 4 in the first embodiment.

FIG. 9 is a flowchart illustrating the detailed procedure in step S26 of FIG. 8. In step S26, the data processing device 18a applies Formula (11) to $X_1(t)$ obtained in step S25 in order to compute $X_N(t)$ (step S30). In the case of N=1, the $X_1(t)$ is directly obtained. Concurrently the data processing device 18a computes the sampling interval $S_N$ using Formula (13) (step S31). The time sequence $t_{MN}$ that is equal to the value of $MS_N$ is obtained from the continuous function $X_N(t)$ (step S32).

On the other hand, the anti-aliasing filter corresponding to N is obtained in each $Y_n$ obtained in step S24, and the filtering processing is performed to $Y_n$ using a filter coefficient of the anti-aliasing filter. That is, the filtering processing is performed to $Y_n$ with the low-pass filter (anti-aliasing filter) having the passage upper limit frequency $((2N+1)/2N)\cdot\text{Max}[dXn(t)/dt]$ corresponding to N expressed in Formula (12), thereby obtaining $Y_{nAnti-aliasingN}$ (step S33).

Using the time sequence $t_{MN}$ obtained in step S32, the data processing device 18a computes $Y(t_{MN})$ based on $Y_n$ after the filtering processing (step S34). In step S34, Formula (9) is applied to $Y_{n\ Anti-aliasingN}$ to substitute $t_{MN}$, thereby obtaining $Y(t_{MN})$.

In the pieces of computed data, only the pieces of data corresponding to the measurement distance (N>1) from $(2N-1)L_c/4$ to $(2N+1)L_c/4$ are recorded as the data $FFT_N$ (step S36). In the case of N=1, the results of 0 to $3L_c/4$ are recorded. The processing in step S26 (step S30 to step S36) can be repeated N times to obtain the pieces of data $FFT_1, FFT_2, \ldots, FFT_N$. All of the measurement can be performed in the distance of 0 to $(2N+1) L_c/4$ by connecting the pieces of data $FFT_1, FFT_2, \ldots, FFT_N$ in the horizontal axis on the graph.

Thus, in this embodiment, the coherence monitor unit 12 is provided to monitor the coherence property of the frequency sweep light source 1, and the measurement result of the measuring unit ills corrected based on the monitor result. That is, the monitoring beat signal of the light emitted from the light source is generated by the delayed self-homodyne detection in the coherence monitor unit 12, the reference signal of the beat signal is produced, the beat signal of the measuring unit 11 is sampled based on the produced reference signal, and the FFT processing is performed to the obtained sequence to obtain the measurement result.

Therefore, the result in which the FFT processing is performed to the interference beat signal can be prevented from spreading in a divergent manner in the measurement region exceeding the light source coherence length. Accordingly, the optical reflectometry and optical reflectometer, in which the measurement can be performed by OFDR in the measurement distance exceeding the light source coherence length without any limitation of the light source coherence length, can be provided. That is, the optical reflectometry and optical reflectometer, in which the measurement can be performed by OFDR in the measurement distance exceeding a half of the light source coherence length, can be provided.

Second Embodiment

In the first embodiment, the optimum correction can be performed to the beat signal that is generated by the signal light backscattered from the point of $NL_c/2$ in the measured optical circuit 4. However, the correction accuracy is deteriorated as the measurement point is moved away from $NL_c/2$. In a second embodiment, a processing method in which the deterioration of the correction accuracy can be avoided will be described. Although the basic configuration of the apparatus of this embodiment is similar to that of FIG. 4, the apparatus of the second embodiment differs from that of FIG. 4 in processing performed by the data processing device 18a.

As described in the first embodiment, the correction processing in which Formula (11) is used becomes optimum at the distance $NL_c/2$. After the correction, a beat frequency $F_N$ corresponding to the distance $NL_c/2$ becomes a constant, and the beat frequency $F_N$ is given by Formula (14):

$$F_N = f_N(t) \cdot \beta(t) \qquad \text{[Formula 14]}$$

Where $f_N(t)$ is a temporal differentiation $X'_N(t)(=dX_N(t)/dt)$ of Formula (11) and $f_N(t)$ indicates a momentary beat frequency, and $\beta(t)$ is a correction term from the reference signal. Even if the correction is performed, the correction accuracy is deteriorated as the measurement point is moved away from the distance $NL_c/2$. The deterioration factor will be described.

Assuming that $f_N(t)-\Delta f(t)$ is a frequency of the beat signal that is generated by the signal light backscattered from a point $(NL_c/2-\Delta L)$ distant from the distance $NL_c/2$ by $\Delta L$, the frequency after the correction is given by Formula (15):

$$f = [f_N(t) - \Delta f(t)] \cdot \beta(t) \qquad \text{[Formula 15]}$$
$$= F_N - \frac{\Delta f(t)}{f_N(t)} F_N$$

A frequency difference $\Delta f(t)$ between the beat signals that are generated by the signal lights backscattered from the point of the distance $NL_c/2$ and the point of the distance $(NL_c/2-\Delta L)$ is given by Formula (16):

$$\Delta f(t) = \alpha_N(t) \cdot \Delta \tau \qquad \text{[Formula 16]}$$

At this point, the relationship $\Delta\tau = \Delta L \cdot n/c$ holds. $\alpha_N(t)$ is a rate of change in beat frequency corresponding to a reflecting point located at the distance $NL_c/2$, and $\alpha_N(t)$ is given by Formula (17). A numerator on a right side of Formula (17) is a temporal differentiation of $X_1(t)$.

$$\alpha_N(t) = \frac{X'_1(t)}{\tau_C} \qquad \text{[Formula 17]}$$

Accordingly, when the correction is performed using the reference signal $X_N(t)$ a beat frequency $f$ corresponding to the measurement point of the distance $(NL_c/2-\Delta L)$ is given by Formula (18):

$$f = F_N - \frac{\Delta f(t)}{f_N(t)} F_N \qquad \text{[Formula 18]}$$
$$= F_N - F_N \cdot \frac{X'_1(t)}{X'_N(t)} \cdot \frac{\Delta \tau}{\tau_C}$$

As can be seen Formula (18), because a coefficient $X'_1(t)/X'_N(t)$ exists, the correction accuracy is deteriorated as the measurement point is moved away from the point $NL_c/2$. Therefore, in this embodiment, the data processing is performed by the following technique to avoid the deterioration of the correction accuracy.

First the case in which the measurement point $NL_c/2-\Delta L$ is located nearer than the point $NL_c/2$ is discussed. $\Delta L$ is more than zero. At this point, f is lower than $F_N$ as illustrated in Formula (18). That is, the signal $Y(t_{MN})$ includes a component lower than $F_N$ as the beat signal that is generated by the signal light backscattered from the point located in the range of $(2N-1)L_c/4$ to $NL_c/2$.

Figure 10A:
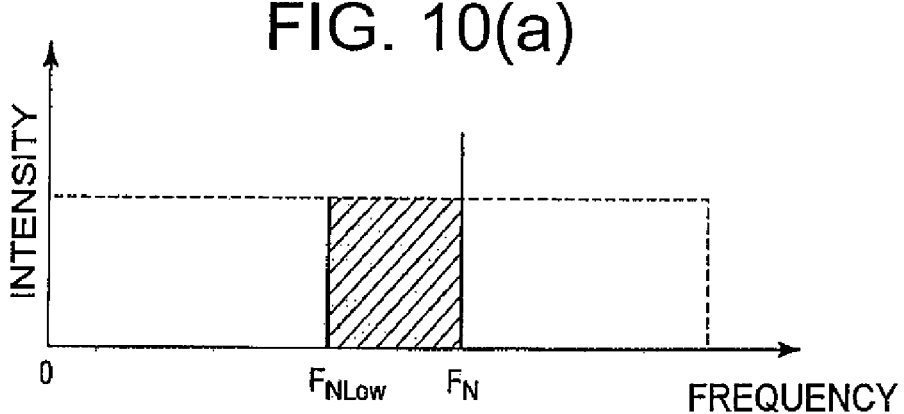
FIG. 10(a) illustrates a filtering frequency when a measurement point $NL_c/2-\Delta L$ is located nearer than $NL_c/2$.

As illustrated in FIG. 10(a), the filtering is performed to the signal $Y(t_MN)$ using the bandpass filter to extract the components corresponding to the distance ranging from $(2N-1)L_c/4$ to $NL_c/2$. Assuming that $F_N$ is the passage upper limit frequency of the bandpass filter, a passage lower limit frequency $F_{NLow}$ is given by Formula (19):

$$F_{NLOW} = \text{Min}\left\{F_N - \frac{F_N \cdot X'_1(t)}{2X'_N(t)}\right\} \qquad \text{[Formula 19]}$$

The frequency of $F_N - F_N \cdot X'_1(t)/[2X'_N(t)]$ in a parenthesis on the right side of Formula (19) is a frequency of the beat signal that is generated by the signal light backscattered from the point of the distance $(2N-1)L_c/4$. Min{ } indicates a minimum value of the frequency of $F_N - F_N \cdot X'_1(t)/[2X'_N(t)]$.

Figure 10B:
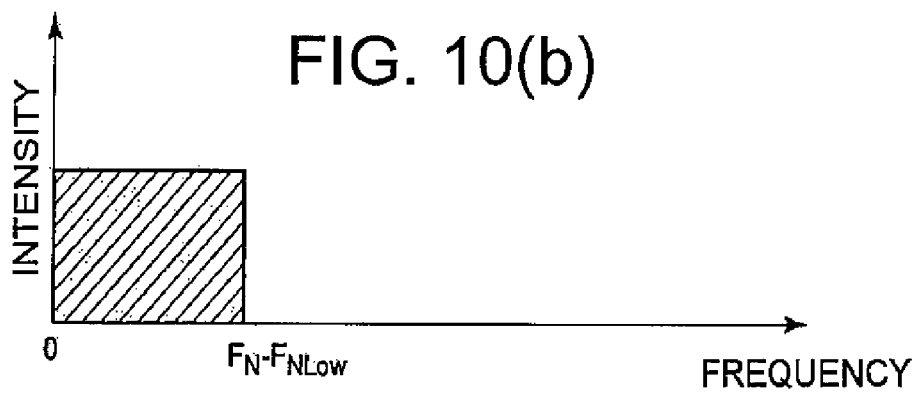
FIG. 10(b) illustrates a frequency after multiplex processing is performed to a signal filtered at the frequency of FIG. 10(a)

A baseband signal can be obtained by multiplexing the filtered signal and a single wave $\cos(2\pi F N t)$. As illustrated in FIG. 10(b), a frequency of a signal $D_{NLow}(t)$ obtained by the multiplexing processing ranges from 0 to $(F_N - F_{NLow})$. A frequency $f\Delta L$ corresponding to the point at a distance of $\Delta L$ from the point $NL_c/2$ is given by Formula (20):

$$f_{\Delta L} = F_N \cdot \frac{X'_1(t)}{X'_N(t)} \cdot \frac{\Delta \tau}{\tau_C} = F_N \cdot \frac{X'_1(t)}{X'_N(t)} \cdot \frac{\Delta \tau}{L_C} \qquad \text{[Formula 20]}$$

Figure 11A:
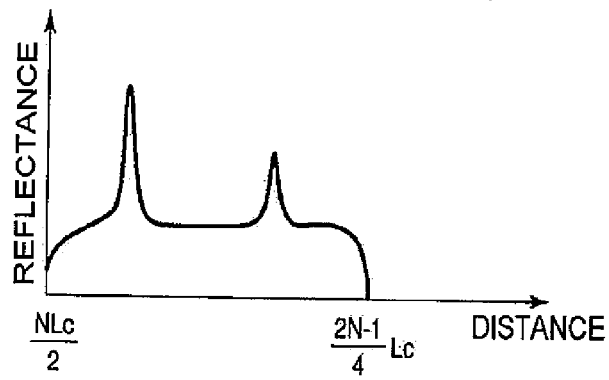
FIG. 11(a) illustrates the case in which a signal $D_{NLow}(t)$ is sampled at sampling intervals S expressed by Formula (21)

Formula (20) shows that the beat frequency corresponding to the point at a distance of $\Delta L$ from $NL_c/2$ is temporarily fluctuated by the coefficient. $X'_1(t)/X'_N(t)$. Accordingly, the signal $D_{NLow}(t)$ to which the multiplexing processing is performed is sampled at sampling intervals S expressed by Formula (21), the correction can be performed to the coefficient $X'_1(t)/X'_N(t)$. When the result in which the FFT processing is performed to the pieces of sampled data is graphed, the pieces of sampled data correspond to the distance of $NL_c/2$ to $(2N-1)L_c/4$ as illustrated in FIG. 11(a). The sampling interval S is expressed by Formula (21):

$$S = \frac{1}{2 \times F_N \cdot \frac{X'_1(t)}{2X'_N(t)}} = \frac{X'_N(t)}{F_N \cdot X'_1(t)} \qquad \text{[Formula 21]}$$

S of Formula (21) means a minimum value of the sampling rate necessary for the sampling. The sampling is performed well when the sampling rate is more than S, that is, when the sampling interval is lower than S. The sampling is performed well when Formula (22) is satisfied. Where A is a constant (0<=A<=1).

$$S = A \times \frac{X'_N(t)}{F_N \cdot X'_1(t)} \qquad \text{[Formula 22]}$$

Then the case in which the measurement point $NL_c/2+\Delta L$ is located far away from the point $NL_c/2$ is discussed. Similarly, $\Delta L$ is more than zero. At this point, f is more than $F_N$. That is, the signal $Y(t_{MN})$ includes a component more than $F_N$ as the beat signal that is generated by the signal light backscattered from the point located in the range of $NL_c/2$ to $(2N+1)L_c/4$.

Figure 10C:
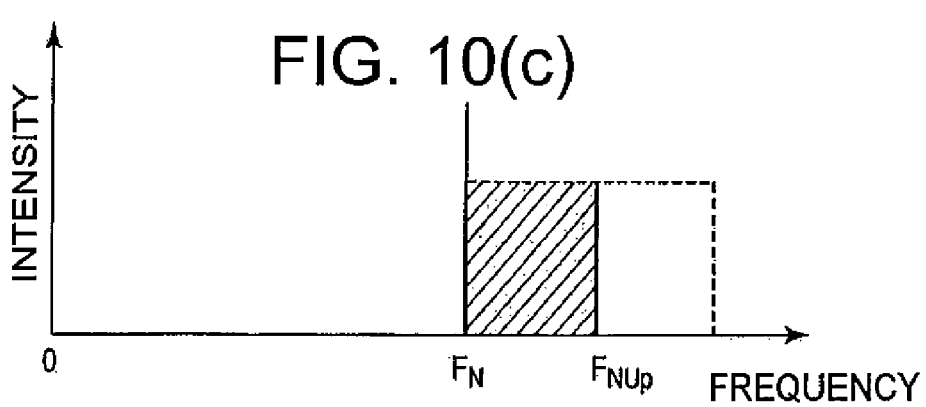
FIG. 10(c) illustrates a filtering frequency when a measurement point $NL_c/2+\Delta L$ is far away from $NL_c/2$.

As illustrated in FIG. 10(c), the filtering is performed to the signal Y($t_{MN}$) using the bandpass filter to extract the components corresponding to the distance ranging from $NL_c/2$ to $(2N+1)L_c/4$. Assuming that $F_{NUp}$ is the passage upper limit frequency of the bandpass filter, and FN is the passage lower limit frequency, a passage upper limit frequency $F_{NUp}$ is given by Formula (23):

$$F_{NUp} = \text{Max}\left\{F_N + \frac{F_N \cdot X'_1(t)}{2X'_N(t)}\right\} \quad \text{[Formula 23]}$$

The frequency of $F_N + F_N \cdot X'_1(t)/[2X'_N(t)]$ in a parenthesis on the right side of Formula (23) is a frequency of the beat signal that is generated by the signal light backscattered from the point of the distance $(2N+1)L_c/4$. Max{ } indicates maximum value of the frequency of $F_N + F_N \cdot X'_1(t)/[2X'_N(t)]$.

Figure 10D:
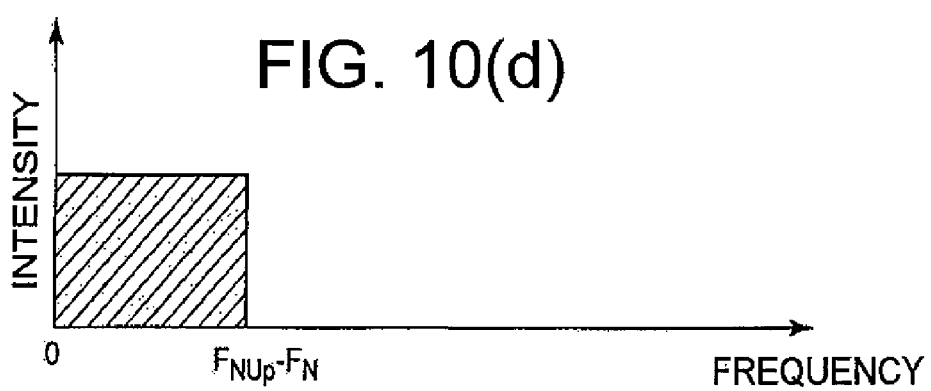
FIG. 10(d) illustrates a frequency after multiplex processing is performed to a signal filtered at the frequency of FIG. 10(c).
Figure 11B:
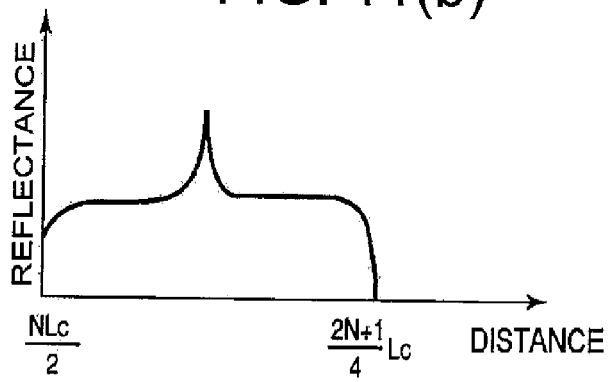
FIG. 11(b) illustrates the case in which a signal $D_{NUp}(t)$ is sampled at sampling intervals S expressed by Formula (21)

A baseband signal can be obtained by multiplexing the filtered signal and the single wave $\cos(2\pi FNt)$. As illustrated in FIG. 10(d), a frequency of a signal $D_{NUp}(t)$ obtained by the multiplexing processing ranges from 0 to $(F_{NUp}-F_N)$. Similarly the correction can be performed to the coefficient $X'_1(t)/X'_N(t)$ when the signal $D_{NUp}(t)$ to which the multiplexing processing is performed is sampled at sampling intervals S expressed by Formula (21). When the result in which the FFT processing is performed to the sampled data is graphed, the pieces of data exactly corresponding to the distance ranging from $NL_c/2$ to $(2N+1)L_c/4$ are obtained as illustrated in FIG. 11(b).

Figure 11C:
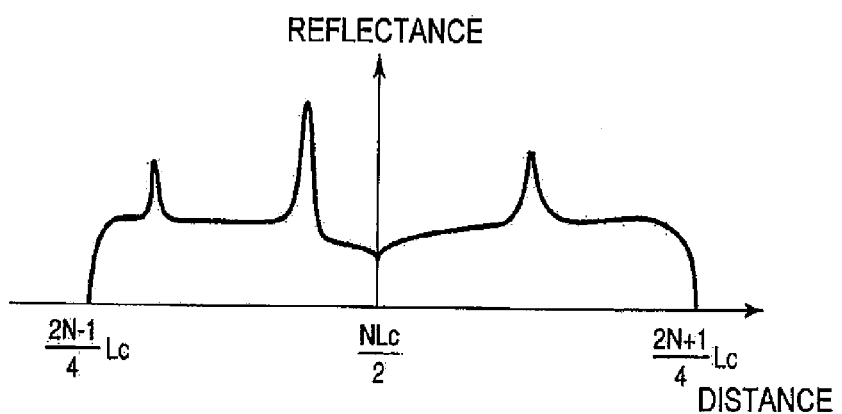
FIG. 11(c) illustrates the case in which a horizontal axis of the FFT processing result of the signal $D_{NLow}(t)$ is reversed to correspond to a distance range of $(2N-1)L_c/4$ to $NL_c/2$ and symmetrized to a horizontal axis of the FFT processing result of the signal $D_{NUp}(t)$.

When the horizontal axis of the FFT processing result of the signal $D_{NLow}(t)$ is reversed to correspond to the distance range of $(2N-1)L_c/4$ to $NL_c/2$ and symmetrized to the horizontal axis of the FFT processing result of the signal $D_{NUp}(t)$, the results are obtained in the range of $(2N-1)L_c/4$ to $(2N+1)L_c/4$ as illustrated in FIG. 11(c). Thus, in the present embodiment, the reflectance data can be obtained in the range exceeding $NL_c/2$.

In this embodiment, although the length of the delay unit 14 is set equal to the light source coherence length $L_c$, the accuracy of the length is not required too much. The same result can be obtained even if the length of the delay unit 14 is shorter than the light source coherence length $L_c$. However, because the number of terms on the right side of Formula (11) is increased to measure the same distance, it is necessary to consider a processing load on a processor. Even if the length of the delay unit 14 is longer than the light source coherence length $L_c$, similarly the result can rightly be corrected at the point near $NL_c/2$.

Figure 12:
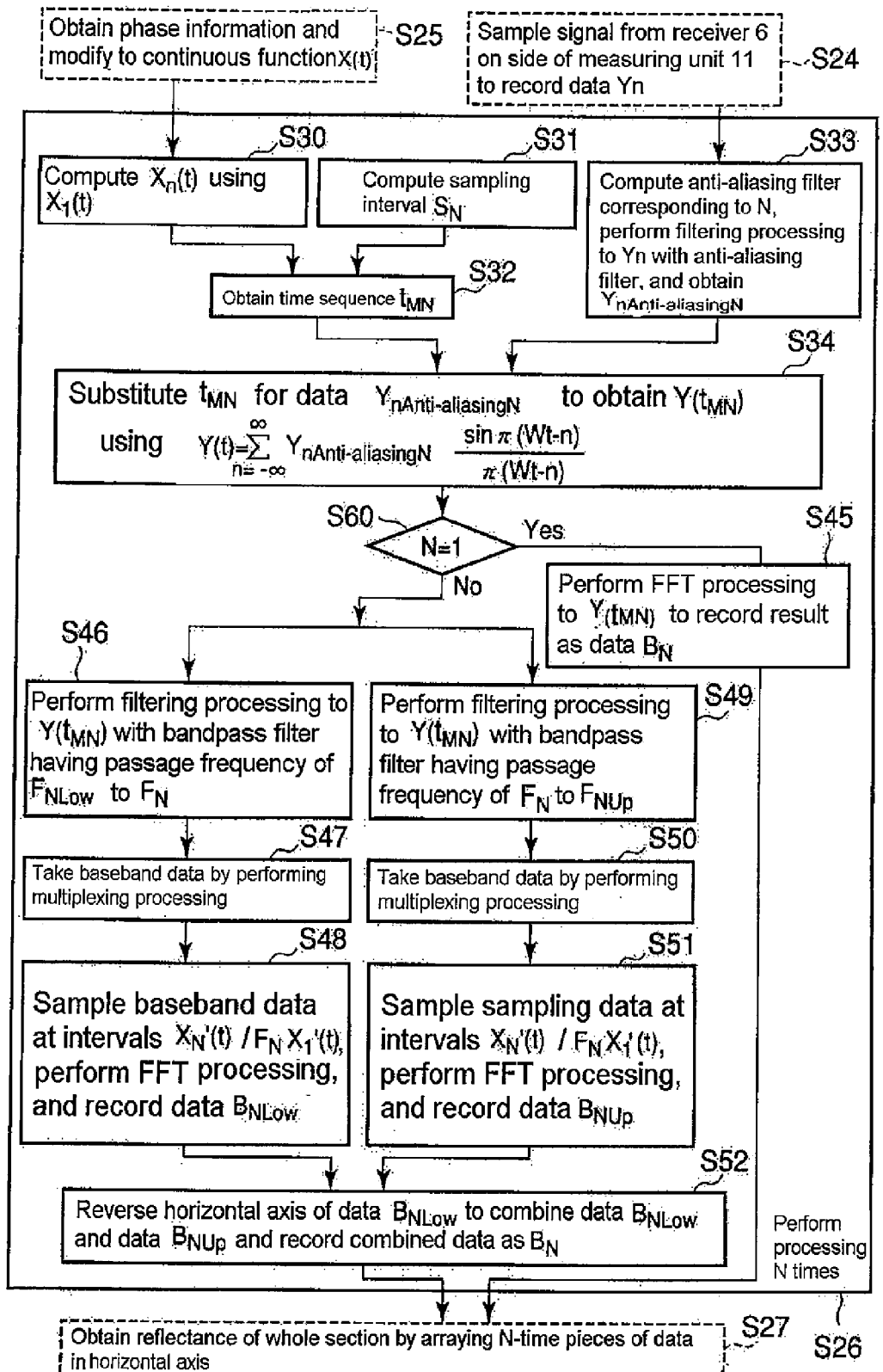
FIG. 12 is a flowchart illustrating the detailed processing procedure performed by the optical reflectometer of FIG. 4 in the second embodiment.

FIG. 12 is a flowchart illustrating the processing procedure performed by the optical reflectometer of FIG. 4 in this embodiment. The basic processing procedure of FIG. 12 is similar to that of FIG. 8, however, the processing procedure of this embodiment differs from the processing procedure in step S26. Step S26 of FIG. 12 differs from that of FIG. 9 in the pieces of processing except for steps S30, S31, S32, S33, and S34.

Referring to FIG. 12, the data processing device 18a obtains the anti-aliasing filter corresponding to N for $Y_n$. obtained in step S24 (FIG. 8) and performs the filtering processing to $Y_n$ using the filter coefficient of the anti-aliasing filter. That is, the filtering processing is performed to $Y_n$ with the low-pass filter (anti-aliasing filter) having the passage upper limit frequency $((2N+1)/2N) \times \text{Max}[dXn(t)/dt]$ corresponding to N expressed in Formula (12), thereby obtaining $Y_{nAnti\text{-}aliasingN}$ (step S33).

Using the time sequence $t_{MN}$ obtained in step S32, the data processing device 18a computes Y($t_{MN}$) based on $Y_n$ after the filtering processing (step S34). In step S34, Formula (11) is applied to $Y_{nAnti\text{-}aliasingN}$ to substitute $t_{MN}$, thereby obtaining Y($t_{MN}$).

The processing performed to the obtained Y($t_{MN}$) differs between the case of N=1 and the case of N>1. In the case of N=1 (Yes in step S60), the data processing device 18a directly performs the FFT processing to Y($t_{MN}$) to compute the reflectance at each position of the measurement distance ranging from 0 to $3L_c/4$ according to the propagation distance, and the reflectance is recorded as data $B_N$ (step S45).

In the case of N>1, the subsequent processing procedure goes to step S46 for the section of $(2N-1)L_c/4$ to $NL_c/2$, and processing procedure goes to step S49 for the section of $NL_c/2$ to $(2N+1)L_c/4$.

For the section of $(2N-1)Lc/4$ to $NLc/2$, the data processing device 18a performs the filtering processing to Y($t_{MN}$) with the bandpass filter having the passage frequency of $F_{NLow}$ to $F_N$ (step S46). The baseband data is obtained by multiplexing the filtered data and the single wave $\cos(2\pi FNt)$ (step S47). After the baseband data is sampled at sampling intervals of $S=X'_N(t)/[F_N \cdot X'_1(t)]$, the FFT processing is performed to compute the reflectance at each position according to the propagation distance in the section. The obtained pieces of data are recorded as data $B_{NLow}$ (step S48).

For the section of $NL_c/2$ to $(2N+1)L_c/4$, the data processing device 18a performs the filtering processing to Y($t_{MN}$) with the bandpass filter having the passage frequency of $F_N$ to $F_{NUp}$ (step S49). The baseband data is obtained by multiplexing the filtered data and the single wave $\cos(2\pi FNt)$ (step S50). After the baseband data is sampled at sampling intervals of $S=X'_N(t)/[F_N \cdot X'_1(t)]$, the FFT processing is performed to compute the reflectance at each position according to the propagation distance in the section. The obtained pieces of data are recorded as data $B_{NUp}$ (step S51).

The data processing device 18a reverses a horizontal axis of the data $B_{NLow}$ to correspond to the section of $(2N-1)L_c/4$ to $NL_c/2$, and the data processing device 18a obtains data every time by combining the data $B_{NUp}$ and the data $B_{NLow}$, and the obtained data is recorded as the data $B_N$ (step S52).

The processing in step S26 can be repeated N times to obtain the pieces of data $B_1, B_2, \ldots, B_N$. The pieces of reflectance data can be obtained in all the sections of 0 to $(2N+1)L_c/4$ by combining the pieces of data $B_1, B_2, \ldots, B_N$.

Thus, in this embodiment, the continuous function of the monitoring beat signal of the output light emitted from the light source is formed to produce the reference signal, and the FFT processing is performed to the sequence obtained by sampling the reference signal, thereby obtaining the measurement result. At this point, the sampling rate is variable to set the sampling interval $S_N$ as expressed by Formula (14). The measurement signal $Y_n$ is sampled at sampling intervals $S_N$, the data is obtained by filtering the measurement signal $Y_n$ with the anti-aliasing filter, and the FFT processing is performed to the data to obtain the measurement value.

Therefore, as with the first embodiment, the FFT processing performed to the interference beat signal can be prevented from spreading in the measurement region exceeding the light source coherence length. Accordingly, the optical reflectometry and optical reflectometer, in which the measurement can be performed by OFDR in the measurement distance exceeding the light source coherence length without any limitation of the light source coherence length, can be provided. Additionally the sampling rate is variable according to N (that is, a distance from the frequency sweep light source), so that the accuracy of arithmetic processing can further be enhanced.

That is, the optical reflectometry and optical reflectometer, in which the measurement can accurately be performed irrespective of the measurement distance, can be provided.

This invention is not limited to the embodiments, but various modifications can be made in an implementation stage without departing from the scope of the invention. For example, in the analysis unit 13, a new reference signal may be produced to correct the data signal using means for multiplying the monitoring beat signal or means for computing a trigonometric function.

Various inventions can be made by appropriately combining plural constituents disclosed in the embodiments. For example, some constituents may be neglected from all the constituents of the embodiments. The constituents included in different embodiments may appropriately be combined.

Third Embodiment

Figure 13:
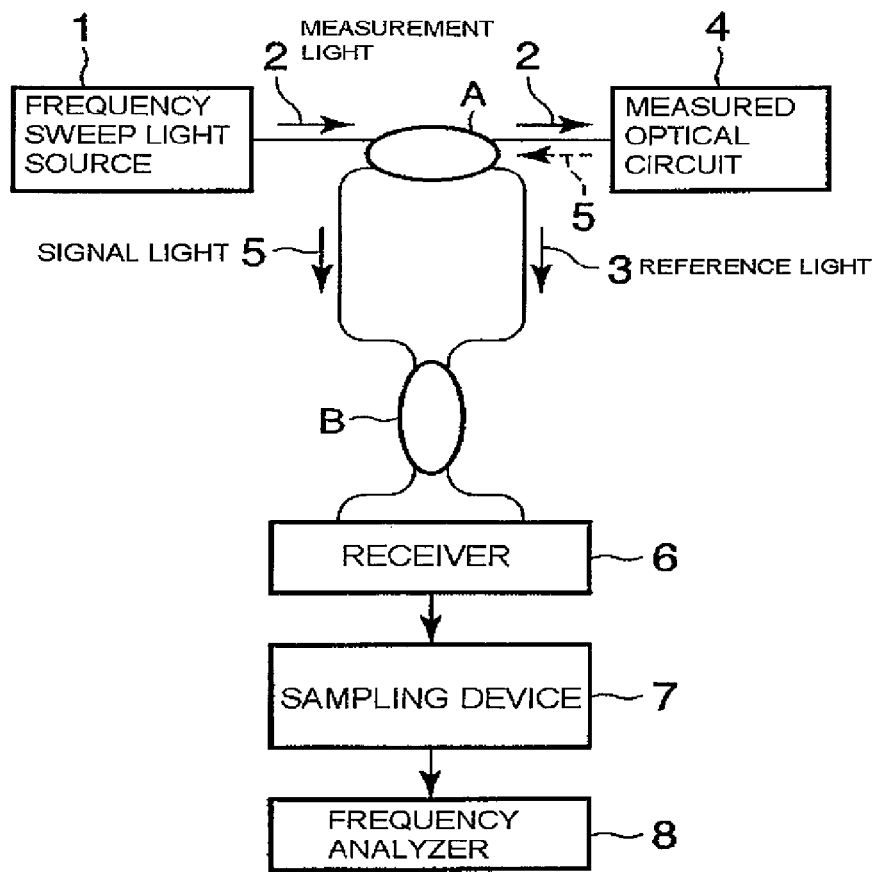
FIG. 13 is a view illustrating an example of a basic configuration of an optical reflectometer in which OFDR is adopted.

FIG. 13 is a view illustrating an example of a basic configuration of an optical reflectometer in which OFDR is adopted. Referring to FIG. 13, the optical directional coupler A branches the output light emitted from the frequency sweep light source 1, and one of the pieces of branched light is used as the reference light 3 while the other is inputted to the measured optical circuit 4. The optical directional coupler A takes out the signal light 5 backscattered in the measured optical circuit 4, the optical directional coupler B multiplexes the signal light 5 and the reference light 3, and the receiver 6 detects the multiplexed light. At this point, the sampling device 7 samples the interference beat signal generated by two-light-wave interference, and the frequency analyzer 8 analyzes the measured data to measure the backscattered light intensity distribution from each point in the measured optical circuit 4.

When the frequency of the measurement light 2 emitted from the frequency sweep light source 1 is swept linearly for a time T with a maximum optical frequency sweep width $\Delta F$, a frequency $F_b$ of the beat signal, which is generated by the signal light 5 backscattered at the point X in the measured optical circuit 4, is given by Formula (24):

$$F_b = \gamma n \Delta L / c \quad \text{[Formula 24]}$$

where $\Delta L$ is the optical path length difference between the reference light 3 and the signal light 5 backscattered at the point X, $\gamma$ is the optical frequency sweep speed, n is the refractive index, and c is the light speed.

At this point, the relationship $\gamma = \Delta F/T$ holds. The distance resolution $\Delta z$ is given by Formula (25) using a spectral width $\Delta F_b$ of the received beat signal:

$$\Delta z = c \Delta F_b / 2 n \gamma \quad \text{[Formula 25]}$$

However, the above-described conditions hold only in the ideal case, and the optical frequency is hardly swept with the good linearity in the actual OFDR. Even if the optical frequency can ideally be swept, the frequency $F_b$ of the beat signal of Formula (24) is influenced by the phase noise of the frequency sweep light source in the measurement distance exceeding the light source coherence length, and the spectral width $\Delta F_b$ spreads to the line width possessed by the frequency sweep light source. The measurement cannot be performed in the serious case.

Figure 14:
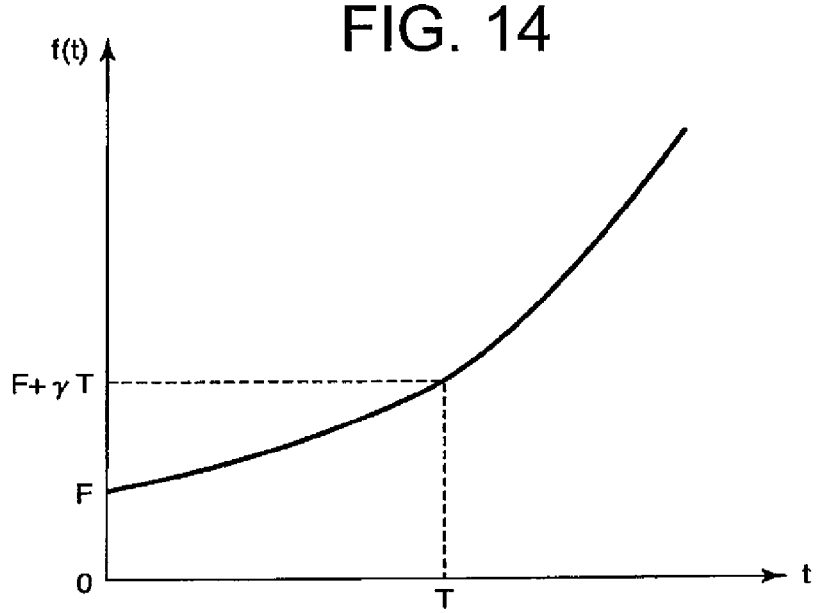
FIG. 14 is a view illustrating nonlinearity of an optical frequency of a frequency sweep light source 1.

FIG. 14 is a view illustrating the nonlinearity of the optical frequency of the frequency sweep light source 1. As is clear from FIG. 14, the optical frequency of the frequency sweep light source 1 is not linearly changed with respect to the time. In FIG. 14, the optical frequency takes a value $F+\gamma T$ [Hz] to the time T with a standard modulation frequency of a constant value F [Hz]. $\gamma$ indicates the nonlinearity of the frequency sweep speed. The nonlinearity causes the spread of the spectral width of the interference beat signal to lower the accuracy of distance resolution.

Figure 15A:
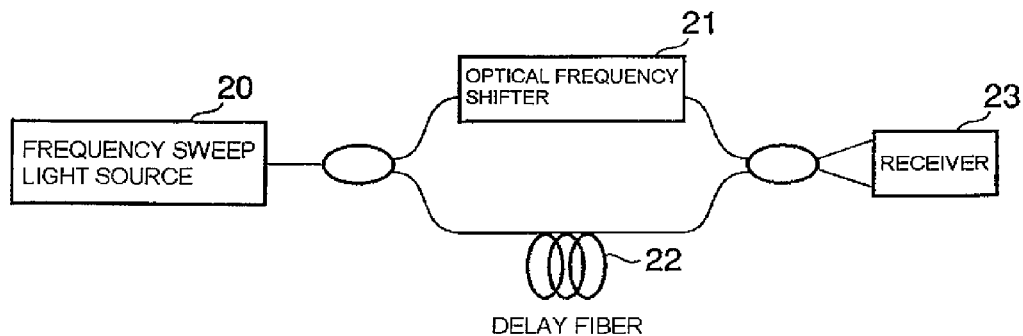
FIG. 15(a) illustrates a system for measuring a power spectrum.

FIG. 15 is a view for explaining the influence of the phase noise of the frequency sweep light source on the measurement. The Mach-Zehnder optical interferometer, in which the optical frequency shifter 21 is inserted in one of the optical paths, is simulated as illustrated in FIG. 15(a). That is, the optical path from the frequency sweep light source 20 is branched, the delay fiber 22 is provided in one of the optical paths, and the optical frequency shifter 21 is inserted in the other optical paths.

Figure 15B:
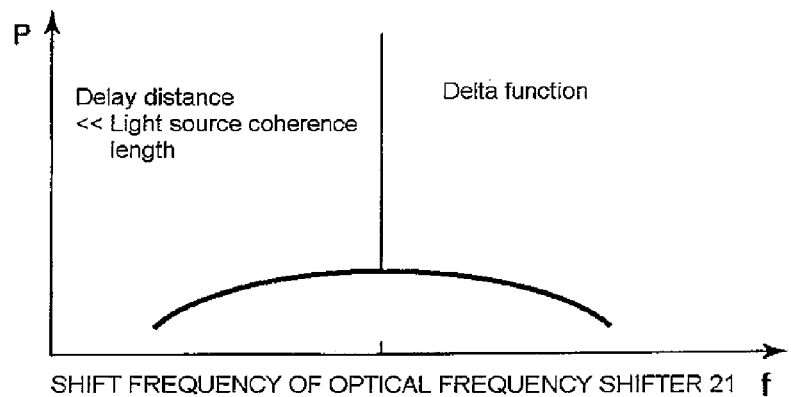
FIG. 15(b) illustrates a power spectrum when a delay distance is sufficiently shorter than a light source coherence length.

When the output light emitted from the frequency sweep light source 20 is the ideal monochromatic light, the receiver 23 obtains the power spectrum having the delta-function-like peak in the shift frequency of the optical frequency shifter 21 irrespective of the optical path difference of the optical interferometer (FIG. 15(b)). However, actually the power spectrum of the frequency sweep light source 20 has a finite width. When the frequency sweep light source 20 is the semiconductor laser, the FM noise is dominant in the phase noise, and the power spectrum has the Lorentz-like width (FIG. 15(c)).

Figure 15C:
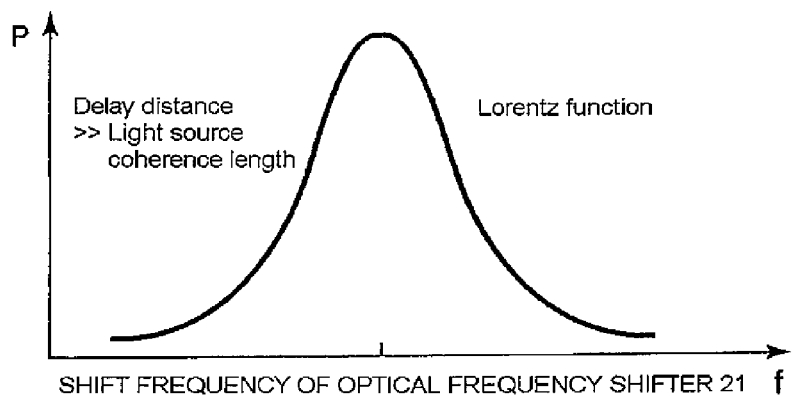
FIG. 15(c) illustrates a power spectrum when the delay distance is sufficiently longer than the light source coherence length.

When the optical path difference is equal to or lower than the light source coherence length (delay distance<<light source coherence length), the power spectrum of output current has the delta-function-like peak in the shift frequency of the optical frequency shifter 21. On the other hand, when the optical path difference is more than the light source coherence length (delay distance>>light source coherence length), the noise floor is gradually raised, and the power spectrum finally has the Lorentz shape as illustrated in FIG. 15(c). Accordingly, in the measurement distance exceeding a half of the light source coherence length, the noise component becomes prominent to hardly perform the accurate measurement.

Fourth Embodiment

Figure 16:
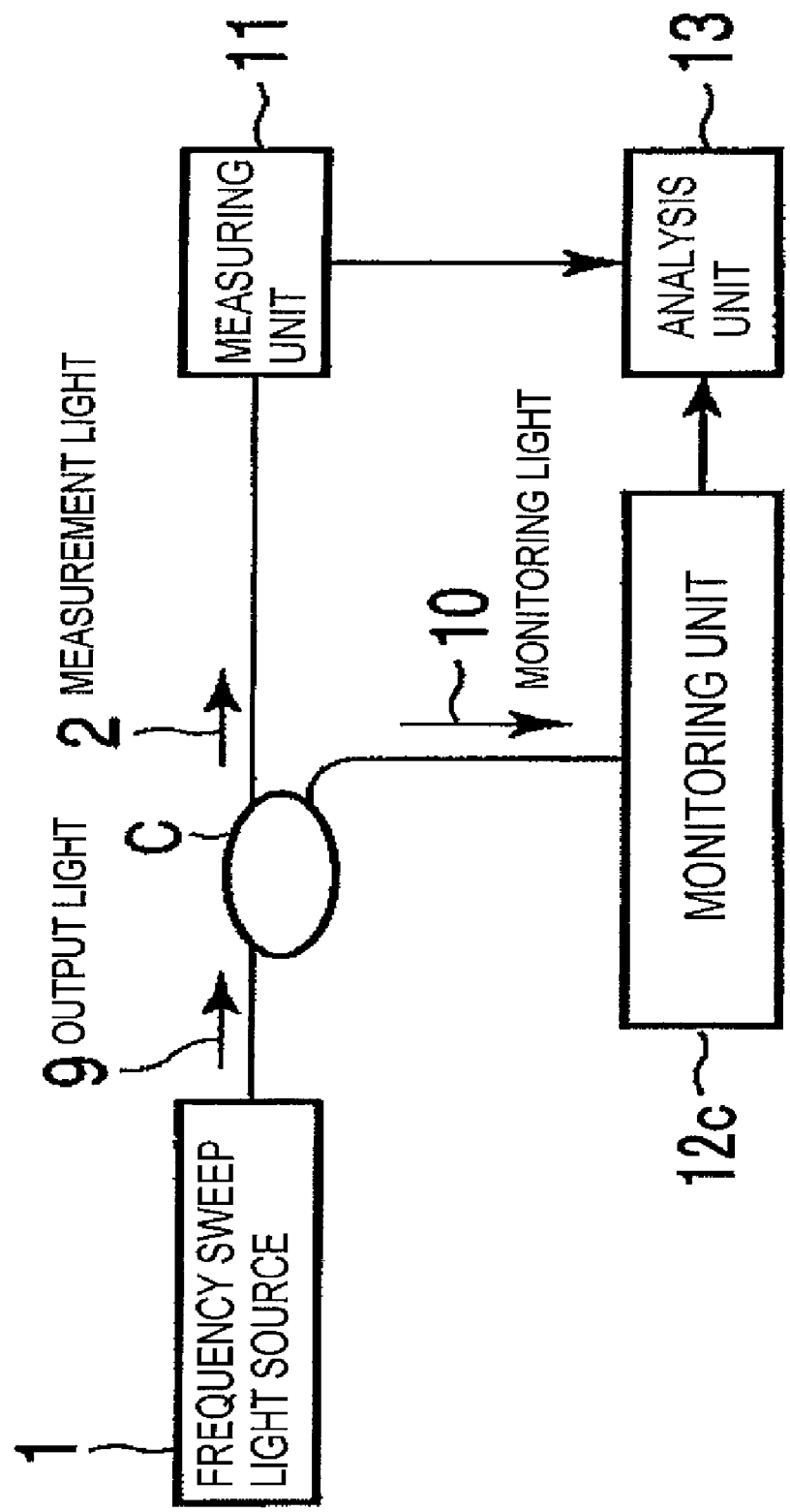
FIG. 16 is a functional block diagram illustrating an optical reflectometer according to this invention.

FIG. 16 is a functional block diagram illustrating an optical reflectometer according to this invention. This optical reflectometer performs the OFDR measurement of the reflectance distribution of the measured circuit in the propagation direction. Referring to FIG. 16, the optical directional coupler C branches the output light 9 emitted from the frequency sweep light source 1, one of the pieces of branched light is inputted as the measurement light 2 on the measuring unit 11, and the other piece of branched light is inputted as the monitoring light 10 on a monitoring unit 12c. The measurement result measured with the measuring unit 11 and the monitor result monitored with the monitoring unit 12c are fed into the analysis unit 13, and the backscattered light intensity distribution in the measured circuit (in the measuring unit 11) is obtained by the arithmetic processing.

The measuring unit 11 detects the interference beat signal between the output light 9 emitted from the frequency sweep light source 1 and the light backscattered from the measured circuit. For example, the monitoring unit 12c monitors the coherence property of the output light 9 by the delayed self-homodyne detection. The analysis unit 13 produces the reference signal based on the monitoring beat signal obtained from the coherence property of the output light 9, and the analysis unit 13 obtains the measurement result based on the reference signal.

Figure 17:
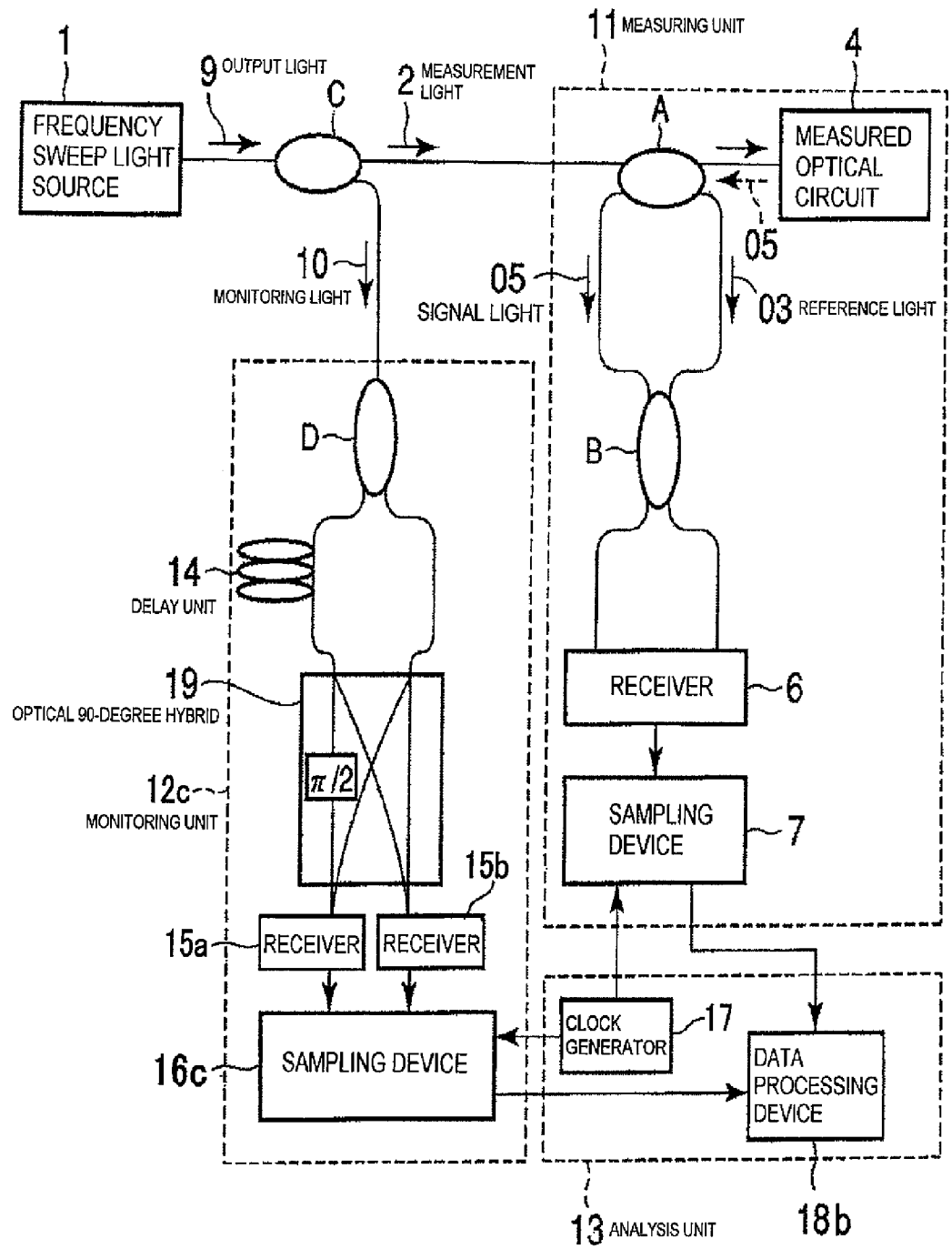
FIG. 17 is a functional block diagram illustrating the detailed optical reflectometer of FIG. 16.

FIG. 17 is a functional block diagram illustrating the optical reflectometer of FIG. 16. The optical directional coupler D branches the monitoring light 10 inputted to the monitoring unit 12c into two, and the two pieces of branched light are introduced to an optical 90-degree hybrid 19 and multiplexed. At this point, the delay unit 14 delays one of the pieces of branched light, and the Mach-Zehnder optical interferometer causes one of the pieces of delayed branched light to interfere with the other piece of branched light. Therefore, the optical 90-degree hybrid 19 supplies two pieces of interference light whose phases are shifted from each other by 90 degrees.

The two pieces of interference light are inputted to receivers 15a and 15b, respectively and the two pieces of interference light are detected after opto-electric conversion is performed to the two pieces of interference light, thereby producing monitoring beat signals whose phases are shifted from each other by 90 degrees. The monitoring beat signals are fed into a sampling device 16c. The sampling device 16c samples the waveforms of the monitoring beat signals, and the sampling device 16c feeds the obtained sampled data into a data processing device 18b in the analysis unit 13. The sampling rate of the sampling device 16c is synchronized with the clock of the clock generator 17 included in the analysis unit 13.

On the other hand, the processing similar to that of FIG. 13 is performed to the measurement light 2 inputted to the measuring unit 11, and the interference beat signal is fed into the sampling device 7. The sampling device 7 samples the waveform of the interference beat signal in synchronization with the clock of the clock generator 17, that is, at intervals synchronized with the sampling device 16c. The obtained sampled data is fed into the data processing device 18b.

The quantitative description will be made with reference to mathematical formulas. The electric field amplitude of the output light emitted from the frequency sweep light source 1 is given by Formula (26):

$$E(t) = A \exp\{j[2\pi f(t)t + \theta(t)]\} = A \exp[j\Phi(t)] \quad \text{[Formula 26]}$$

Where A is amplitude (constant), f(t) is a swept optical frequency of the frequency sweep light source, θ(t) is a fluctuating phase term, and Φ(t) is a total phase.

Assuming that L is a length of the delay unit 14 of FIG. 17, the delay time τ of the delay unit 14 is given by Formula (27):

$$\tau = nL/c \quad \text{[Formula 27]}$$

On the basis of the delay time τ generated in the delay unit 14, the monitoring beat signal fed into the data processing device 18b is expressed by Formula (28) and Formula (29):

$$I_1 = |E(t) + E(t-\tau)|^2 \propto \sin[\Phi(t) - \Phi(t-\tau)] \quad \text{[Formula 28]}$$

$$I_2 \propto \sin[\Phi(t) - \Phi(t-\tau) + \pi/2] = \cos[\Phi(t) - \Phi(t-\tau)] \quad \text{[Formula 29]}$$

Although Formula (28) and Formula (29) express the ideal cases, the ideal branch ratio of 1:1 cannot be realized in the branching unit of the actual optical 90-degree hybrid 19. It is assumed that α:β is the branch ratio of the branching unit of the actual optical 90-degree hybrid 19. The ideal optical phase difference of 90 degrees is hardly realized in the two monitoring beat signals, and actually there is an error ψ. In consideration of these facts, the two monitoring beat signals are given by Formula (30) and Formula (31):

$$I_1 = \alpha \sin[\Phi(t) - \Phi(t-\tau)] \quad \text{[Formula 30]}$$

$$I_2 = \beta \cos[\Phi(t) - \Phi(t-\tau) + \psi] \quad \text{[Formula 31]}$$

$I_1(t)$ and $I_2(t)$ sampled with the sampling device 16c are expressed as $I_1(t_n)$ and $I_2(t_n)$. Direct-current components $i_1$ and $i_2$ of each value are obtained by computing an average of the values. Assuming that N is the number of samplings, the direct-current component $i_1$ and the direct-current component $i_2$ are given by Formula (32) and Formula (33), respectively:

$$i_1 = \frac{1}{N}\sum_{n=1}^{N} I_1(t_n) \quad \text{[Formula 32]}$$

$$i_2 = \frac{1}{N}\sum_{n=1}^{N} I_2(t_n) \quad \text{[Formula 33]}$$

That is, the direct-current component of Formula (30) is Formula (32), and the direct-current component of Formula (31) is Formula (33).

The branch ratio α:β in the internal coupler of the optical 90-degree hybrid 19 is given by Formula (34) based on Formula (32) and Formula (33). That is, the branch ratio α:β can be computed as a variance of the pieces of sampled data $I_1(t_n)$ and $I_2(t_n)$. The error ψ of the orthogonality of the 90-degree phase difference in the optical 90-degree hybrid 19 is given by Formula (35) through statistical computation processing in which the variance is used:

$$\frac{\alpha}{\beta} = \frac{\sum_{n=1}^{N}[I_1(t_n) - i_1]^2}{\sum_{n=1}^{N}[I_2(t_n) - i_2]^2} \quad \text{[Formula 34]}$$

$$\varphi = \cos^{-1}\left\{ \frac{\sum_{n=1}^{N}\left\{\begin{array}{c}[I_1(t_n) - i_1] \times \\ [I_2(t_n) - i_2]\end{array}\right\}}{\sum_{n=1}^{N}[I_1(t_n) - i_1]^2 \times \sum_{n=1}^{N}[I_2(t_n) - i_2]^2} \right\} \quad \text{[Formula 35]}$$

Using the obtained branch ratio α:β of the coupler and the obtained error ψ of the phase difference, the phase term of the frequency sweep light source 1 is obtained by Formula (36):

$$X(t_n) = \Phi(t_n) - \Phi(t_n - \tau) \quad \text{[Formula 36]}$$

$$= \tan^{-1}\left\{\frac{\cos\varphi}{\sin\varphi + \frac{\alpha}{\beta} \times \frac{I_2(t_n)}{I_1(t_n)}}\right\}$$

Figures 18A, 18B:
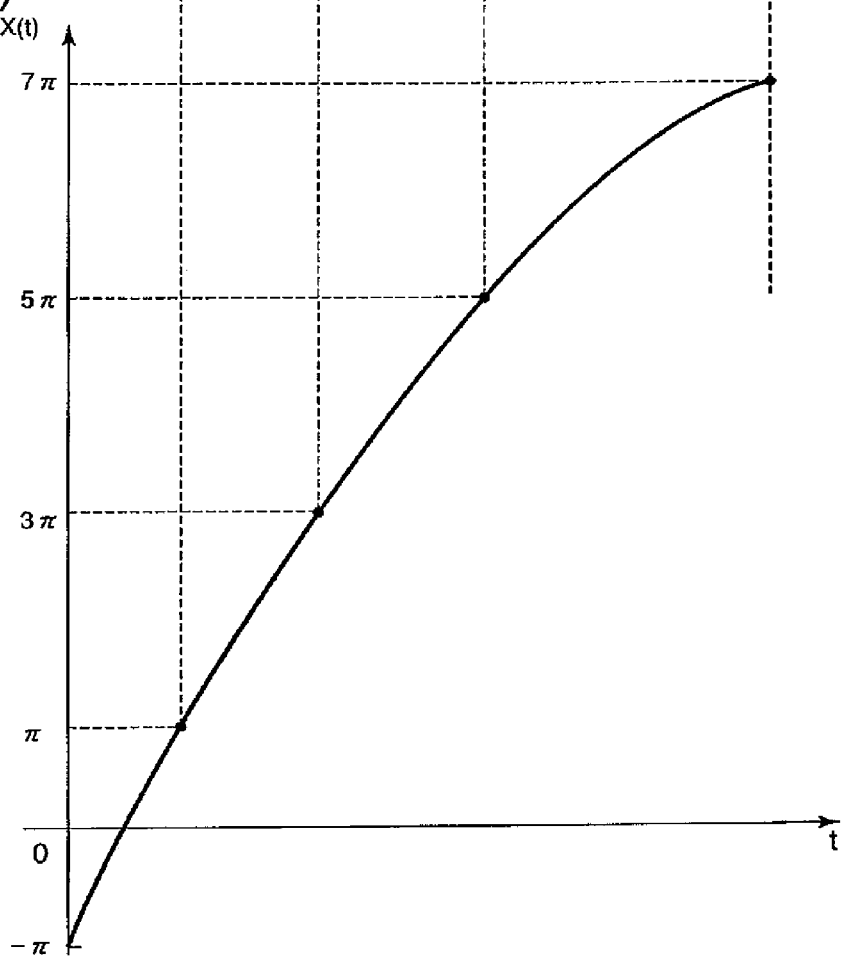
FIG. 18(a) illustrates the case in which a phase of a monitoring beat signal ranges from $-\pi$ to $+\pi$.
FIG. 18(b) illustrates the case in which an integral multiple of $2\pi$ is added to the phase of the monitoring beat signal.

FIG. 18 is a view illustrating a graph of Formula (36). As illustrated in FIG. 18(a), $X(t_n)$ of Formula (36) takes the value ranging from −π to +π to the time t. The integral multiple of 2π is sequentially added in the section from the initially replicated point from +π to −π to the next replicated point from +π to −π, which allows $X(t_n)$ to be expressed as a smooth function X(t)=Φ(t)−Φ(t−τ) in which the discontinuous point does not exist as illustrated in FIG. 18(b).

On the other hand, the measurement signal Y(t) supplied from the receiver 6 is given by Formula (37):

$$Y(t) = \int_0^{\tau_{FUT}} \cos[\Phi(t) - \Phi(t-\tau)] \cdot R(\tau) d\tau \quad \text{[Formula 37]}$$

Where $\tau_{FUT}$ is a round-trip time corresponding to the distance of the measured optical circuit 4 and R(τ) corresponds to a distribution reflectance. The measurement signal samples with the sampling device 7 is noted by $Y(t_n)$.

The data processing device 18b corrects the measurement signal Y(t$_n$) with the function X(t)=Φ(t)−Φ(t−τ) of FIG. 18(b) as the reference signal. The processing will be described below. Prior to the correction processing, the anti-aliasing filtering processing is performed to the measurement signal Y(t) to prevent aliasing associated with the FFT (Fast Fourier Transform) processing. Specifically, the low-pass filtering processing is performed to the measurement signal Y(t$_n$). The passage upper limit frequency of the filter used in the low-pass filtering processing is determined according to the necessary measurement distance. The measurement signal Y(t$_n$) to which the anti-aliasing filtering processing is already performed is noted by Y$_{Anti-aliasing}$(t$_n$).

Because the measurement signal Y(t$_n$) is data sampled at equal intervals, Y$_{Anti-aliasing}$(t$_n$) is discrete data having equal intervals. It is assumed that 1/W [second] is the equal sampling interval. It is assumed that Y(t) is a function of the time t, and it is assumed that Y(t) has a frequency component ranging from 0 to W/2 while not including a frequency component that is equal to or more than W/2. The whole function is solely determined by the sampling theorem. That is, Y(t) is given by Formula (38):

$$Y(t) = \sum_{n=-\infty}^{+\infty} Y_{Anti-aliasing(t_n)} \frac{\sin \pi (Wt-n)}{\pi(Wt-n)} \qquad [\text{Formula 38}]$$

Y$_{Anti-aliasing}$(t$_n$) is sampled using the phase term X(t). For this reason, X(t) takes the value of M·S is computed, and the times are obtained as a sequence t$_M$. Where M is a natural number (M=1, 2, 3, . . . ) and the interval S is an amount relating to the sampling rate. Specifically, it is necessary that the interval S be set so as to have the sufficient Nyquist sampling rate in sampling the measurement signal Y$_{Anti-aliasing}$(t$_n$). Therefore it is necessary to satisfy Formula (39):

$$S \leq \pi L/(2L_{FUT}) \qquad [\text{Formula 39}]$$

where L$_{FUT}$ is a distance of the measured circuit.

Using Formula (39), Y$_{Anti-aliasing}$(t$_M$) can be obtained by substituting the time sequence t$_M$ for t. The Fast Fourier Transform (FFT) processing is performed to each value of Y$_{Anti-aliasing}$(t$_M$), which allows the reflectance to be computed at each position according to the propagation distance. The reflectance distribution obtained in the above-described manner by OFDR is a measurement value computed in the region that does not exceed the light source coherence length.

Figure 19:
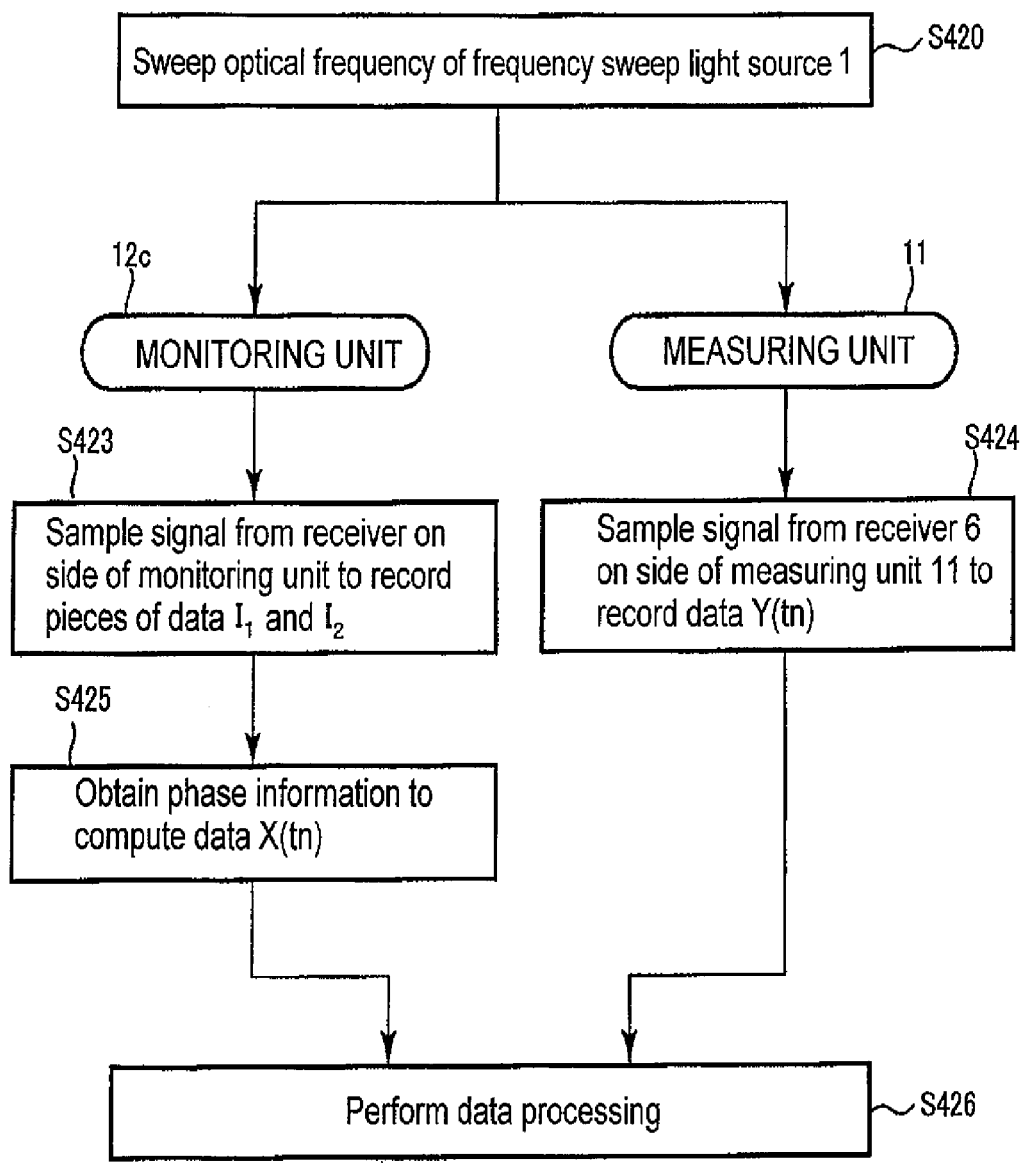
FIG. 19 is a flowchart illustrating a processing procedure in the optical reflectometer of FIG. 17.

FIG. 19 is a flowchart illustrating a processing procedure in the optical reflectometer of FIG. 17. In step S420, the optical frequency of the frequency sweep light source 1 is swept. The monitoring unit 12c samples the monitoring beat signals supplied from the receiver 15a and receiver 15b, and the pieces of sampled data I$_1$ and I$_2$ are recorded in the internal memory (not illustrated) (step S423). It is assumed that I$_1$ is the sampled data of the output from the receiver 15a while I$_2$ is the sampled data of the output from the receiver 15b. The data processing device 18b obtains the pieces of phase information on the pieces of sampled data I$_1$ and I$_2$, and the data processing device 18b computes the data X(t$_n$) based on the pieces of phase information (step S425).

On the other hand, the measuring unit 11 samples the interference beat signal supplied from the receiver 6 at equal intervals, and the sampled data Y(t$_n$) is recorded in the internal memory (not illustrated) (step S424). Finally the reflectance is computed at each position according to the propagation distance through the data processing in which the data X(t$_n$) from the monitoring unit 12c and the data Y(t$_n$) from the measuring unit 11 are used (step S426). The data processing procedure will be described in detail.

Figure 20:
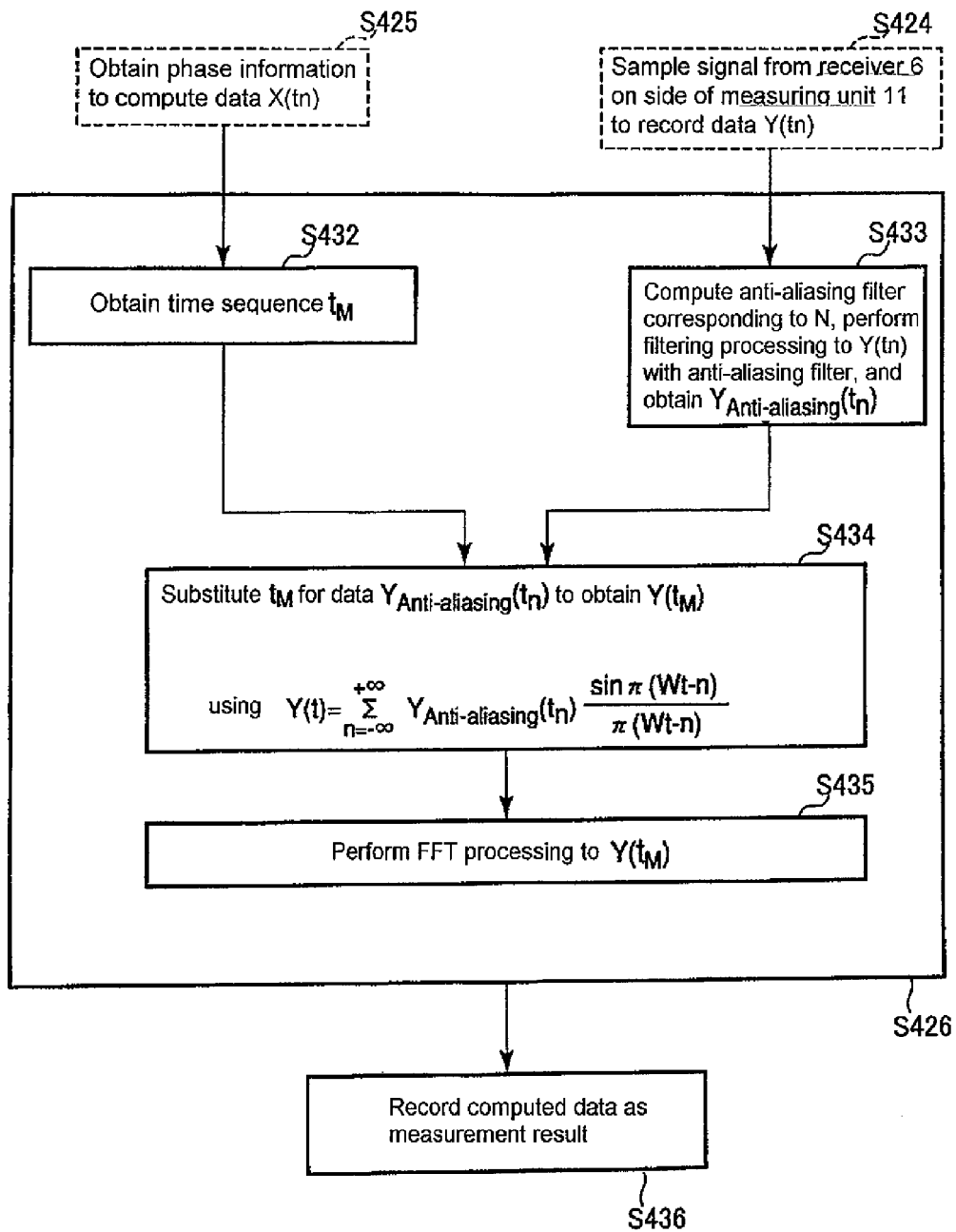
FIG. 20 is a flowchart illustrating a detailed procedure in step S426 of FIG. 19.

FIG. 20 is a flowchart illustrating the detailed procedure in step S426 of FIG. 19. In step S426, the data processing device 18b obtains the time sequence t$_M$ using the data X(t$_n$) obtained in step S425 (step S432). Concurrently the data processing device 18b obtains the anti-aliasing filter corresponding to N for the data Y(t$_n$) obtained in step S424, and the data processing device 18b performs the filtering processing to the data Y(t$_n$) using the filter coefficient of the anti-aliasing filter. That is, the filtering processing is performed to the data Y$_n$ with the low-pass filter (anti-aliasing filter) having the passage upper limit frequency corresponding to N, thereby obtaining Y$_{Anti-aliasing}$(t$_n$) (step S433). The obtained Y$_{Anti-aliasing}$(t$_n$) is applied to Formula (38), and time sequence t$_M$ is substitute for Formula (38), thereby computing Y$_{Anti-aliasing}$(t$_M$) (step S434).

The data processing device 18b performs the FFT processing to the computed Y$_{Anti-aliasing}$(t$_M$), and the data processing device 18b computes the reflectance value, in which the nonlinearity of the frequency sweep light source 1 is corrected, at each position of the measurement distance according to the propagation distance (step S435). Finally the computed data is recorded as the measurement result (step S436).

Thus, in this embodiment, the monitoring unit 12c is provided to monitor the coherence property of the frequency sweep light source 1. In the monitoring unit 12c, the Mach-Zehnder optical interferometer is formed by the optical directional coupler D, the delay unit 14, and the optical 90-degree hybrid 19, and the monitoring beat signals orthogonal to each other are generated from the optical 90-degree hybrid 19 to obtain the sampled data of each of the beat signals. At this point, the phase term X(t$_n$) of the frequency sweep light source 1 is computed from the branch ratio of the optical 90-degree hybrid 19, the error of the 90-degree orthogonality, and each pieces of sampled data. The beat signal of the measuring unit 11 is sampled with the phase term X(t$_n$) as the reference signal, the FFT processing is performed to the obtained sequence, thereby obtaining the measurement result.

Therefore, the nonlinearity of the frequency sweep of the frequency sweep light source 1 can be corrected by actively utilizing the shift from the ideal property of the optical 90-degree hybrid 19. That is, Formula (36) including the branch ratio α:β of the coupler of the optical 90-degree hybrid 19 and the phase difference error is set up, and the phase term of the frequency sweep light source 1 can be computed based on Formula (36). As is well known, the time sequence t$_M$ in which the phase term takes the specific value is obtained, the value is substituted for the function having the form of Formula (38), and the measurement value can be corrected. In this embodiment, using the well-known knowledge, the measurement value, in which the shift from the ideal property of the optical 90-degree hybrid 19 is corrected, can be obtained. Accordingly, the optical reflectometry and optical reflectometer, in which the measurement is performed with high distance resolution, can be provided even if the nonlinearity exists in the optical frequency sweep of the frequency sweep light source by OFDR.

Fifth Embodiment

In the fourth embodiment, the two monitoring beat signals whose phases are shifted from each other by 90 degrees are generated using the optical 90-degree hybrid 19, the reference signal is obtained by processing the sampled data of the beat signal, and the sweep nonlinearity of the frequency sweep light source 1 can be corrected based on the reference signal. However, the result is limited to the region that does not exceed the light source coherence length, and the influence of the phase noise of the frequency sweep light source 1 becomes dominant to hardly obtain the high distance resolution in the region exceeding the light source coherence length. A fourth embodiment for solving the problem will be described below. Although the basic configuration of the apparatus of the fourth embodiment is similar to that of FIG. 17, the apparatus of the fifth embodiment differs from that of FIG. 17 in processing performed by the data processing device 18*b*.

In the fourth embodiment, $X(t)=\Phi(t)-\Phi(t-\tau)$ is computed using Formula (36), although the nonlinearity or coherence property of the frequency sweep light source 1 can be corrected based on $X(t)=\Phi(t)-\Phi(t-\tau)$, a degree of correction becomes the maximum at the point corresponding to the round-trip time $\tau_{FUT}$ in the measured optical circuit 4, and the correction accuracy is deteriorated with increasing distance from the point. However, it is well known that, using the phase information expressed by Formula (40), the correction is optimally performed to the interference beat signal that is generated by the signal light 5 backscattered from a distance N times (N is an integer more than 1) the distance corresponding to the round-trip time $\tau_{FUT}$ in the measured optical circuit 4:

$$X_N(t)=\Phi(t)-\Phi(t-N\tau)$$ [Formula 40]

Formula (40) can be formed like Formula (41):

$$X_N(t)=X(t)+X(t-\tau)+X(t-2\tau)+\ldots+X\{t-(N-1)\tau\}$$ [Formula 41]

Figure 21:
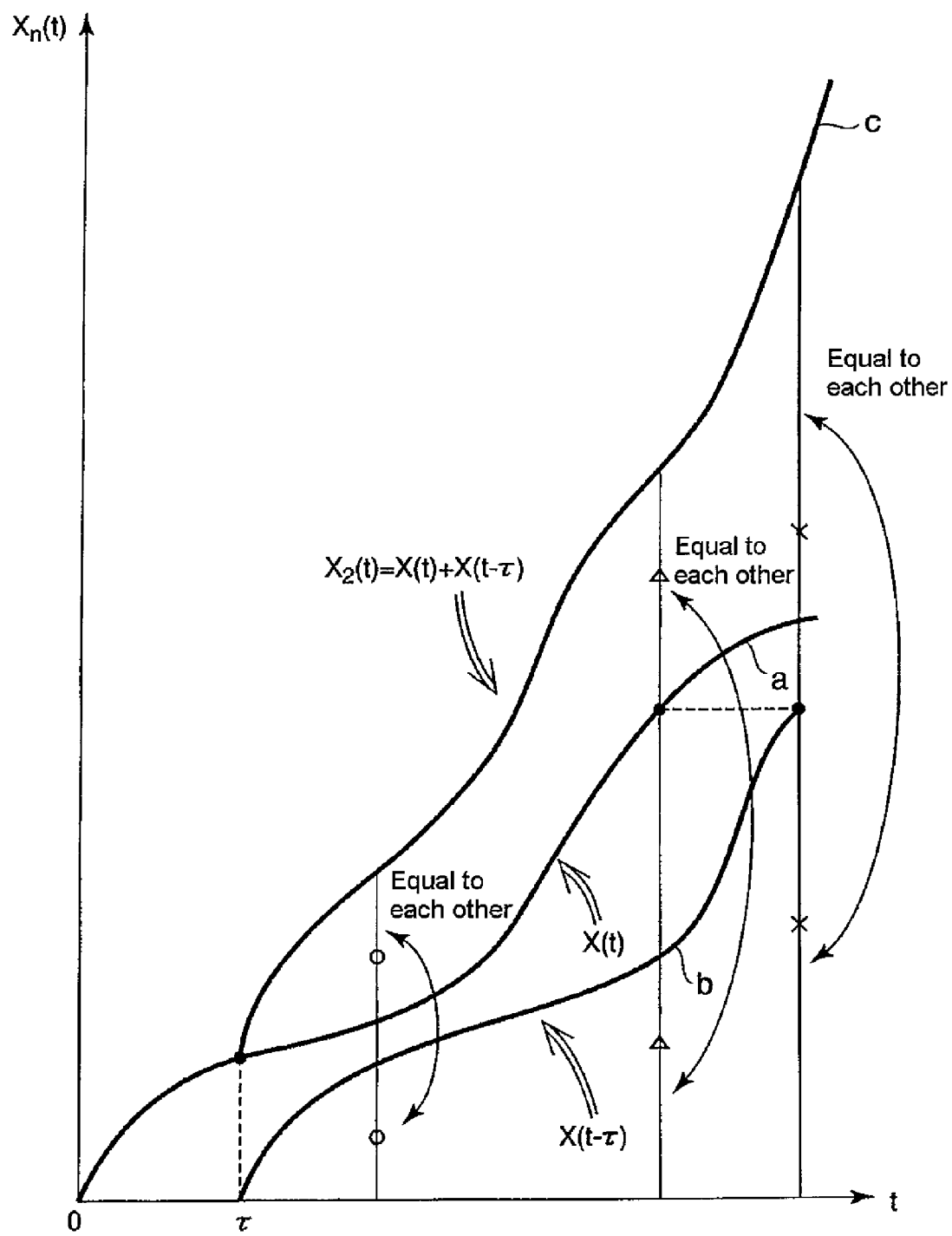
FIG. 21 is a view illustrating that new phase information can be produced by utilizing Formula (41).

FIG. 21 is a view illustrating that new phase information can be produced by utilizing Formula (41). FIG. 21 schematically illustrates a basis of Formula (41). A curve a of FIG. 21 indicates a phase X(t) of the monitoring beat signal, and a curve b indicates a phase X(t−τ) to which τ-time delay processing is performed. A curve c of FIG. 21 indicates $X_2(t)$ produced by utilizing the technique, that is, the concatenative reference method, and $X_2(t)$ is obtained as follows:

$$X_2(t)=X(t)+X(t-\tau)$$

where τ is the delay amount of the delay unit 14 of FIG. 17.

As with the fourth embodiment, the measurement signal $Y(t_n)$ can be corrected using $X_N(t)$ that is sequentially obtained by the coupling producing method. However, a place where the nonlinearity or coherence property of the frequency sweep light source 1 is optimally corrected is the distance corresponding to $\tau_{FUT}=N\tau$. Therefore, in order to cover the whole distance of the measured optical circuit 4, attention is focused on locating $\tau_{FUT}$ in which $X_N(t)$ can be used in the section of (N−½)τ to (N+½)τ. That is, the correction section ranges from (2N−1)L/4 to (2N+1)L/4. The delay fiber length L (that is, delay time τ) in the delay unit 14 is properly designed according to the necessary accuracy which correction accuracy is constant in the correction section, which allows the extension of the range which can be corrected.

Figure 22:
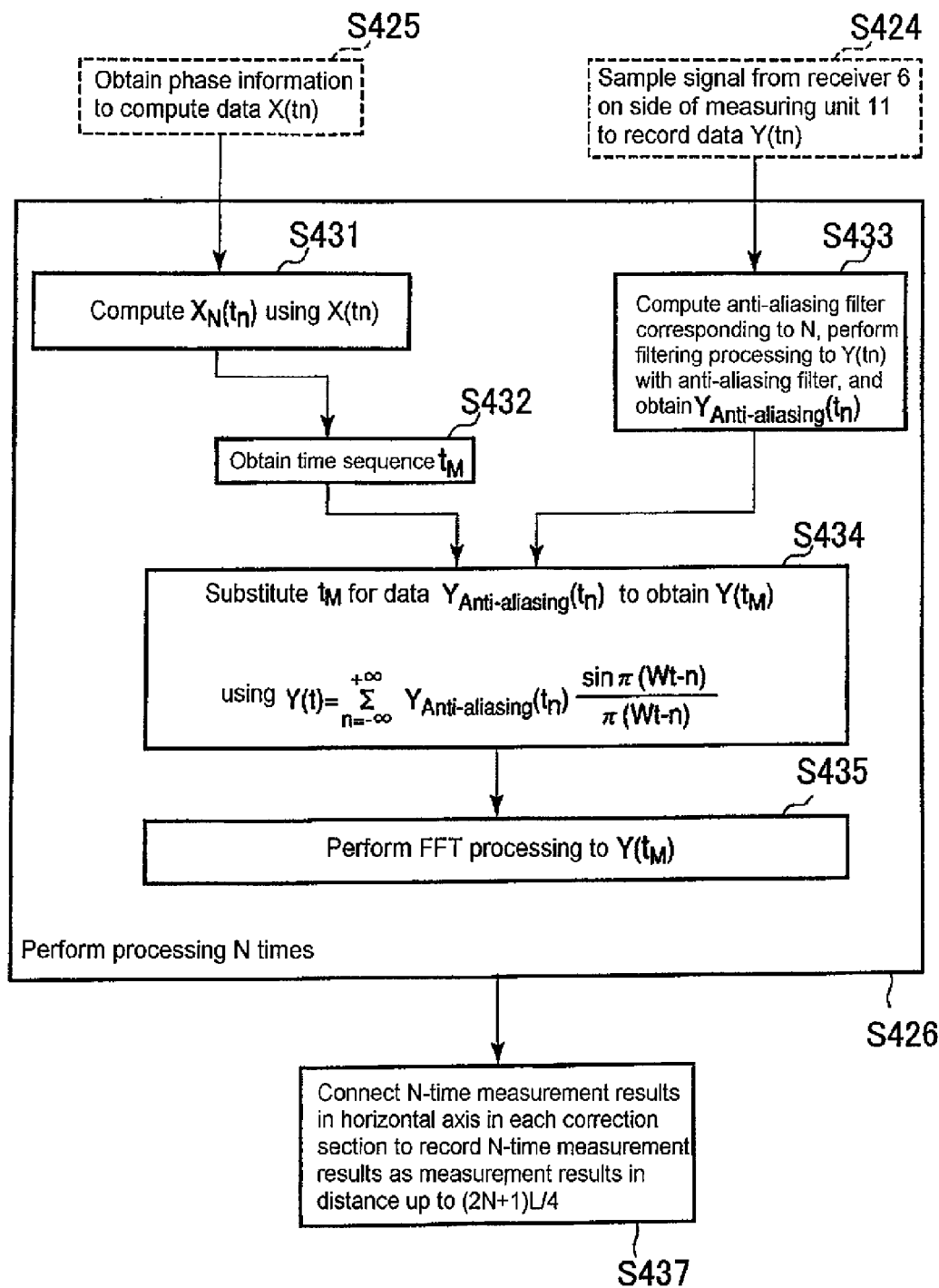
FIG. 22 is a flowchart illustrating a processing procedure in a fifth embodiment of this invention.

FIG. 22 is a flowchart illustrating a processing procedure in this embodiment. The processing procedure of this embodiment differs from the processing procedure in the processing in step S426 of FIG. 19, and the processing in step S426 is repeated N times in the fifth embodiment. In the case of N=1, as with the fourth embodiment, the data $Y(t_n)$ is sampled with the data $X(t_n)$ as the reference signal (steps S432 to S434), and the FFT processing is performed to the obtained sequence (step S435). In step S435, N is incremented, and the processing procedure returns to steps S431 and S433.

In the case of N>1, Formula (41) is applied to X(t) to produce $X_N(t)$ (step S431), and the pieces of processing in steps S432 to S435 are performed again, thereby obtaining the reflectance at each position according to the propagation distance. After the N-time processing, the measurement can be performed in the whole distance of 0 to (2N+1)L/4 by connecting the measurement results every correction section in the horizontal axis, and the result is recorded as the measurement result (step S437).

Thus, in this embodiment, the monitoring beat signal of the output light emitted from the frequency sweep light source 1 is formed into the continuous function to produce the reference signal, and the FFT processing is performed to the sequence obtained by sampling the reference signal, thereby obtaining the measurement result. At this point, $X_N(t)$, that is the phase term is computed in each section corresponding to N times $\tau_{FUT}$, and the reference signal is produced based on the phase term.

Therefore, the FFT processing performed to the interference beat signal can be prevented from spreading in the measurement region exceeding the light source coherence length. Accordingly, the optical reflectometry and optical reflectometer, in which the measurement can be performed by OFDR in the measurement distance exceeding the light source coherence length without any limitation of the light source coherence length, can be provided. Thus, the optical reflectometry and optical reflectometer, in which the measurement can accurately be performed irrespective of the measurement distance, can be provided.

As describe above, in the fourth embodiment and the fifth embodiment, even if the nonlinearity exists in the optical frequency sweep of the frequency sweep light source, and even if the coherence length of the measurement distance exceeds the frequency sweep light source, the optical reflectometry and optical reflectometer, in which the reflectance distribution can be realized with the high distance resolution by OFDR, can be provided.

The invention is not limited to the embodiments, but various modifications can be made in an implementation stage without departing from the scope of the invention. Various inventions can be made by appropriately combining plural constituents disclosed in the embodiments. For example, some constituents may be neglected from all the constituents of the embodiments. The constituents included in different embodiments may appropriately be combined.

Sixth Embodiment

Figure 23:
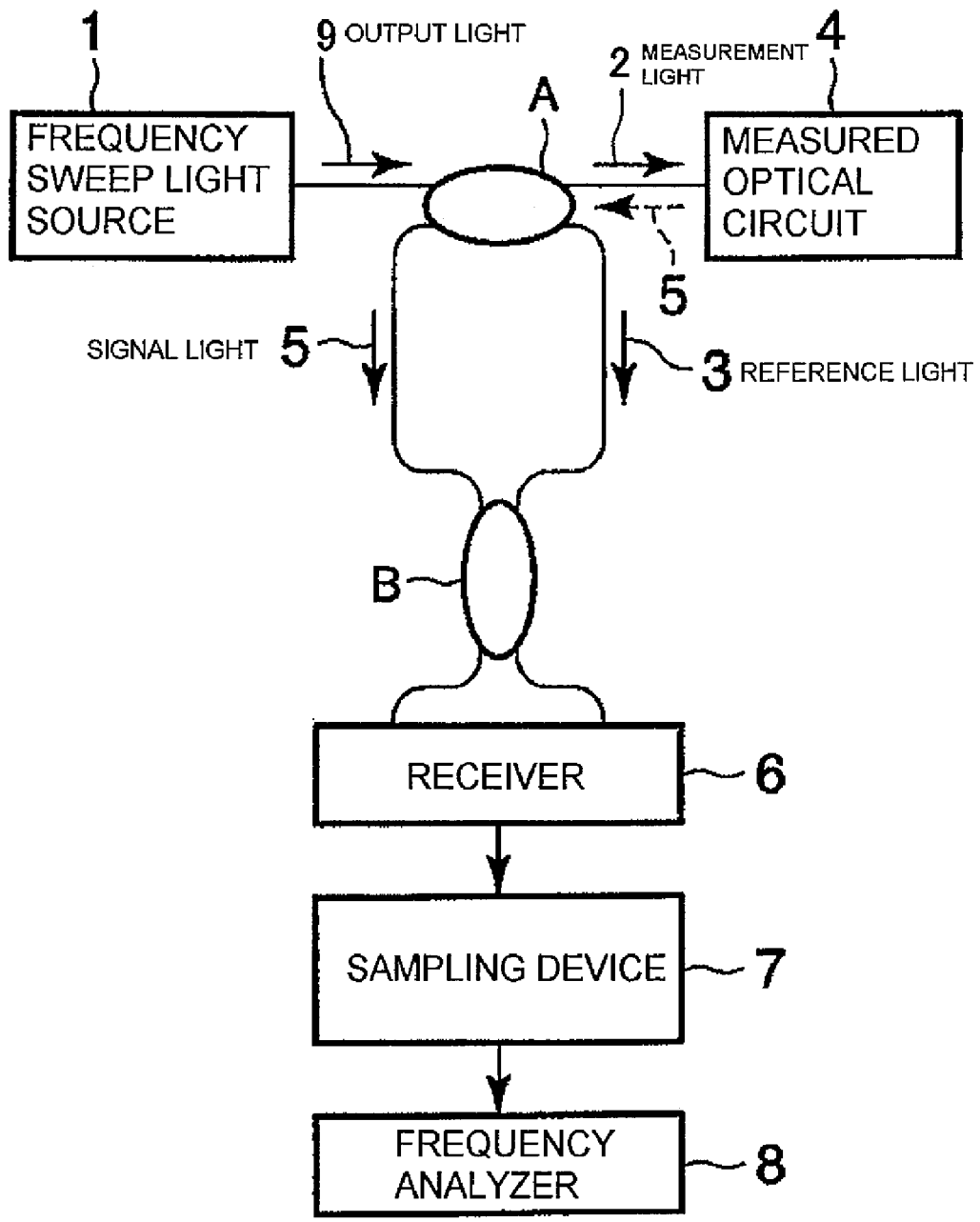
FIG. 23 is a basic diagram illustrating an example of an optical reflectometer.

FIG. 23 is a basic diagram illustrating an example of an optical reflectometer. The optical reflectometer of the present embodiment includes the frequency sweep light source 1, the optical directional couplers A and B, the measured optical circuit 4 that is of the measurement target, the receiver 6, the sampling device 7, and the frequency analyzer 8 that is of the analysis unit. The output light 9 whose optical frequency is swept is inputted to the measured optical circuit 4 that is of the measurement target, and the reflectance distribution is measured at the position in the measured optical circuit 4.

The frequency sweep light source 1 emits output light 9 whose frequency is swept. The optical directional coupler A branches the output light 9 emitted from the frequency sweep light source 1, and one of the pieces of branched light is used as the reference light 3 while the other is inputted as the measurement light 2 on the measured optical circuit 4. The measurement light 2 inputted to the measured optical circuit 4 is backscattered in the measured optical circuit 4, and the optical directional coupler A takes out the backscattered measurement light 2 as the signal light 5. The optical directional coupler B multiplexes the signal light 5 taken out by the optical directional coupler A and the reference light 3, and the receiver 6 detects the multiplexed light. The receiver 6 detects the interference beat signal generated by the two-light-wave interference. The sampling device 7 samples the interference beat signal detected by the receiver 6. In the present embodiment, the sampling device 7 samples the measurement signal $Y_n$ in each half of the delay fiber length $L_{Short}$ of the delay unit 14a. The frequency analyzer 8 performs frequency analysis to the signal sampled by the sampling device 7, and the frequency analyzer 8 measures the reflectance distribution at the position in the measured optical circuit 4. At this point, the frequency analyzer 8 measures the reflectance distribution of the measurement light 2 according to the sampling rate of the sampling device 7, so that the backscattered light intensity distribution can be measured in each propagation distance and each propagation direction of the measurement light 2 in the measured optical circuit 4. Therefore, backscattered light intensity distribution can be measured from each position in the measured optical circuit 4.

When the frequency of the output light 9 emitted from the frequency sweep light source 1 is linearly swept for the time T with the maximum optical frequency sweep width ΔF with respect to the time, the frequency $F_b$ of the interference beat signal, which is generated by the signal light 5 backscattered at the point X in the measured optical circuit 4, is given by Formula (42):

$$F_b = \frac{\gamma n \Delta L}{c} \qquad \text{[Formula 42]}$$

where γ is the optical frequency sweep speed, ΔL is the optical path length difference between the reference light 3 and the signal light 5 backscattered at the point X, n is the refractive index, and c is the light speed.

At this point, the relationship γ=ΔF/T holds. The resolution Δz of the propagation distance is given by Formula (43) using the spectral width $\Delta F_b$ of the interference beat signal:

$$\Delta z = \frac{c \Delta F_b}{2 n \gamma} \qquad \text{[Formula 43]}$$

However, the above-described conditions hold only in the ideal case, and the optical frequency is hardly swept with the good linearity in the actual OFDR. Even if the optical frequency can ideally be swept with the good linearity, the frequency $F_b$ of the interference beat signal of Formula (42) is influenced by the phase noise of the frequency sweep light source 1 in the measured propagation distance exceeding the light source coherence length. The spectral width $\Delta F_b$ of the interference beat signal in Formula (43) spreads to the line width possessed by the frequency sweep light source 1, and the measurement cannot be performed. The reason the measurement cannot be performed will be described below.

Figure 24A:
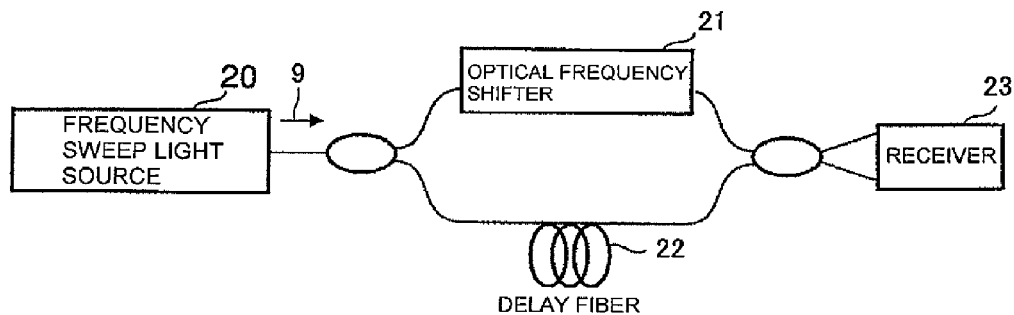
FIG. 24(a) illustrates a system for measuring a power spectrum.
Figure 24B:
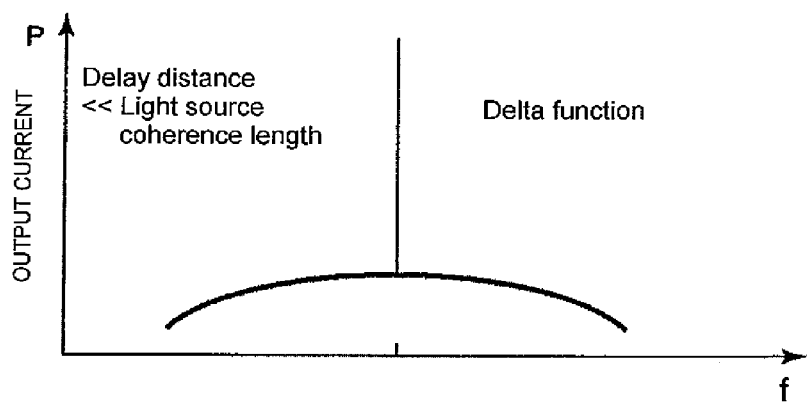
FIG. 24(b) illustrates a power spectrum when a delay distance is sufficiently shorter than a light source coherence length.
Figure 24C:
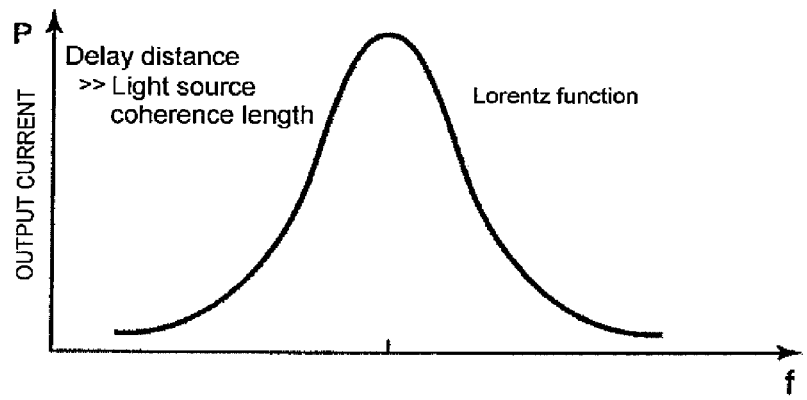
FIG. 24(c) illustrates a power spectrum when the delay distance is sufficiently longer than the light source coherence length.

FIG. 24 is a view for explaining an influence of the phase noise of the frequency sweep light source 1 on the measurement, FIG. 24(a) illustrates a system for measuring a power spectrum, FIG. 24(b) illustrates a power spectrum when a delay distance is sufficiently shorter than a light source coherence length, and FIG. 24(c) illustrates a power spectrum when the delay distance is sufficiently longer than the light source coherence length. As illustrated in FIG. 24(a), in a power spectrum measurement system, the optical path from the frequency sweep light source 20 is branched into two, the delay fiber 22 is provided in one of the optical paths while the optical frequency shifter 21 is inserted in the other optical path, thereby forming the Mach-Zehnder optical interferometer. When the delay distance is sufficiently shorter than the light source coherence length, as illustrated in FIG. 24(b), the receiver 23 obtains the power spectrum having the delta-function-like peak in the shift frequency of the optical frequency shifter 21 irrespective of the optical path difference of the optical interferometer. Even if the delay distance is sufficiently longer than the light source coherence length, the measurement result similar to that of FIG. 24(b) is obtained when the measurement light emitted from the frequency sweep light source 20 is the ideal monochrome light. However, actually the power spectrum of the frequency sweep light source 20 has the finite width. When the frequency sweep light source 20 is a semiconductor laser, the FM noise is dominant in the phase noise, and the power spectrum has the Lorentz-like width as illustrated in FIG. 24(c).

Thus, when the optical path difference falls within the coherence length of the frequency sweep light source 20, that is, when the delay amount of the signal light to the reference light is sufficiently lower than the coherence length of the output light 9 emitted from the frequency sweep light source 20, the power spectrum of the output current has the delta-function-like peak at the shift frequency of the optical frequency shifter 21. However, when the optical path difference is more than the coherence length of the frequency sweep light source 20, that is, when the delay amount of the signal light to the reference light is sufficiently more than the coherence length of the output light 9, the noise floor is gradually raised, and the power spectrum finally has the Lorentz shape as illustrated in FIG. 24(c). Accordingly, in the measured propagation distance exceeding a half of the light source coherence length of the frequency sweep light source 20, the noise component becomes prominent to hardly perform the accurate measurement in the power spectrum of the output current.

Figure 25:
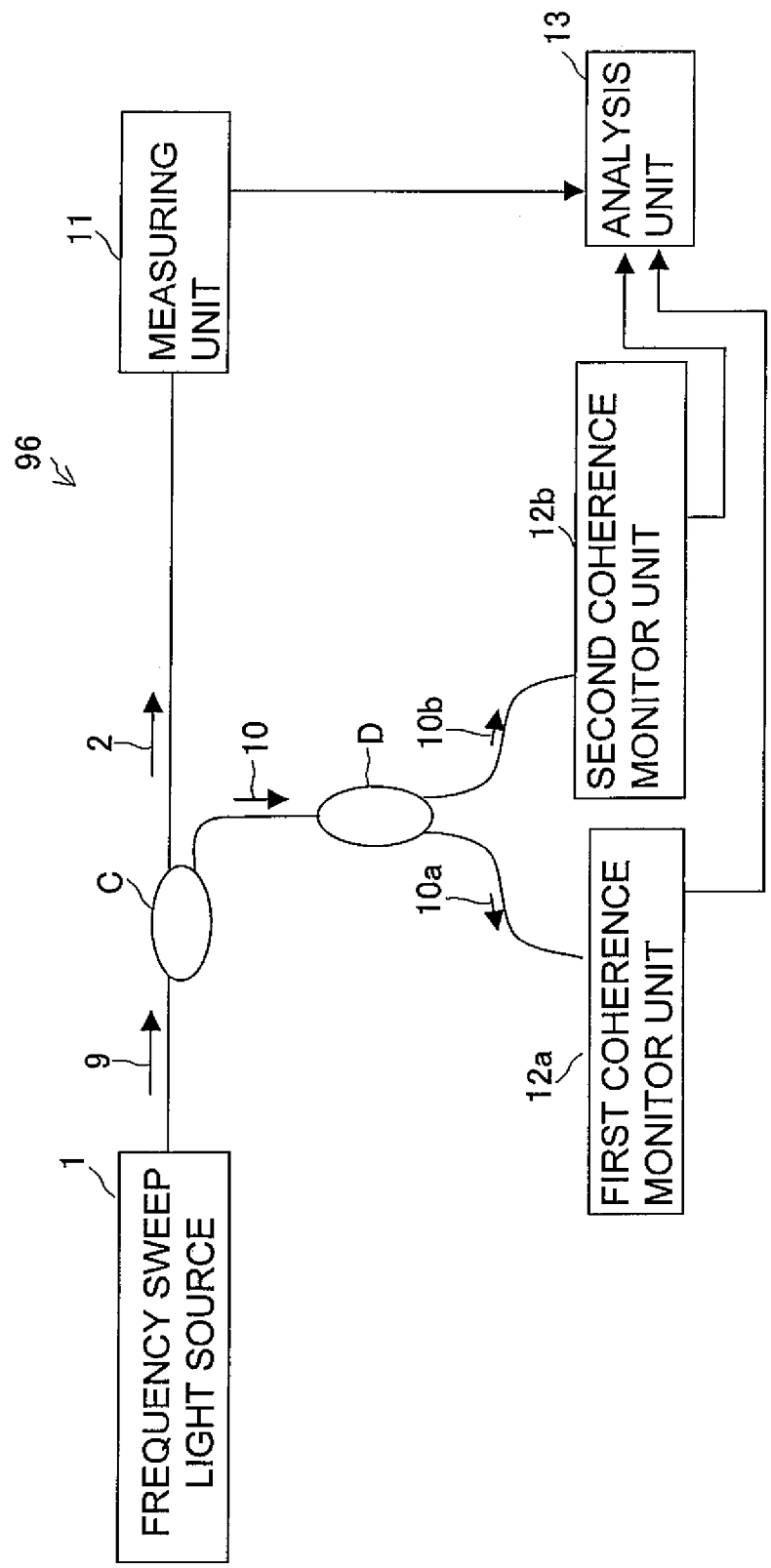
FIG. 25 is a functional block diagram illustrating an optical reflectometer according to a sixth embodiment.

FIG. 25 is a functional block diagram illustrating an optical reflectometer of the present embodiment. An optical reflectometer 96 of the present embodiment includes the frequency sweep light source 1, a first coherence monitor unit 12a, a second coherence monitor unit 12b, the measuring unit 11, the analysis unit 13, and the optical directional couplers C and D. The optical reflectometer 96 includes the first coherence monitor unit 12a and the second coherence monitor unit 12b, so that the reflectance distribution in the propagation direction in the measurement target included in the measuring unit 11 can also be corrected to the noise component in the propagation distance exceeding a half of the coherence length of the output light 9 emitted from the frequency sweep light source 1.

The optical directional coupler C branches the output light 9 emitted from the frequency sweep light source 1, in which the optical frequency is swept, into the measurement light 2 and the monitoring light 10. The measurement light 2 is inputted to the measuring unit 11. The optical directional coupler D branches the monitoring light 10 into a first monitoring light 10a and a second monitoring light 10b, the first monitoring light 10a is inputted to the first coherence monitor unit 12a, and the second monitoring light 10b is inputted to the second coherence monitor unit 12b.

The first coherence monitor unit 12a and the second coherence monitor unit 12b obtain monitoring beat signals $I_{Short}$ and $I_{Long}$ from the monitoring light 10 into which the output light 9 from the frequency sweep light source 1 is branched. The first coherence monitor unit 12a and the second coherence monitor unit 12b obtain the monitoring beat signals $I_{Short}$ and $I_{Long}$, thereby monitoring the coherence property of the output light 9. For example, the coherence property can be monitored by the delayed self-homodyne detection. The first coherence monitor unit 12a supplies the beat signal obtained by the delayed self-homodyne detection as the first monitoring beat signal $I_{Short}$ to the analysis unit 13. The second coherence monitor unit 12b supplies the beat signal obtained by the delayed self-homodyne detection as the second monitoring beat signal $I_{Long}$ to the analysis unit 13.

The measuring unit 11 obtains the interference beat signal between the signal light and the reference light. The signal light is backscattered from the measured optical circuit 4 that is of the measurement target in the measuring unit 11. The reference light is obtained by branching the output light 9 emitted from the frequency sweep light source 1. The measuring unit 11 supplies the obtained interference beat signal as the measurement signal $Y_n$ to the analysis unit 13.

The analysis unit 13 produces the reference signal $X_N(t)$ reflecting the sweep nonlinearity in the frequency sweep light source 1 and the phase noise of the frequency sweep light source 1 from the monitoring beat signals $I_{Short}$ and $I_{Long}$ that are obtained by the first coherence monitor unit 12a and the second coherence monitor unit 12b. The analysis unit 13 performs arithmetic processing to the measurement signal $Y_n$ from the measuring unit 11 in order to measure the reflectance distribution at each position of the measurement target with respect to the propagation distance of the output light 9. In the present embodiment, because the measurement target is the measured optical circuit 4, the backscattered light intensity distribution at the measured optical circuit 4 is measured as the reflectance distribution. Then the analysis unit 13 corrects the reflectance distribution computed from the interference beat signal obtained by the measuring unit 11, that is, the measurement signal $Y_n$ based on the produced reference signal $X_N(t)$. Therefore, the analysis unit 13 can correct the backscattered light intensity distribution at the measured optical circuit 4 in the measuring unit 11 based on the produced reference signal $X_N(t)$.

FIG. 26 is a functional block diagram illustrating the detailed optical reflectometer 96 of FIG. 25. The measuring unit 11 includes the measured optical circuit 4, the receiver 6, the sampling device 7, and the optical directional couplers A and B. The configuration and function of the measuring unit 11 are already described with reference to FIG. 23. The measuring unit 11 detects the interference beat signal between the reference light 3 and the signal light 5 like the measured optical circuit 4, receiver 6, and sampling device 7 of the optical reflectometer illustrated in FIG. 23. The sampling device 7 samples the waveform of the interference beat signal in synchronization with the clock generator 17, that is, at intervals synchronized with the sampling devices 16a and 16b. The obtained sampled data is fed as the measurement signal $Y_n$ into the data processing device 18c of the analysis unit 13.

The first coherence monitor unit 12a includes optical directional couplers E and F, a delay unit 14a, a receiver 15a, and the sampling device 16a. The optical directional coupler E that is of the branching unit branches the first monitoring light 10a inputted to the first coherence monitor unit 12a into two. The delay unit 14a delays one of pieces of branched light branched by the optical directional coupler E with a delay amount that is different from that of the second coherence monitor unit 12b. The delay amount of the delay unit 14a is the coherence length of the output light 9. The coherence property of the output light 9 can be detected when the delay amount of the delay unit 14a is close to the coherence length of the output light 9. The optical directional coupler F multiplexes the other piece of branched light branched by the optical directional coupler E that is of the branching unit and the branched light delayed by the delay unit 14a. The optical directional coupler F performs the multiplexing to generate the monitoring beat signal $I_{Short}$. The receiver 15a detects the monitoring beat signal $I_{Short}$ generated by the optical directional coupler F. The sampling device 16a samples the waveform of the monitoring beat signal $I_{Short}$ detected by the receiver 15a in synchronization with the clock of the clock generator 17 included in the analysis unit 13, and the sampling device 16a feeds the sampled data to the data processing device 18c of the analysis unit 13.

The second coherence monitor unit 12b includes optical directional couplers G and H, a delay unit 14b, a receiver 15b, and the sampling device 16b. The optical directional coupler G branches the second monitoring light 10b inputted to the second coherence monitor unit 12b into two. The delay unit 14b delays one of pieces of branched light branched by the optical directional coupler G that is of the branching unit with a delay amount that is different from that of the first coherence monitor unit 12a. At this point, the delay amount of the delay unit 14b is K (K is a positive integer) times the delay amount of the delay unit 14a. The delay unit 14b has the delay amount K times that of the delay unit 14a, so that the coherence property can be detected when the propagation distance is the integral multiple of the coherence length of the output light 9. The optical directional coupler H multiplexes the other piece of branched light branched by the optical directional coupler G that is of the branching unit and the branched light delayed by the delay unit 14b. The optical directional coupler H performs the multiplexing to generate the monitoring beat signal $I_{Long}$. The receiver 15b detects the monitoring beat signal $I_{Long}$ generated by the optical directional coupler H. The sampling device 16b samples the waveform of the monitoring beat signal $I_{Long}$ detected by the receiver 15b in synchronization with the clock of the clock generator 17 included in the analysis unit 13, and the sampling device 16b feeds the sampled data to the data processing device 18c of the analysis unit 13.

The analysis unit 13 includes the clock generator 17 and a data processing device 18c. The clock generator 17 supplies the common clock signal to the sampling devices 7, 16a, and 16b. The data processing device 18c obtains the sampled data of the measurement signal $Y_n$ from the sampling device 7, the sampled data of the first monitoring beat signal $I_{Short}$ from the sampling device 16a, and the sampled data of the second monitoring beat signal $I_{Long}$ from the sampling device 16b. The data processing device 18c produces the reference signal $X_N(t)$ expressed by Formula (53) or Formula (54) based on the first monitoring beat signal $I_{Short}$ and the second monitoring beat signal $I_{Long}$. The data processing device 18c removes the noise component included in the measurement signal $Y_n$ based on the phase information indicated by the reference signal $X_N(t)$, thereby correcting the measurement signal $Y_n$. At this point, 1 is set to N to use the reference signal $X_1(t)$ in correcting the measurement signal $Y_n$, when the propagation distance from the frequency sweep light source 1 to the reflecting point in the measured optical circuit 4 ranges from zero to ¾ time the length $L_{Short}$. 2 is set to N to use the reference signal $X_2(t)$ when the propagation distance from the frequency sweep light source 1 to the reflecting point in the measured optical circuit 4 ranges from ¾ time the length $L_{Short}$ to ⁵⁄₄ times the length $L_{Short}$. Similarly the reference signal $X_N(t)$ is used when the propagation distance from the frequency sweep light source 1 to the reflecting point in the measured optical circuit 4 ranges from $(2N-1)/4$ times the length $L_{Short}$ to $(2N+1)/4$ times the length $L_{Short}$. The reflectance distribution in the measured optical circuit 4 is supplied in each propagation distance by performing the FFT processing to the measurement signal $Y_n$ after the correction. Therefore, the reflectance distribution to the position can be measured.

The principle of the correction performed by the analysis unit 13 will quantitatively be described using mathematical formulas. The electric field amplitude $E(t)$ of the output light 9 of the frequency sweep light source 1 is given by Formula (44):

$$E(t)=A\exp\{j[2\pi f(t)t+\theta(t)]\}=A\exp[j\Phi(t)] \qquad \text{[Formula 44]}$$

Where A is amplitude (constant), $f(t)$ is a swept frequency of the frequency sweep light source 1, $\theta(t)$ is a fluctuating phase term, and $\Phi(t)$ is a total phase.

A delay fiber having the length $L_{Short}$ is provided in the delay unit 14a of FIGS. 25 and 26, and a delay fiber having the length $L_{Long}$ is provided in the delay unit 14b. The length $L_{Long}$ becomes K (K is an integer) times the length $L_{Short}$. A delay time $\tau_{Short}$ of the delay unit 14a and a delay time $\tau_{Long}$ of the delay unit 14b are given by Formula (45) and Formula (46):

$$\tau_{Short}=nL_{Short}/c \qquad \text{[Formula 45]}$$

$$\tau_{Long}=nL_{Long}/c=K\tau_{Short} \qquad \text{[Formula 46]}$$

On the basis of the delay time $\tau_{Short}$ of the delay unit 14a, which is expressed by Formula (45), the first monitoring beat signal $I_{Short}$ fed into the data processing device 18c is given by Formula (47). On the basis of the delay time $\tau_{Long}$ of the delay unit 14b, which is expressed by Formula (46), the second monitoring beat signal $I_{Long}$ fed into the data processing device 18c is given by Formula (48).

$$I_{Short}=|E(t)+E(t-\tau_{Short})|^2 \propto \cos[\Phi(t)-\Phi(t-\tau_{Short})] \qquad \text{[Formula 47]}$$

$$I_{Long}=|E(t)+E(t-\tau_{Long})|^2 \propto \cos[\Phi(t)-\Phi(t-\tau_{Long})] \qquad \text{[Formula 48]}$$

On the basis of Formula (47) and Formula (48), a phase $X_{Short}(t)$ of the first monitoring beat signal is given by Formula (49), and a phase $X_{Long}(t)$ of the second monitoring beat signal is given by Formula (50):

$$X_{Short}(t)=\Phi(t)-\Phi(t-\tau_{Short}) \qquad \text{[Formula 49]}$$

$$X_{Long}(t)=\Phi(t)-\Phi(t-\tau_{Long}) \qquad \text{[Formula 50]}$$

Figure 27A:
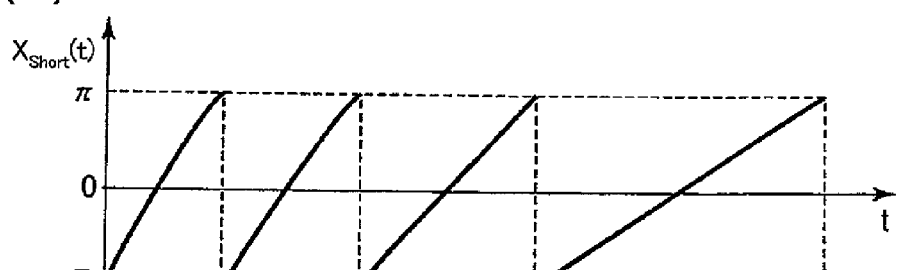
FIG. 27(a) illustrates the case in which the phase of the first monitoring beat signal ranges from $-\pi$ to $+\pi$.
Figure 27B:
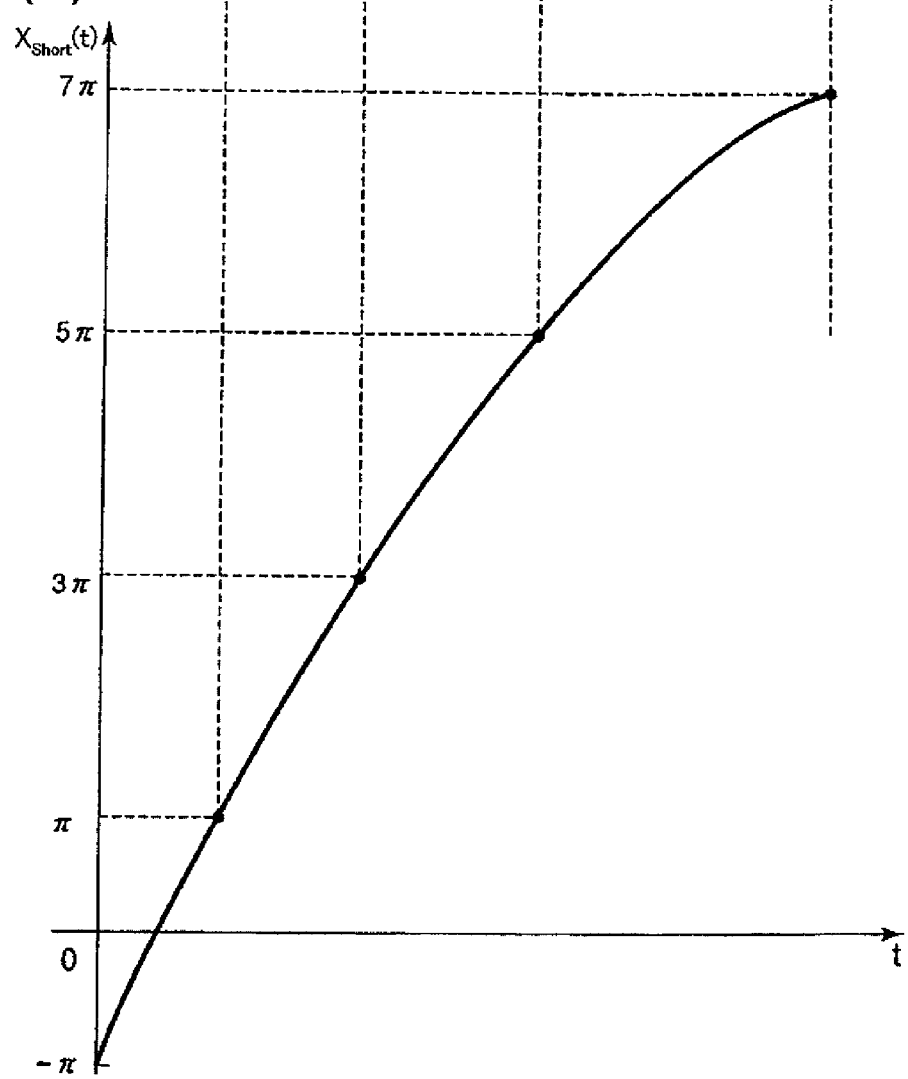
FIG. 27(b) illustrates the case in which an integral multiple of $2\pi$ is added to the phase of the first monitoring beat signal.

FIG. 27 is a time-series graph illustrating an example of the phase $X_{Short}(t)$ of the first monitoring beat signal. As illustrated in FIG. 27(a), the phase $X_{Short}(t)$ of the first monitoring beat signal repeatedly takes a value ranging from $-\pi$ to $+\pi$ to a time (t). The integral multiple of $2\pi$ is sequentially added in each section in which the phase $X_{Short}(t)$ takes the value ranging from $-\pi$ to $+\pi$, which allows phase $X_{Short}(t)$ to be expressed as a smooth function in which the discontinuous point does not exist as illustrated in FIG. 27(b). The obtained phase $X_{Short}(t)$ is used to produce the reference signal $X_N(t)$.

Assuming that M is a natural number (M=1, 2, ... ) and $S_1$ is a sampling rate of the clock generator 17, a time the phase $X_{Short}(t)$ takes the value of $M \cdot S_1$ is obtained as a time sequence $t_{M1}$. At this point, it is necessary that the sampling rate $S_1$ be set so as to have a sufficient Nyquist sampling rate in sampling the measurement signal $Y_n$. Therefore, the anti-aliasing filtering processing is performed to the measurement signal $Y_n$ to prevent the aliasing of the FFT (Fast Fourier Transform) processing. Specifically, the low-pass filtering processing is performed to the measurement signal $Y_n$.

The passage upper limit frequency of the low-pass filter is determined according to the necessary measurement distance. Because the measurement signal $Y_n$ is data sampled at equal intervals, the measurement signal $Y_{nAnti-aliasing1}$ is discrete data having equal interval after the low-pass filtering processing. It is assumed that $1/W$ [second] is the interval. It is assumed that the measurement signal $Y_n$ is set to a temporal function $Y(t)$, and it is assumed that the temporal function $Y(t)$ includes a frequency component ranging from an interval of zero second to an interval $W/2$ second while not including the frequency component of the interval $W/2$ second or more. Therefore, the whole function is solely determined by the sampling theorem. That is, measurement signal $Y(t)$ is given by Formula (51):

$$Y(t)=\sum_{n=-\infty}^{+\infty} Y_{nAnti-aliasing1}\frac{\sin\pi(Wt-n)}{\pi(Wt-n)} \qquad \text{[Formula 51]}$$

The measurement signal $Y(t_{M1})$ can be obtained by substituting the time sequence $t_{M1}$ for Formula (51). The FFT processing is performed to the measurement signal $Y(t_{M1})$ to transform the time axis into the space axis, and the reflectance can be computed at each position corresponding to the propagation distance.

When the propagation distance from the frequency sweep light source 1 to the reflecting point in the measured optical circuit 4 is equal to or lower than a half of the coherence length of the output light 9, the measurement signal $Y(t)$ can be corrected using the phase $X_{Short}(t)$ expressed by Formula (49). In the present embodiment, even if the propagation distance from the frequency sweep light source 1 to the reflecting point in the measured optical circuit 4 exceeds a half of the coherence length of the output light 9, the measurement signal $Y(t)$ can be corrected with a small error by obtaining the phase $X_{Long}(t)$ when the propagation distance is the integral multiple of a half of the coherence length.

The reference signal $X_N(t)$ in cases where the propagation distance from the frequency sweep light source 1 to the reflecting point in the measured optical circuit 4 is N (N is an integer) times a half of the coherence length of the output light 9 will be described below. Because the length $L_{Short}$ of the delay fiber of the delay unit 14a is the coherence length of the output light 9, one way of the propagation distance from the frequency sweep light source 1 to the reflecting point in the measured optical circuit 4 is a half of the length $L_{Short}$ of the delay fiber of the delay unit 14a, and the round-trip propagation distance becomes equal to the length $L_{Short}$ of the delay fiber of the delay unit 14a. Therefore, the reference signal $X_N(t)$ is expressed by Formula (52):

$$X_N(t)=\Phi(t)-\Phi(t-N\tau_{Short}) \qquad \text{[Formula 52]}$$

As can be seen from FIG. 27 illustrating the time-series graph of the phase $X_{Short}(t)$ of the first monitoring beat signal, Formula (52) can be expressed by Formula (53):

$$X_N(t) = X_{Short}(t) + X_{Short}(t-\tau_{Short}) + \ldots + X_{Short}[t-(N-1)\tau_{Short}]$$
$$= \sum_{n=0}^{N-1} X_{Short}(t-n\cdot\tau_{Short}) \qquad \text{[Formula 53]}$$

Figure 28:
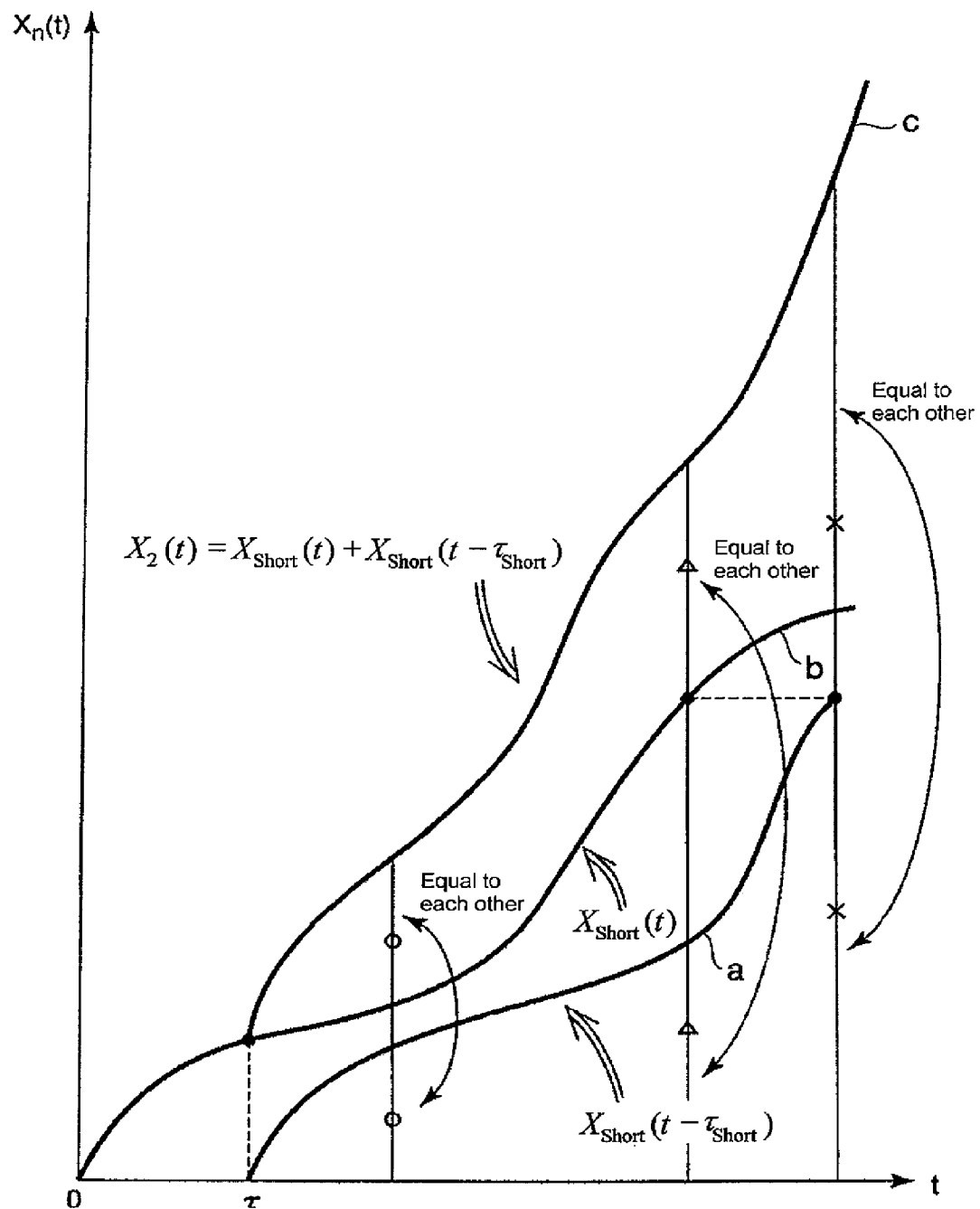
FIG. 28 is a time-series graph illustrating an example of a reference signal $X_N(t)$.

FIG. 28 is a time-series graph illustrating an example of the reference signal $X_N(t)$. In the case of N=2, the reference signal $X_2(t)$ becomes $X_{Short}(t)+X_{Short}(t-\tau_{Short})$ from Formula (53). In cases where the phase $X_{Short}(t)$ of the first monitoring beat signal is indicated by the curve b, the phase $X_{Short}(t-\tau_{Short})$ of the first monitoring beat signal is indicated by the curve a. The phase $X_{Short}(t)$ is delayed by the delay time $\tau_{Short}$ of the delay unit 14*a*, thereby obtaining the phase $X_{Short}(t-\tau_{Short})$. The reference signal $X_2(t)$ indicated by the curve c can be produced by adding the curve a and the curve b. Similarly, in cases where N is 3 or more, the reference signal $X_N(t)$ can be produced from Formula (53).

When an error exists in the delay time $\tau_{Short}$ of the delay unit 14*a*, in producing the reference signal $X_N(t)$ from Formula (53), the error of the reference signal $X_N(t)$ is accumulated (N−1) times with increasing n. Therefore, the correction is performed using the delay time $\tau_{Long}$ of the delay unit 14*b*. As expressed by Formula (46), the delay time $\tau_{Long}$ is K times the delay time $\tau_{Short}$, so that the error accumulated K times can be reduced to one-time error. Using the delay time $\tau_{Long}$, Formula (53) is expressed by Formula (54):

$$X_N(t) = \sum_{n=0}^{Int(N/K)-1} X_{Long}(t - n \cdot \tau_{Long}) + \sum_{m=0}^{Mod(N,K)-1} X_{Short}[t - Int(N/K) \cdot \tau_{Long} - m \cdot \tau_{Short}] \quad \text{[Formula 54]}$$

where Int(N/K) is an integral portion of a quotient obtained by dividing N by K and Mod(N,K) is a remainder of the quotient obtained by dividing N by K. The number of times in which the error is accumulated can be reduced from N times to [Int(N/K)+Mod(N,K)] times using Formula (54). For example, in the case of N=32 and K=10, the number of times in which the error is accumulated becomes five. Therefore, even if the propagation distance from the frequency sweep light source 1 to the reflecting point in the measured optical circuit 4 exceeds a half of the coherence length of the output light 9, the correction can be decreased when the propagation distance is the integral multiple of a half of the length $L_{Short}$ of the delay fiber of the delay unit 14*a*.

Assuming that M is a natural number (M=1, 2, ... ) and $S_N$ is a sampling rate of the clock generator 17, a time the reference signal $X_N(t)$ obtained by Formula (54) takes the value of $M \cdot S_N$ is obtained as a time sequence $t_{MN}$. At this point, it is necessary that the sampling rate $S_N$ be set so as to have a sufficient Nyquist sampling rate in sampling the measurement signal $Y_n$. Therefore, the anti-aliasing filtering processing is performed to the measurement signal $Y_n$ to prevent the aliasing of the FFT processing. Specifically, the filtering processing is performed to the measurement signal $Y_n$ with the low-pass filter having the passage upper limit frequency expressed by Formula (55).

$$\text{passage upper limit frequency} = \frac{2N+1}{2N} \text{Max}\left[\frac{dX_n(t)}{dt}\right] \quad \text{[Formula 55]}$$

In Formula (55) of the passage upper limit frequency, Max $[dX_n(t)/dt]$ indicates the maximum value in the whole data region ranging from (2N−1) times to (2N+1) times for a quarter of the length $L_{Short}$ of the delay fiber of the delay unit 14*a*. The measurement signal $Y_{n\,Anti\text{-}aliasing1}$ of Formula (51) is replaced by the measurement signal $Y_{n\,Anti\text{-}aliasingN}$ to substitute the time sequence $t_{MN}$, which allows the measurement signal $Y(t_{MN})$ to be obtained. The time axis is transformed into the space axis by performing the FFT processing to the measurement signal $Y(t_{MN})$, and the reflectance can be computed at each position corresponding to the propagation distance. The measurement result can optimally be corrected near the point at which the propagation distance from the frequency sweep light source 1 to the reflecting point in the measured optical circuit 4 is a half of the length $L_{Short}$ of the delay fiber of the delay unit 14*a*.

Figure 29:
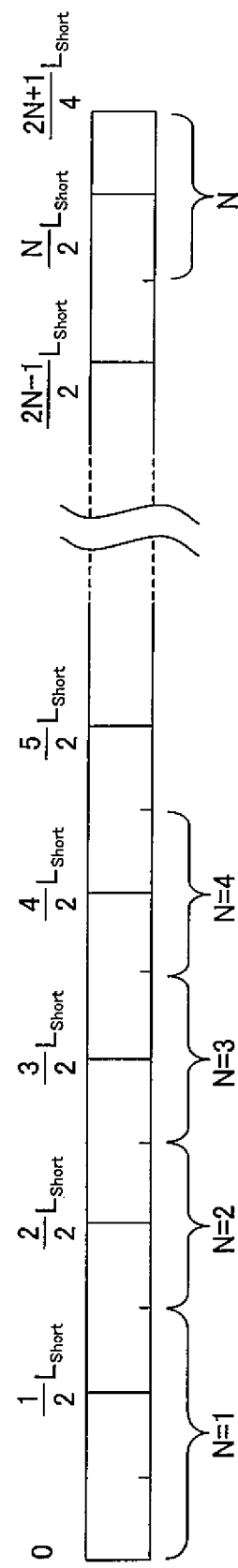
FIG. 29 is an explanatory view illustrating a correction example in each sampled measurement signal.

FIG. 29 is an explanatory view illustrating a correction example in each sampled measurement signal. The measurement signal $Y_n$ is sampled each half time the length $L_{Short}$ of the delay fiber of the delay unit 14*a*. 1 is set to N to use the reference signal $X_1(t)$ when the propagation distance ranges from zero to ¾ time the length $L_{Short}$. 2 is set to N to use the reference signal $X_2(t)$ when the propagation distance ranges from ¾ time the length $L_{Short}$ to ⁵⁄₄ times the length $L_{Short}$. The reference signal $X_N(t)$ is used when the propagation distance ranges from (2N−1)/4 times the length $L_{Short}$ to (2N+1)/4 times the length $L_{Short}$ of the delay fiber of the delay unit 14*a*. As expressed by Formula (53), the reference signal $X_N(t)$ can be expressed only by the phase $X_{Short}(t)$ of the first monitoring beat signal. In such cases, although the N-time correction is required, the data of the phase $X_{Short}(t)$ of the first monitoring beat signal necessary for the correction can be obtained once. In the present embodiment, as expressed by Formula (54), the reference signal $X_N(t)$ can be expressed by the phase $X_{Short}(t)$ of the first monitoring beat signal and the phase $X_{Long}(t)$ of the second monitoring beat signal. In such cases, because the K-time correction can be decreased to once, a load on the data processing device 18*c* can be reduced while the error is reduced in the correction.

In obtaining the time sequences $t_{M1}, t_{M2}, \ldots, t_{MN}$ from the reference signals $X_1(t), X_2(t), \ldots, X_N(t)$, the necessary sampling rates $S_1, S_2, S_3, \ldots, S_N$ are limited to the Nyquist sampling rate at which the measurement signal Y (t) is sampled. The reference signal $X_N(t)$ is obtained from the beat signal inserting the delay fiber having the length $NL_{Short}$, and the measurement signal Y(t) is obtained by measuring the fiber having the round-trip length of $(2N+1)L_{Short}/2$. The sampling rate $S_N$ satisfying the Nyquist sampling rate is given by Formula (56):

$$S_N \le \frac{2N\pi}{2N+1} \quad \text{[Formula 56]}$$

Figure 30:
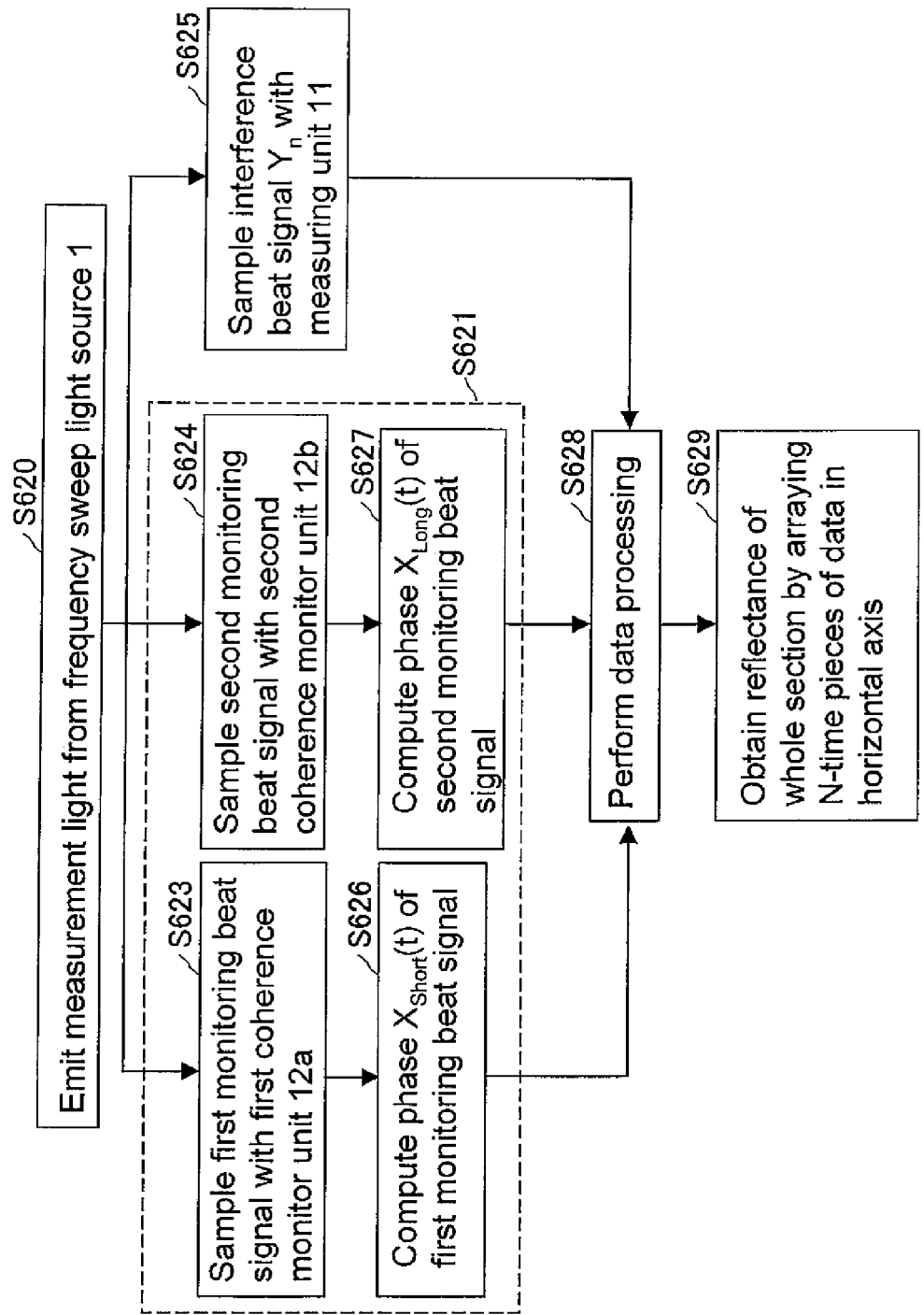
FIG. 30 is a flowchart illustrating an example of optical reflectometry according to the sixth embodiment.

An operation of the optical reflectometer 96 of the present embodiment will be described with reference to FIGS. 26 and 30. FIG. 30 is a flowchart illustrating an example of optical reflectometry of the present embodiment. The optical reflectometry of the present embodiment includes optical output step S620, monitor step S621, measurement step S625, correction step S628, and measurement result output step S629. The output light emitted from the frequency sweep light source 1, in which the optical frequency is swept, is inputted to the measured optical circuit 4 that is of the measurement target to measure the reflectance distribution to the position in the measurement target.

In optical output step S620, the frequency sweep light source 1 in which the optical frequency is swept supplies the output light 9.

In monitor step S621, the monitoring beat signals $I_{Short}$ and $I_{Long}$ are obtained from the monitoring light 10 obtained by branching the output light 9 (steps S623 and S624). The monitoring light 10 is branched into the two pieces of monitoring light 10*a* and 10*b*, and the pieces of monitoring light 10a and 10b are inputted to the first coherence monitor unit 12a and the second coherence monitor unit 12b, each of the pieces of inputted monitoring light 10a and 10b is branched into two. In each of the first coherence monitor unit 12a and the second coherence monitor unit 12b, one of the two pieces of branched light is delayed with each of the delay amounts $\tau_{Short}$ and $\tau_{Long}$ that are different from each other, and the other piece of the branched light and the delayed branched light are multiplexed to obtain the monitoring beat signals $I_{Short}$ and $I_{Long}$. The first coherence monitor unit 12a performs the processing in step S623, and the second coherence monitor unit 12b performs the processing in step S624. Either the pieces of processing in steps S623 and S624 may be performed in first, or the pieces of processing in steps S623 and S624 may be performed at the same time.

In step S623, in the first coherence monitor unit 12a, the receiver 15a supplies the first monitoring beat signal $I_{Short}$, the sampling device 16a samples the first monitoring beat signal $I_{Short}$, and the sampled data is recorded in the internal memory (not illustrated). In step S621, the data processing device 18c performs the processing in step S626. In step S626, in the analysis unit 13, the data processing device 18c computes the phase $X_{Short}(t)$ of the first monitoring beat signal from the sampled data of the first monitoring beat signal $I_{Short}$. The phase $X_{Short}(t)$ of the first monitoring beat signal becomes the continuous function having no discontinuous point as illustrated in FIG. 27(b).

In step S624, in the second coherence monitor unit 12b, the receiver 15b supplies the second monitoring beat signal $I_{Long}$, the sampling device 16b samples the second monitoring beat signal $I_{Long}$, and the sampled data is recorded in the internal memory (not illustrated). In step S621, the data processing device 18c performs the processing in step S627. In step S627, in the analysis unit 13, the data processing device 18c computes the phase $I_{Long}(t)$ of the first monitoring beat signal from the sampled data of the second monitoring beat signal $I_{Long}$. The phase $X_{Long}(t)$ of the first monitoring beat signal becomes the continuous function having no discontinuous point as illustrated in FIG. 27(b).

In measurement step S625, the interference beat signal between the reference light 3 and the signal light 5 is obtained. The reference light 3 is obtained by branching the output light 9, and the signal light 5 is backscattered from the measured optical circuit 4 that is of the measurement target. Specifically, in the measuring unit 11, the receiver 6 supplies the interference beat signal, the sampling device 7 samples the interference beat signal, and the sampled data is recorded as the measurement signal $Y_n$ in the internal memory (not illustrated).

The order of monitor step S621 and measurement step S625 may be replaced. For example, when measurement step S625 is performed after monitor step S621, the data processing can rapidly be performed to the measurement signal $Y_n$ supplied from the receiver 6. When monitor step S621 is performed after measurement step S625, the reference signal $X_n(t)$ can be corrected in an environment in which the measurement signal $Y_n$ is supplied from the receiver 6. When measurement step S625 and monitor step S621 are simultaneously performed, the data processing can rapidly be performed to the measurement signal $Y_n$ using the reference signal $X_n(t)$ in the environment in which the measurement signal $Y_n$ is supplied.

In correction step S628, the data processing device 18c produces the reference signal $X_n(t)$, which reflects the frequency sweep nonlinearity in the frequency sweep light source 1 and the phase noise included in the output light 9, from the monitoring beat signals $I_{Short}$ and $I_{Long}$ obtained in monitor step S621, and the data processing device 18c corrects the reflectance computed from the interference beat signal $Y_n$ obtained in measurement step S625 based on the reference signal $X_n(t)$. At this point, the correction of the reflectance is performed by correcting the spread of the measurement signal $Y_n$. The spread of the measurement signal $Y_n$ is corrected by the sampling processing and the data processing including the FFT processing. The correction of the reflectance is repeated N times that is of the number of sampling times. At this point, because the sampling is performed each half time the length $L_{Short}$ of the delay fiber of the delay unit 14a, the correction is repeated each half time the length $L_{Short}$ of the delay fiber of the delay unit 14a according to the propagation distance of the signal light 5. The obtained N-th data $FFT_N$ is recorded.

In measurement result output step S629, the data processing device 18c computes the reflectance of the measurement light 2 using the pieces of data $FFT_1, FFT_2, \ldots, FFT_N$.

Figure 31:
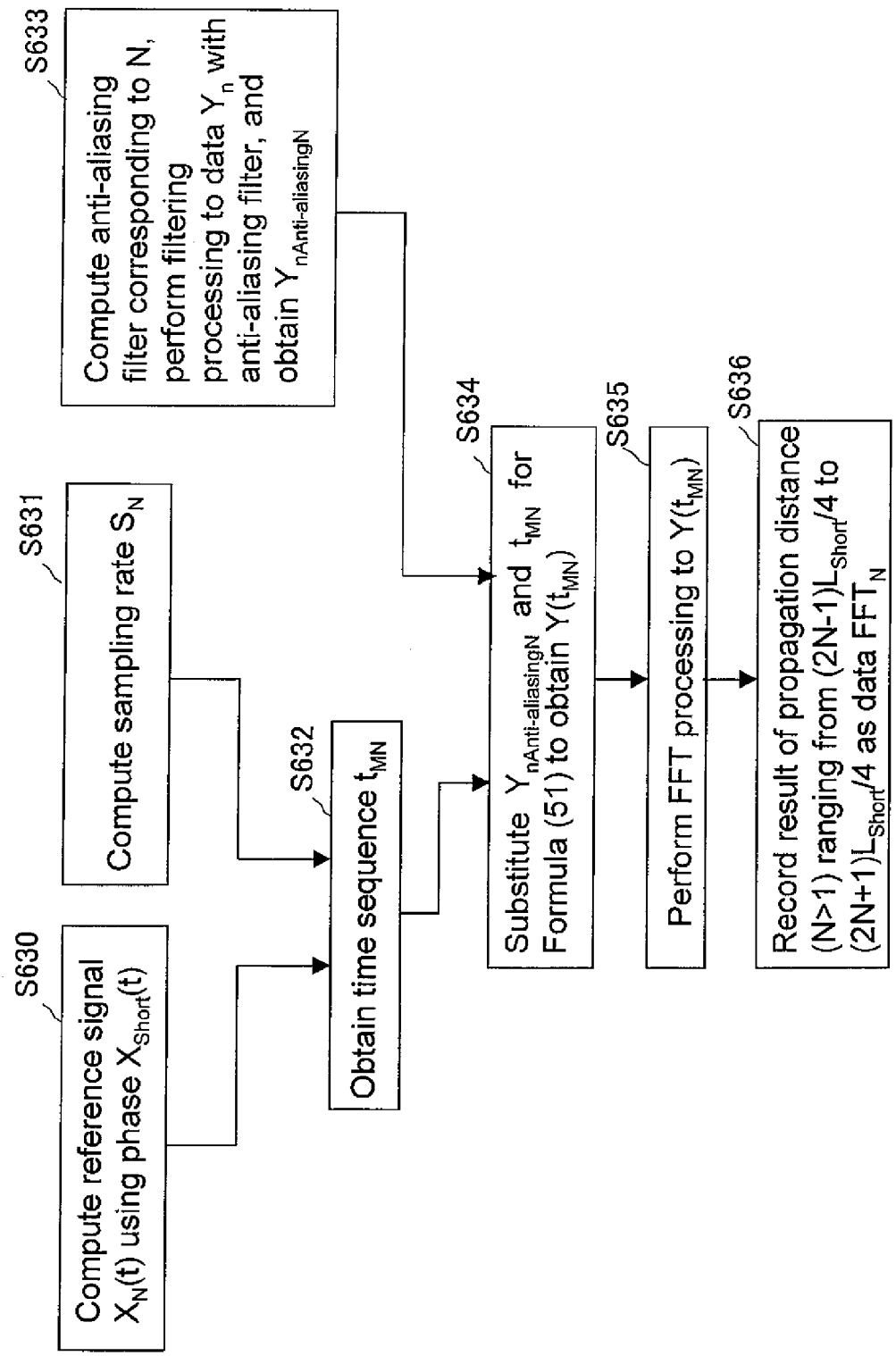
FIG. 31 is a flowchart illustrating an example of a correction step.

FIG. 31 is a flowchart illustrating an example of correction step. Correction step S628 includes reference signal computing step S630, sampling rate computing step S631, time sequence computing step S632, anti-aliasing filtering processing step S633, measurement signal computing step S634, FFT processing step S635, and distance recording step S636. At this point, the order of reference signal computing step S630, sampling rate computing step S631, and time sequence computing step S632 may be replaced.

In reference signal computing step S630, the data processing device 18c computes the reference signal $X_N(t)$ by applying the phase $X_{Short}(t)$ of the first monitoring beat signal obtained in step S626 to Formula (53). At this point, preferably the data processing device 18c computes the reference signal $X_N(t)$ by applying the phase $X_{Short}(t)$ of the first monitoring beat signal obtained in step S626 and the phase $X_{Long}(t)$ of the second monitoring beat signal obtained in step S627 to Formula (54).

In sampling rate computing step S631, the data processing device 18c computes the sampling rate $S_N$ using Formula (56) in tandem with reference signal computing step S630. In time sequence computing step S632, the time that is equal to the value of $M \cdot S_N$ is obtained as the time sequence $t_{MN}$ from the reference signal $X_N(t)$.

On the other hand, in anti-aliasing filtering processing step S633, the anti-aliasing filter corresponding to N is obtained for the sampled data $Y_n$ obtained in step S625, and the filtering processing is performed to the sampled data $Y_n$ using the filter coefficient of the anti-aliasing filter. That is, the filtering processing is performed to the sampled data $Y_n$ with the low-pass filter corresponding to N, and the low-pass filter has the passage upper limit frequency whose property is expressed by Formula (55), therefore obtaining the measurement signal $Y_{n\ Anti-aliasingN}$.

In measurement signal computing step S634, the measurement signal $Y(t_{MN})$ that is of the measurement signal $Y_{n\ Anti-aliasingN}$ in each time $t_{MN}$ is computed using the time sequence $t_{MN}$ obtained in time sequence computing step S632. The measurement signal $Y(t_{MN})$ can be computed by substituting the measurement signal $Y_{n\ Anti-aliasingN}$ and the time sequence $t_{MN}$ for Formula (51).

In FFT processing step S635, the FFT processing is performed to the computed measurement signal $Y(t_{MN})$. In distance recording step S636, the measurement signal $Y(t_{MN})$ to which the FFT processing is performed in FFT processing step S635 is recorded as $FFT_N$ in each propagation distance from the frequency sweep light source 1 of FIG. 26 to the reflecting point in the measured optical circuit 4. In the case of N=1, the measurement signal $Y(t_{MN})$ in which the propagation distance from the frequency sweep light source 1 of FIG. 26 to the reflecting point in the measured optical circuit 4 ranges from zero time the length $L_{Short}$ to ¾ time the length $L_{Short}$ is recorded as the data $FFT_1$. In the case of N>1, the measurement signal $Y(t_{MN})$ in which the propagation distance from the frequency sweep light source 1 of FIG. 26 to the reflecting point in the measured optical circuit 4 ranges from $(2N-1)/4$ times the length $L_{Short}$ to $(2N+1)/4$ times the length $L_{Short}$ is recorded as the data $FFT_N$.

As described above, in correction step S628, the pieces of processing in steps S630, S631, S632, S633, S634, S635, and S636 are performed as a series of pieces of processing. The pieces of data $FFT_1$, $FFT_2$, ..., $FFT_N$ are obtained by repeating the series of pieces of processing N times. The reflectance distribution at each point in the measurement target at the propagation distance of 0 to $(2N+1)L_{Short}/4$ can be measured by connecting the obtained pieces of data $FFT_1$, $FFT_2$, ..., $FFT_N$ to one another in the horizontal axis on the graph.

Thus, in the present embodiment, the first coherence monitor unit 12a and the second coherence monitor unit 12b are provided to monitor the coherence property of the frequency sweep light source 1, and the measurement result of the measuring unit 11 is corrected based on the monitor results. That is, the monitoring beat signal of the measurement light emitted from the frequency sweep light source 1 is generated by the delayed self-homodyne detection in the first coherence monitor unit 12a and the second coherence monitor unit 12b, the reference signal is produced from the monitoring beat signal, the measurement signal $Y_n$ is sampled based on the produced reference signal, and the FFT processing is performed to the obtained sequence to obtain the measurement result.

Therefore, the result in which the FFT processing is performed to the interference beat signal can be prevented from spreading in the divergent manner even in the propagation distance exceeding the light source coherence length. Accordingly, the optical reflectometry and optical reflectometer, in which the measurement can be performed by OFDR in the propagation distance exceeding the light source coherence length without any limitation of the light source coherence length, can be provided. That is, the optical reflectometry and optical reflectometer, in which the measurement can be performed by OFDR in the propagation distance exceeding the light source coherence length, can be provided.

The invention is not limited to the embodiments, but various modifications can be made in an implementation stage without departing from the scope of the invention. For example, in the analysis unit 13 illustrated in FIG. 26, the reference signal $X_n(t)$ may be produced to correct the measurement signal $Y_n$ using means for multiplying the first monitoring beat signal or the second monitoring beat signal or means for computing the trigonometric function.

Various inventions can be made by appropriately combining plural constituents disclosed in the embodiments. For example, some constituents may be neglected from all the constituents of the embodiments. The constituents included in different embodiments may appropriately be combined.

The invention claimed is:

1. An optical reflectometry that is of Optical Frequency Domain Reflectometry (OFDR) in which output light emitted from a frequency sweep light source is inputted to a measurement target to measure a reflectance distribution of the measurement target in a propagation direction, an optical frequency being swept in the frequency sweep light source, the optical reflectometry comprising:
monitoring a coherence property of the output light;
detecting interference beat signal of the output light and backscattered light from the measurement target;
correcting measurement result based on the interference beat signal using the coherence property of the output light.

2. The optical reflectometry according to claim 1, comprising:
branching the output light from the frequency sweep light source into two with an optical interferometer to delay light of one of branched paths of the optical interferometer;
multiplexing the light of one of the branched paths and light of the other branched path to produce a monitoring beat signal;
producing a reference signal indicating a phase of the monitoring beat signal; and
correcting spread of the interference beat signal with the reference signal.

3. The optical reflectometry according to claim 2, wherein the reference signal is produced by adding a phase function indicating the phase of the monitoring beat signal and a function produced by delaying a time axis of the phase function in an integral multiple of a delay amount of one of the branched paths.

4. The optical reflectometry according to claim 3, wherein the reference signal XN (t) is expressed as follows:

$$X_N(t)=X_1(t)+X_1(t-\tau_c)+X_1(t-2\tau_c)+\ldots+X_1\{t-(N-1)\tau_c\} \quad \text{[Formula 1]}$$

where $X_1(t)$ is a phase of the monitoring beat signal and $\tau_c$ is the delay amount.

5. The optical reflectometry according to claim 4, wherein the beat frequency is corrected by utilizing the fact that a proportion of a beat frequency of the monitoring beat signal to a distance from the frequency sweep light source is $X'_1(t)/X'_N(t)$, where $X'_1(t)$ is a temporal differentiation of $X_1(t)$ and $X'_N(t)$ is a temporal differentiation of $X_N(t)$.

6. The optical reflectometry according to claim 5, wherein a baseband signal of the monitoring beat signal is formed, and the measurement result is corrected by re-sampling the obtained baseband signal.

7. An optical reflectometer that measures a reflectance distribution of a measurement target in a propagation direction by Optical Frequency Domain Reflectometry (OFDR), the optical reflectometer comprising:
a frequency sweep light source whose optical frequency is swept;
a monitor unit that monitors a coherence property of output light emitted from the frequency sweep light source;
a measuring unit that detects an interference beat signal between the output light and light backscattered from the measurement target; and
an analysis unit that corrects measurement result based on the interference beat signal using the coherence property of the output light.

8. The optical reflectometer according to claim 7, comprising:
an optical interferometer that branches the output light from the frequency sweep light source into two to multiplex light of one of branched paths and light on the other branched path, thereby producing a monitoring beat signal; and
a delay unit that delays the light of one of the branched paths,
wherein the analysis unit produces a reference signal indicating a phase of the monitoring beat signal, and the analysis unit corrects spread of the interference beat signal using the reference signal.

9. The optical reflectometer according to claim 8, wherein the analysis unit produces the reference signal by adding a phase function indicating the phase of the monitoring beat signal and a function produced by delaying a time axis of the phase function in an integral multiple of a delay amount of one of the branched paths.

10. The optical reflectometer according to claim 9, wherein the reference signal $X_N(t)$ is expressed as follows:

$$X_N(t)=X_1(t)+X_1(t-\tau_c)+X_1(t-2\tau_c)+\ldots+X_1\{t-(N-1)\tau_c\} \quad \text{[Formula 2]}$$

where $X_1(t)$ is a phase of the monitoring beat signal and $\tau_c$ is the delay amount.

11. The optical reflectometer according to claim 10, wherein the analysis unit corrects the beat frequency by utilizing the fact that a proportion of a beat frequency of the monitoring beat signal to a distance from the frequency sweep light source is $X'_1(t)/X'_N(t)$, where $X'_1(t)$ is a temporal differentiation of $X_1(t)$ and $X'_N(t)$ is a temporal differentiation of $X_N(t)$.

12. The optical reflectometer according to claim 11, wherein the analysis unit forms a baseband signal of the monitoring beat signal, and the analysis unit corrects the measurement result by re-sampling the obtained baseband signal.

13. An optical reflectometry that is of Optical Frequency Domain Reflectometry (OFDR) in which output light emitted from a frequency sweep light source is inputted to a measurement target to measure a reflectance distribution of the measurement target in a propagation direction, an optical frequency being swept in the frequency sweep light source, the optical reflectometry comprising:

a monitor step of producing a reference signal reflecting nonlinearity of the sweep from a monitoring light obtained by branching the output light;

a detection step of obtaining sampled data by sampling an interference beat signal between the output light and light backscattered from the measurement target in a constant period; and a correction step of correcting the reflectance distribution measured based on the interference beat signal using the reference signal, wherein the monitor step includes:

delaying one of two pieces of light, into which the monitoring light is branched, with a delay unit;

inputting both the pieces of branched light on an optical 90-degree hybrid to perform delayed self-homodyne detection;

producing first and second monitoring beat signals that are orthogonal to each other;

computing an error of a branch ratio of a branch unit in the optical 90-degree hybrid based on variances of pieces of data obtained by sampling the first and second monitoring beat signals in the constant period;

computing an error of 90-degree orthogonality in the optical 90-degree hybrid by statistical computation processing in which the variances are used;

producing the reference signal using the computed error of the branch ratio, the computed error of the 90-degree orthogonality, and the first and second monitoring beats; and calculating a sequence in which the reference signal takes a defined value, and the correction step includes:

producing a continuous function from the sampled data using a sampling theorem;

obtaining a value by substituting the time sequence for the continuous function; and performing Fourier transform to the obtained value to obtain a value in which the reflectance distribution is corrected.

14. The optical reflectometry according to claim 13, wherein, in the monitor step, the reference signal is produced by adding a phase function indicating the phase of the monitoring light and a function produced by delaying a time axis of the phase function in an integral multiple of a delay amount in the delay unit.

15. An optical reflectometer that measures a reflectance distribution of a measurement target in a propagation direction by Optical Frequency Domain Reflectometry (OFDR), the optical reflectometer comprising:

a frequency sweep light source whose optical frequency is swept;

a monitor unit on which a monitoring light is inputted, the monitoring light being obtained by branching an output light emitted from the frequency sweep light source;

a measuring unit that obtains sampled data by sampling an interference beat signal between the output light and light backscattered from the measurement target in a constant period; and an analysis unit that corrects the reflectance distribution measured based on the interference beat signal using the reference signal, wherein the monitor unit includes:

a branching unit that branches the monitoring light into two;

a delay unit that delays one of the two pieces of branched light;

an optical 90-degree hybrid that produces first and second monitoring beat signals, which are orthogonal to each other, by inputting the delayed branched light and the other piece of branched light thereon; and a sampling device that obtains sampled data by sampling the first and second monitoring beat signals in the constant period, and the analysis unit computes an error of a branch ratio of the branching unit in the optical 90-degree hybrid based on variances of pieces of data obtained by sampling the first and second monitoring beat signals in the constant period, the analysis unit computes an error of 90-degree orthogonality in the optical 90-degree hybrid by statistical computation processing in which the variances are used, the analysis unit produces a reference signal reflecting nonlinearity of the sweep using the computed error of the branch ratio, the computed error of the 90-degree orthogonality, and the first and second monitoring beats, the analysis unit computes a time sequence in which the reference signal takes a defined value, the analysis unit produces a continuous function from the sampled data using a sampling theorem, the analysis unit obtains a value by substituting the time sequence for the continuous function, and the analysis unit performs Fourier transform to the obtained value to obtain a value in which the reflectance distribution is corrected.

16. The optical reflectometer according to claim 15, wherein the analysis unit produces the reference signal by adding a phase function indicating the phase of the monitoring light and a function produced by delaying a time axis of the phase function in an integral multiple of a delay amount in the delay unit.

17. An optical reflectometry in which output light emitted from a frequency sweep light source is inputted to a measurement target to measure a reflectance distribution to a position of the measurement target, an optical frequency being swept in the frequency sweep light source, the optical reflectometry comprising:

a monitor step of obtaining a monitoring beat signal from a monitoring light, the monitoring light being obtained by branching the output light;

a measurement step of obtaining an interference beat signal between a signal light and a reference light, the signal light being backscattered from the measurement target, the reference light being obtained by branching the output light; and a correction step of generating a reference signal reflecting nonlinearity of the sweep and a phase noise of the frequency sweep light source from the monitoring beat signal obtained in the monitor step and correcting the reflectance distribution using the reference signal, the reflectance distribution being computed from the interference beat signal obtained in the measurement step, wherein, in the monitor step, the monitoring light is branched into two and inputted to a first coherence monitor unit and a second coherence monitor unit, the inputted light is branched into two, one of the pieces of branched light is delayed with delay amounts in which the first coherence monitor unit differs from the second coherence monitor unit, and the other piece of branched light and one of pieces of delayed branched light are multiplexed to obtain the monitoring beat signal.

18. The optical reflectometry according to claim 17, wherein, assuming that $X_N(t)$ is the reference signal, the reference signal $X_N(t)$ is expressed as follows:

$$X_N(t) = \sum_{n=0}^{Int(N/K)-1} X_{Long}(t - n \cdot \tau_{Long}) + \sum_{m=0}^{Mod(N,K)-1} X_{Short}[t - Int(N/K) \cdot \tau_{Long} - m \cdot \tau_{Short}] \quad \text{[Formula 3]}$$

where $\tau_{Short}$ is the delay amount of the first coherence monitor unit, $X_{Short}(t)$ is a phase of the monitoring beat signal obtained by the first coherence monitor unit, $\tau_{Long}$ is the delay amount of the second coherence monitor unit, $X_{Long}(t)$ is a phase of the monitoring beat signal obtained by the second coherence monitor unit, Int(N/K) is an integral portion of a quotient obtained by dividing N by K, and Mod(N,K) is a remainder of the quotient obtained by dividing N by K, and the delay amount $\tau_{Long}$ is K (K is an integer) times the delay amount $\tau_{Short}$.

19. An optical reflectometer that inputs output light whose optical frequency is swept on a measurement target to measure a reflectance distribution to a position of the measurement target, the optical reflectometer comprising:

a frequency sweep light source that emits the output light;

a first coherence monitor unit and a second coherence monitor unit that obtain monitoring beat signals from pieces of monitoring light, the pieces of monitoring light being obtained by branching the output light from the frequency sweep light source;

a measuring unit that obtains an interference beat signal between signal light and reference light, the signal light being backscattered from the measurement target, the reference light being obtained by branching the output light from the frequency sweep light source; and an analysis unit that generates a reference signal reflecting nonlinearity of the sweep and a phase noise of the frequency sweep light source from the monitoring beat signals obtained by the first coherence monitor unit and the second coherence monitor unit and corrects the reflectance distribution using the reference signal, the reflectance distribution being computed from the interference beat signal obtained by the measuring unit, wherein the first coherence monitor unit and the second coherence monitor unit includes:

a branching unit that branches the monitoring light into two;

a delay unit that delays one of the pieces of branched light branched by the branching unit with delay amounts in which the first coherence monitor unit differs from the second coherence monitor unit; and a receiver that multiplexes the other piece of branched light branched by the branching unit and one of the pieces of delayed branched light of the delay unit to obtain the monitoring beat signal.

20. The optical reflectometer according to claim 19, wherein, assuming that $X_N(t)$ is the reference signal, the reference signal $X_N(t)$ is expressed as follows:

$$X_N(t) = \sum_{n=0}^{Int(N/K)-1} X_{Long}(t - n \cdot \tau_{Long}) + \sum_{m=0}^{Mod(N,K)-1} X_{Short}[t - Int(N/K) \cdot \tau_{Long} - m \cdot \tau_{Short}] \quad \text{[Formula 4]}$$

where $\tau_{Short}$ is the delay amount generated by the delay unit in the first coherence monitor unit, $X_{Short}(t)$ is a phase of the monitoring beat signal obtained by the receiver in the first coherence monitor unit, $\tau_{Long}$ is the delay amount generated by the delay unit in the second coherence monitor unit, $X_{Long}(t)$ is a phase of the monitoring beat signal obtained by the receiver in the second coherence monitor unit, Int(N/K) is an integral portion of a quotient obtained by dividing N by K, and Mod(N,K) is a remainder of the quotient obtained by dividing N by K, and the delay amount $\tau_{Long}$ is K (K is an integer) times the delay amount $\tau_{Short}$.

* * * * *